(12) United States Patent
Gastineau et al.

(10) Patent No.: US 8,452,682 B1
(45) Date of Patent: *May 28, 2013

(54) METHODS, SYSTEMS, AND COMPUTER PROGRAM PRODUCTS FOR FACILITATING NON-TRANSPARENT EXCHANGE-TRADED FUND SHARE CREATIONS AND REDEMPTIONS WITH OPTIONAL EARLY CUTOFF TIMES

(75) Inventors: Gary L. Gastineau, Short Hills, NJ (US); Todd J. Broms, New York, NY (US)

(73) Assignee: Navigate Fund Solutions LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,150

(22) Filed: Jan. 27, 2012

Related U.S. Application Data

(63) Continuation-in-part of application No. 12/056,980, filed on Mar. 27, 2008, now Pat. No. 8,131,621, and a continuation-in-part of application No. 11/714,923, filed on Mar. 7, 2007, now Pat. No. 7,496,531, which is a continuation-in-part of application No. 11/141,243, filed on May 31, 2005, now Pat. No. 7,444,300.

(60) Provisional application No. 60/907,283, filed on Mar. 27, 2007.

(51) Int. Cl.
G06Q 40/00 (2012.01)

(52) U.S. Cl.
USPC .......................................... 705/36 R; 705/37

(58) Field of Classification Search
CPC ....................................................... G06Q 40/00

USPC ..................................................... 705/36, 37
See application file for complete search history.

(56) References Cited

U.S. PATENT DOCUMENTS

| | | | |
|---|---|---|---|
| 5,806,048 A | 9/1998 | Kiron et al. |
| 5,845,266 A | 12/1998 | Lupien et al. |
| 5,946,667 A | 8/1999 | Tull et al. |
| 5,983,204 A | 11/1999 | Debe |
| 6,012,046 A | 1/2000 | Lupien et al. |
| 6,029,146 A | 2/2000 | Hawkins et al. |
| 6,088,685 A | 7/2000 | Kiron et al. |
| 6,098,051 A | 8/2000 | Lupien et al. |

(Continued)

OTHER PUBLICATIONS

Barney, Lee, "Actively Managed ETFs: Coming Soon to an Exchange Near You?", The Street May 24, 2001, 4 pgs. (http://www.thestreet.com/funds/funds/1440520.html).

(Continued)

*Primary Examiner* — Daniel Felten
*Assistant Examiner* — Clifford Madamba
(74) *Attorney, Agent, or Firm* — Sampson & Associates, P.C.

(57) ABSTRACT

A system, method and computer product for providing risk information and cost estimation tools to traders in exchange-traded fund shares. The disclosed processes develop, calculate, and publish supplemental information using confidential fund data to support trading in exchange-traded funds with portfolios that are not totally transparent and that use portfolio composition files that are not identical to the fund portfolios. The supplementary trading information preserves fund portfolio confidentiality while permitting market makers and other traders in these non-transparent exchange-traded funds to estimate the costs and risks associated with fund creation and redemption transactions of various sizes.

77 Claims, 18 Drawing Sheets

U.S. PATENT DOCUMENTS

| | | | |
|---|---|---|---|
| 6,236,972 B1 | 5/2001 | Shkedy | |
| 6,418,419 B1 | 7/2002 | Nieboer et al. | |
| 6,564,192 B1 | 5/2003 | Kinney, Jr. et al. | |
| 6,633,949 B2 | 10/2003 | Kuo et al. | |
| 6,879,964 B2 | 4/2005 | Sauter et al. | |
| 6,941,280 B1 | 9/2005 | Gastineau et al. | |
| 7,024,387 B1 | 4/2006 | Nieboer et al. | |
| 7,047,218 B1 | 5/2006 | Wallman | |
| 7,099,838 B1 | 8/2006 | Gastineau et al. | |
| 7,110,974 B1 * | 9/2006 | Rust ................................ | 705/37 |
| 7,305,362 B2 | 12/2007 | Weber et al. | |
| 7,444,300 B1 | 10/2008 | Broms et al. | |
| 7,496,531 B1 | 2/2009 | Gastineau et al. | |
| 7,689,501 B1 | 3/2010 | Gastineau et al. | |
| 2001/0025266 A1 | 9/2001 | Gastineau et al. | |
| 2002/0128947 A1 | 9/2002 | Sauter et al. | |
| 2002/0194107 A1 | 12/2002 | Li et al. | |
| 2003/0177077 A1 | 9/2003 | Norman | |
| 2003/0177086 A1 | 9/2003 | Gomber et al. | |
| 2003/0177126 A1 | 9/2003 | Weingard et al. | |
| 2003/0233302 A1 | 12/2003 | Weber et al. | |
| 2003/0233306 A1 | 12/2003 | Madhavan et al. | |
| 2004/0044609 A1 | 3/2004 | Moore | |
| 2004/0073506 A1 | 4/2004 | Tull, Jr. et al. | |
| 2004/0143525 A1 | 7/2004 | Nishimaki | |
| 2004/0186803 A1 | 9/2004 | Weber et al. | |
| 2004/0210502 A1 | 10/2004 | Madhavan et al. | |
| 2004/0215549 A1 | 10/2004 | Madhavan et al. | |
| 2004/0236636 A1 | 11/2004 | Lutnick et al. | |
| 2004/0243502 A1 | 12/2004 | Slowik et al. | |
| 2005/0027638 A1 * | 2/2005 | Ng et al. ......................... | 705/37 |
| 2005/0108146 A1 | 5/2005 | Bond | |
| 2005/0149426 A1 | 7/2005 | Jokisch et al. | |
| 2005/0262010 A1 | 11/2005 | Tull et al. | |
| 2006/0026091 A1 | 2/2006 | Keen et al. | |
| 2006/0059078 A1 | 3/2006 | Courbois et al. | |
| 2006/0100955 A1 | 5/2006 | Baldassini et al. | |
| 2006/0167786 A1 | 7/2006 | Gambir et al. | |
| 2007/0027790 A1 | 2/2007 | Gastineau | |
| 2008/0195553 A1 | 8/2008 | Umlauf | |
| 2009/0182684 A1 | 7/2009 | Shalen | |
| 2011/0047093 A1 | 2/2011 | Faust, Jr. | |

OTHER PUBLICATIONS

Cremers et al. "How Active is Your Fund Manager? A New Measure that Predicts Performance", The Review of Financial Studies, vol. 22,No. 9(2009):3329-3365 http://rfs.oxfordjournals.org/content/22/9/3329.full.pdf.

Gastineau, Gary L., "Protecting Fund Shareholders From Costly Share Trading," Financial Analysts Journal, May/Jun. 2004a, 22-32 (available at http://www.etfconsultants.com/Protecting%/20Fund%20Shareholders%20FAJ.pdf).

Gastineau, Gary L., "Reinventing the Mutual Fund: An Essential Piece of Financial Engineering" ETF Consultants, Working Paper, Feb. 25, 2005, 32 pgs.

Alexander et al., "Does Motivation Matter When Assessing Trade Performance? An Analysis of Mutual Funds", Working Paper, Feb. 28, 2006, 39 pgs.

Harlow et al., "The Right Answer to the Wrong Question: Identifying Superior Active Portfolio Management" Journal of Investment Management, vol. 4, No. 4, 2006, pp. 1-26.

"Standard & Poor's Depositary Receipts: SPDR Trust, Series 1 Prospectus" American Stock Exchange, http://www.amex.com/etfpros/spdr.PDF, Jan. 26, 2007, 84 pgs.

"Trading Strategies" Turbo Trade.com, http://www.turbotrade.com/content/view/116/94 (last reviewed Jul. 18, 2008).

Leblanc, Sydney; Article "Do You Know Them?" publishedon Wall Street, Oct. 1, 2004. p. 1*.

Federal Register, vol. 75. No. 44, Monday, Mar. 8, 2010, Notices http://edocket.accecc.gpo.gov/2010/pdf/2-010-4764.pdf.

Kelly,Susan, "Count ETFs in 401(k)s," Treasury & Risk, (Oct. 2009): p. 21, http://beta.treasuryandrisk.com/2009/10/01/count-etfs-in401(k)s.

Wermers et al., "The Investment Value of Mutual Fund Portfolio Disclosure", Working Papers, Oct. 2006, 59 pgs.

Securities and Exchange Commission, Concept Release Actively-Managed Exchange-Traded Traded Funds, 17 CFR Part 270, Release No. IC-25258; File No. S7-20-011 (available at http://www.sec.gov/rules/concept/ic-25258.htm).

Securities and Exchange Commission, Comments on Concept Release Actively-Managed Exchange-Traded Funds, 17 CFR Part 270, Release No. IC-25258; File No. S7-20-011 (available at http://www.sec.gov/rules/concept/s72001.shtml).

Comments of Paul Charbonnet, Investors FastTrack, Baton Rouge, La., Dec. 12, 2002 (available at http://www.sec.gov/rules/concept/s72001/pcharbonnet1.txt).

Comments of Pascal Redding, Jun. 6, 2002 (available at http://www.sec.gov/rules/concept/s72001/pedding1.txt).

Comments of John White, May 4, 2002, (available at http://www.sec.gov/rules/concept/s72001/white1.txt).

Comments of R. Sheldon Johnson, Managing Director, Morgan Stanley & Co. Incorporated, May 3, 2002 (available at http://www.sec.gov/rules/concept/s72001/johnson1.html).

Comments of Charles M. Bartlett Jr., May 2, 2002 (available at http://www.sec.gov/rules/concept/s72001/bartlett.txt).

Comments of Michael J. Ryan, Jr., Executive Vice President and General Counsel, The American Stock Exchange, LLC, Mar. 5, 2002 (available at http://www.sec.gov/rules/concept/s72001/ryan1.htm).

Comments of Stanley Keller, Chair, Committee on Federal Regulation of Securities; Diane E. Ambler, Chair, and Jay G. Baris, Vice-Chair, Subcommittee on Investment Companies and Investment Advisers, Section of Business Law of the American Bar Association, Feb. 1, 2002 (available at http://www.sec.gov/rules/concept/s72001/keller1.htm).

Comments of Robert M. Steele, Executive Vice President, Rydex Global Advisors Inc., Jan. 31, 2002 (available at http://www.sec.gov/rules/concept/s7200/steele1.htm).

Comments of Mike Schoren, Jan. 20, 2002 (available at http://www.sec.gov/rules/concept/s72001/schoren1.txt).

Comments of Gary L. Gastineau, Managing Director, Nuveen Investments, Jan. 14, 2002 (available at http://www.sec.gov/rules/concept/s72001/gastineau1.htm).

Comments of Joel Greenberg, Managing Director, Susquehanna International Group, Jan. 14, 2002 (available at http://www.sec.gov/rules/concept/s72001/greenberg1.htm).

Comments of Austin J. Fleites, Principal, State Street Bank and Trust Company, Jan. 14, 2002 (available at http://www.sec.gov/rules/concept/s72001/fleites1.htm).

Comments of Richard F. Morris, Senior Counsel, Barclays Global Investors, Jan. 11, 2002 (available at http://www.sec.gov/rules/concept/s72001/morris1.htm).

Comments of Ivar Bjornstad, President, Shoreland Partners LLC, Jan. 11, 2002 (available at http://www.sec.gov/rules/concept/s72001/bjornstad1.htm).

Comments of Kriya Inc., Jan. 8, 2002 (available at http://www.sec.gov/rules/concepts72001/goff1.htm).

Comments of Stacy W. Goff, Vice President and Assistant General Counsel, CenturyTel, Inc., Jan. 7, 2002 (available at http://www.sec.gov/rules/concept/s72001/goff.htm).

"ITG ACE—Agency Cost Estimator: A model Description", Investment Technology Group, Inc. Oct. 31, 2007, 70 pgs.

Lee, Charles M.C., "Market Integration and Price Execution for NYSE-Listed Securities", The Journal of Finance, vol. XLVIII, No. 8, Jul. 1993, pp. 1009-2038.

Thirumalai, Ramabhadran S., "Active vs. Passive ETSs", Indiana University, Working Paper, Aug. 27, 2003, 41 pgs.

"Summary Judgement Ruling in *American Stock Exchange* vs *Mopex,Inc.*"United States District Court, Southern District of New York 00 Civ. 5943 (SAS), Feb. 4, 2003, 23 pgs.

Chapman, Peter; Cover Story; "Converge & Diverge", Trader Magazine, Apr. 2011; (available at http:tradermagazine.com/issue/24_321/ems-nangalia-woodbine-realtick-107422-,,,).

Coppejans, Mark and Ananth Madhavean, "The Value of Transaction Cost Forecasts: Another Source of Alpha" Journal of Investment Management, vol. 5 No. 1, (2007): 65-78. http://papers.ssrn.com/sol3/papers.cfm?abstract id-972184.

Chalmers, John M.R., Roger M. Edelen and Gregory B. Kadlec, "On the Perils of Financial Intermediaries Setting Security Prices: The Mutual Fund Wild Card Option," The Journal of Finance, vol. LVI, No. 6, (Dec. 2001a):2209-2236.
http://odin.lcb.uoregon.edu/jchalmer/2209-2236.pdf.
Ciccotello, Conrad, S. Roger M. Edelen, Jason T. Greene and Charles W. Hodges, "Trading at Stale Prices with Modern Technology: Policy Options for Mutual Funds in the Internet Age," Virginia Journal of Law and Technology, 6 (2002): 1-31.
http://vjolt.net/vol7/issue3/v7i3_a06_Ciccotello.pdf.
Berk, Jonathan B. and Richard C. Green, "Mutual Fund Flows and Performance in Rational Markets," Journal of Political Economy, vol. 112, No. 6, Dec. 2004, 1269-1295 (available at http://www.journals.uchicaqo.edu/JPE/journal/contents/v112n6.html). An earlier version (Dec. 2002) was published as an NBER working paper (available at http://papers.ssrn.com/sol3/papers.cfm?abstract_id=338881).
Grinold, Richard C. and Ronald N. Kahn, 'Active Portfolio Management', Second Edition, (2000), McGraw-Hill. The whole book.
Harris, Larry, Trading and Exchanges: Market Microstructure for Practitioners, Oxford University Press, 2003. The whole book.
Bernstein, Peter, "What's It All About, Alpha?", Institutional Investor, May 2004, 48-52.
Chen, Joseph, Harrison Hong, Ming Huang and Jeffrey Kubik, "Does Fund Size Brode Performance? Liquidity, Organizational Diseconomies and Active Money Management," Working Paper, Sep. 2002 and May 2004. (available at http://www.rcf.use.edu~josephsc/files/fundsize.pdf).
Clark, Andrew, "For Benchmark-Beating Funds, Does Fund Size Affect Performance?", Lipper Research Study, Jan. 5, 2004 (available at http://www.researeh.lipper.wallst.com/researchStudies Overview.asp).
Edelen, Roger M.,Investor Flows and the Assessed Performance of Open-End Mutual Funds, Journal of Financial Economics 53,1999, 439-466.
Gastineau, Gary L., The Exchange-Traded Funds Manual, 2002b, John Wiley & Sons. The whole book.
Gastineau, Gary L., "Protecting Fund Shareholders From Costly Share Trading," Financial Analysts Journal, May/Jun. 2004a, 22-32 (available at http://www.etfconsultants.com/Protecting%20Fund%20Shareholders%20FAJ.pdf).
Greene, Jason T., and Charles W. Hodges, "The Dilution Impact of Daily Fund Flows on Open-End Mutual Funds," Journal of Financial Economics, vol. 65, No. 1, Jul. 2002, 131-158.
Gastineau, GaryL., and Craig J. Lazzara, "Reinventing the Investment Fund" fro The Investment Think Tank: Theory, Strategy, and Practice for Advisers. Harold Evensky and Deena Katz, editors, Bloomberg 2004, 153-178. Also appeared in Bloomberg Wealth Manager under the title of "Extreme Makeover," Nov. 2004, 57-68.
Johnson, Wooddrow T., "Predictable Investment Horizons and Wealth Transfers among Mutual Fund Shareholders," Journal of Finance, Oct. 2004, 1979-2012.
Porter, Michael, "The Future Is Now: The AMEX's Solution to the Active ETF Riddle," Lipper Fund Industry Insight Reports, Dec. 6, 2004, (available at http://www.research.lipper.wallst.com/fundIndustryOverview.asp;$15 payment required to view article).
Porter, Michael "Gary Gastineau on Why Actively-Managed Exchange-Traded Funds Can Be the Greatest Thing Since Money Market Funds," Lipper Fund Industry Insight Reports, Nov. 30, 2004, (available at http://www.research.lipper.wallst.com/fundIndustryOverview.asp, $15 payment required to view article).
Stein, Jerem C., "Why Are Most Funds Open-End? Competition and the Limits of Arbitrage," Working Pwer, Jan. 2004, Harvard University (available at http://post.economics.harvard.edu/faculty/stein/papers/OpenEndJanO4revision.pdf).
The NASDAQ Closing Cross, 2 pgs.
Baldwin, William, "How to Profit From Single-Stock Futures," Forbes Magazine (Apr. 7, 2010). http://www.forbes.com/2010/04/07/dividend-tax-futures-personal-finance-capital-gains.html.
Baldwin, William, "They're Clipping Your Dividends," Forbes Magazine, (Apr. 26, 2010). http://www.forbes.com/forbes/2010/0426/opinions-william-baldwin-obama-dividend-tax-side-lines.html.
Bookstaber, Richard, A Demon of Our Own Design: Markets, Hedge Funds, and the Perils of Financial Innovation, Hoboken, NJ: John Wiley & Sons, 2007: 225-226.
Broms, T. J., and Gary L. Gastineau, "The Development of Improved Exchange-Traded Funds (ETFs) in the United States," in New Financial Instruments and Institutions, eds. Y. Fuchita and R. E. Litan. Washington. DC: The Brookings Institution, 193-209, and also in A Guide to Exchange-Traded Funds and Indexing Innovations, 6th ed. New York: Institutional Investor (2007), 16-26. http://www.etfconsultants.com/images/Brookings_Institution_2.pdf.
Cano, Guillermo, Barry E. Feldman, and Joseph Smith, "ETFs, Swaps, and Futures: Trade at Index Close (TIC) and the Coevolution of Financial Markets," Institutional Investor, (Fall 2009): 50-58.
Dick, Dennis, "The Tracks of My Tiers," CFA Magazine, (Jul.-Aug. 2010), vol. 21, No. 4: 30-31.
Gastineau, Gary L., and Mark Kritzman, Dictionary of Financial Risk Management, Frank J. Fabozzi Associates, Hoboken, NJ: John Wiley & Sons, 1996 and 1999: 22 and 32.
Gastineau, Gary L. The Exchange-Traded Fund Manual. Hoboken, NJ: John Wiley & Sons, 2002, Second edition, 2010.
Gastineau, Gary L. Someone Will Make Money on Your Funds— Why Not You?: Better Way to Pick Mutual and Exchange-Traded Funds. Hoboken, NJ: John Wiley & Sons, 2005.
Gastineau, Gary L., "The Cost of Trading Transparency: What We Know, What We Don't Know, and How We Will Know," Journal of Portfolio Management, (Fall 2008):72-81.
FA News; ETFs Shunned by Many 401(k) Plans; Aug. 4, 2010 http://www.fa-mag.com/fa-news/5894-etfs-shunned-by-many-401k-plans.html?tmpl=component&print=1....
Hougan, Matt, "The Flaws in iNAV," Exchange-Traded Funds Report (ETFR), (Jul. 2009): 5-10.
ICE Futures U.S., TIC Trading, (Jan. 2009): v1.3. https://www.theice.com/publicdocs/futures_us/TIC_FAQ.pdf.
IndexUniverse.com—Data Tool—http://www.indexuniverse.com/data/data.html.
Linnainmaa, Juhani T., "Do Limit Orders Alter Inferences about Investor Behavior?," Journal of Finance, (Aug. 2010): 1473-1506.
Melas, Dimitris and Xiaowei Kang, "Applications of Systemic Indexes in the Investment Process," Journal of Indexes, (Sep./Oct. 2010):10-18.
Nasdaq Closing Offset Orders http://www.nasdaqtrader.com/content/ProductsServices/Trading/Crosses/ccfactsheet.pdf.
NYSE Area Closing Trades.
NYSE Rule 2009-111 Refile.
NYSE Rule 2010-14, 75 FR 10538 Mar. 8, 2010.
Prestbo, John, A., The Market's Measure, New York, Dow Jones, 1999, p. 23.
Trade Management Guidelines http://www.cfainstitute.org/ethics/codes/trade/Pages/index.aspx.
Advanced Trading, Sep. 2010. http://i.cmpnet.com/financetech/downioad/AT_Digital-Issue_2010_09.pdf.

* cited by examiner

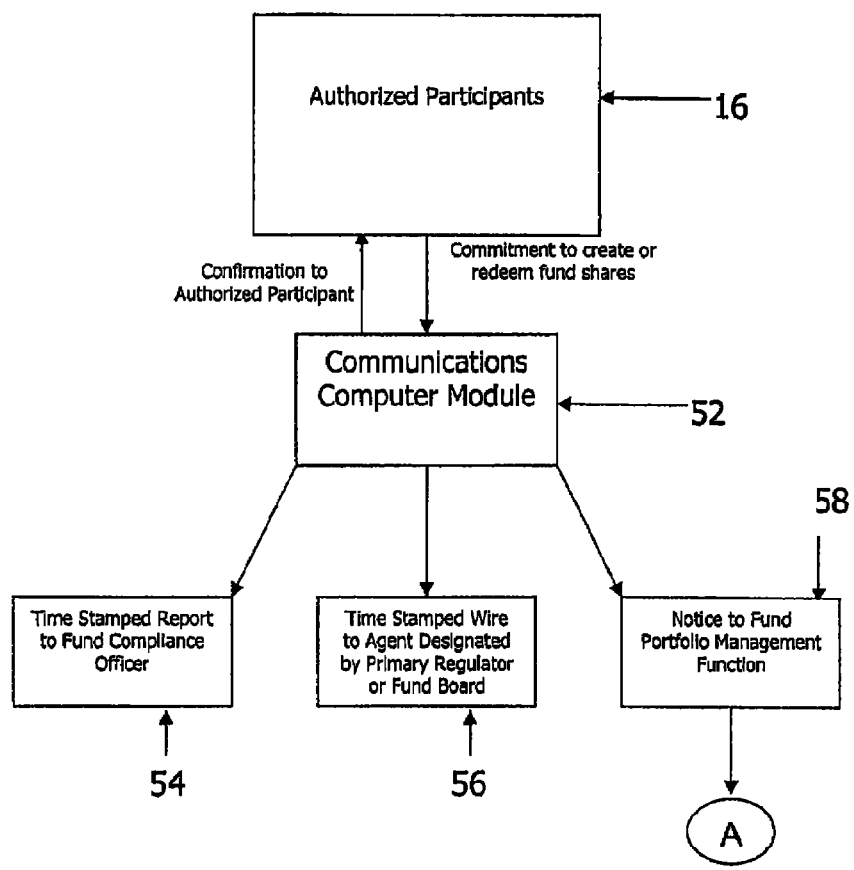

| | |
|---|---|
| Symbol | ☐ 1502 |
| Extension | ☐ 1504 |
| Instructions | ☐ 1506 |
| Transaction Size | ☐ 1508 |
| Price | ☐ 1510 |
| Limit Price | ☐ 1512 |

SUBMIT 1514

1500

| | |
|---|---|
| Symbol | SPY 1502 |
| Extension | VW 1504 |
| Instructions | BUY 1506 |
| Transaction Size | 1000 1508 |
| Price | 100.05 1510 |
| Limit Price | $131.00 1512 |

SUBMIT 1514

FIG. 15B

METHODS, SYSTEMS, AND COMPUTER PROGRAM PRODUCTS FOR FACILITATING NON-TRANSPARENT EXCHANGE-TRADED FUND SHARE CREATIONS AND REDEMPTIONS WITH OPTIONAL EARLY CUTOFF TIMES

CROSS REFERENCE TO RELATED APPLICATIONS

The present application is a continuation-in-part of U.S. Non-Provisional Patent application Ser. No. 12/056,980, entitled Methods, Systems, and Computer Program Products for Providing Risk Management Information and Tools to Traders in Fund Shares, filed on Mar. 27, 2008 now U.S. Pat. No. 8,131,621, which claims priority to U.S. Provisional Patent Application No. 60/907,283, filed on Mar. 27, 2007, and is a continuation-in-part of pending U.S. patent application Ser. No. 11/714,923, filed on Mar. 7, 2007 now U.S. Pat. No. 7,496,531, which is a continuation-in-part of pending U.S. patent application Ser. No. 11/141,243, filed on May 31, 2005 now U.S. Pat. No. 7,444,300, the disclosures all of which are incorporated herein by reference in their entirety.

BACKGROUND OF THE INVENTION

1. Field of the Invention

The invention relates generally to financial services, and in particular, to the calculation of risk management and trading cost information for traditional and non-traditional markets.

2. Background Art

The risk management tools and techniques available to market makers and other traders in financial markets have been either rudimentary or based on well-established models. Walrasian call markets, where traders enter bids and offers at a specified time to permit all market participants to see and react to the bids and offers of their peers, rarely attract market makers. A market clearing price is obtained quickly in these markets and any inter-temporal market making activity is limited. In the more complex continuous auction market model, buyers and sellers enter bids and offers during a trading session for interaction with other bids and offers. The primary role of the market maker in a continuous auction market is to trade with both buyers and sellers, providing liquidity when it is needed and, generally, dampening price fluctuations by intermediating transactions over time.

A Walrasian call market is used where trading volumes are light and there is little or no need for continuous liquidity and little or no formal market making. The continuous auction market is the standard for most global securities and futures markets. Market maker risk management in these markets is well developed. At the most elementary level, a market maker's risk management consists of position control. By limiting the size of a position, the market maker will limit its exposure to price risk by minimizing the size of its net long or net short position. At the next level of risk management complexity, the market maker will hedge a long or short position by taking a risk-offsetting position in a return-correlated instrument in a related market. As markets have become increasingly sophisticated, as trading hours have expanded, as the geographic locations of trading venues for similar or identical items have become more dispersed, and as electronic markets have reduced order pendency times and direct human involvement in market making, the risk management function has become more complex, more automated and, usually, more effective. Effective risk management now includes management of exposures to price fluctuations in particular markets, limitations on exposures to related risk categories and protection from a variety of risks that are not directly linked to the items in the market maker's trading inventory.

On balance, the availability of a growing number of traded items with differently correlated risks, longer trading hours, and more dispersed markets has stimulated the development of sophisticated computer-based aggregate risk management techniques. Sophisticated systems facilitate better hedging of individual risks and cross-hedging of similar risks in a variety of markets worldwide. With specific reference to the products and markets considered herein, the hedging practices of market makers in exchange-traded funds and in most types of securities these funds hold have increasingly focused on reducing hedging costs by using low market impact portfolio risk management instruments rather than specific security-by-security risk offsets.

Non-traditional market structures that depart in material ways from the Walrasian and simple instrument continuous auction market models are also changing the nature of market maker risk management. The nature of the risks market makers encounter in new products and nontraditional markets and the tools market makers use to manage their risks have changed in important ways. The introduction of new order types, new financial instruments and new transaction processing features that permit electronic exchange trading at or relative to a price to be determined in the future require new kinds of information and new risk management tools. There is, therefore, a need for risk management tools and information for market makers and other market participants trading actively managed and non-transparent index exchange-traded funds in traditional continuous auction markets and in markets where the actual transaction price is contingent on a net asset value to be determined at a specified time under specified conditions.

BRIEF SUMMARY OF THE INVENTION

Accordingly, the present disclosure introduces methods, systems, and computer-program products for providing risk information and cost estimation tools to traders in exchange-traded fund shares.

According to various embodiments of the disclosed processes, supplemental information is developed, calculated, and published to support trading in exchange-traded funds with portfolios that are not totally transparent and that use portfolio composition files that are not identical to the fund portfolios. In an embodiment, the supplementary trading information preserves fund portfolio confidentiality while permitting market makers and other traders in these non-transparent exchange-traded funds to estimate the costs and risks associated with fund creation and redemption transactions of various sizes.

Further embodiments, features, and advantages of the present inventions, as well as the structure and operation of the various embodiments of the present invention, are described in detail below with reference to the accompanying drawings.

FEATURES OF THE INVENTION

1. Information to support trading in non-transparent funds
   a. With early creation/redemption cutoff and fund trading between the commitment to creation or redemption and pricing of the fund portfolio and creation/redemption baskets;
   b. Use of a pre-trade transaction cost model to estimate transaction costs that will be incurred by a trader or market maker in creation or redemption; and c. PACT, PACT Variability, DEMI PACT, DEMI PACT Variability calculations.

2. Outperformance
  a. Versus benchmark index and PCF; and
  b. Versus combinations of indexes 3. Calculate and publish trader support calculations for various numbers of creation units.

4. Report actual transaction costs incurred by market maker(s) in creation or redemption of ETF shares.

5. Delivery of data.

6. Use of transaction cost estimates to determine a transaction fee charged to an Authorized Participant.

BRIEF DESCRIPTION OF THE DRAWINGS

The accompanying drawings, which are incorporated herein and form a part of the specification, illustrate one or more embodiments of the present invention and, together with the description, further serve to explain the principles of the invention and to enable a person skilled in the pertinent art to make and use the invention.

FIG. 2A is a flow diagram of the communications and control system used to implement and ensure compliance with creation-redemption cut-off time notification requirements.

FIGS. 15A and 15B illustrate an exemplary computer interface through which an order for a financial instrument may be entered onto an exchange or an ECN in accordance with an embodiment of the present invention.

DETAILED DESCRIPTION OF THE INVENTION

Figure 1:
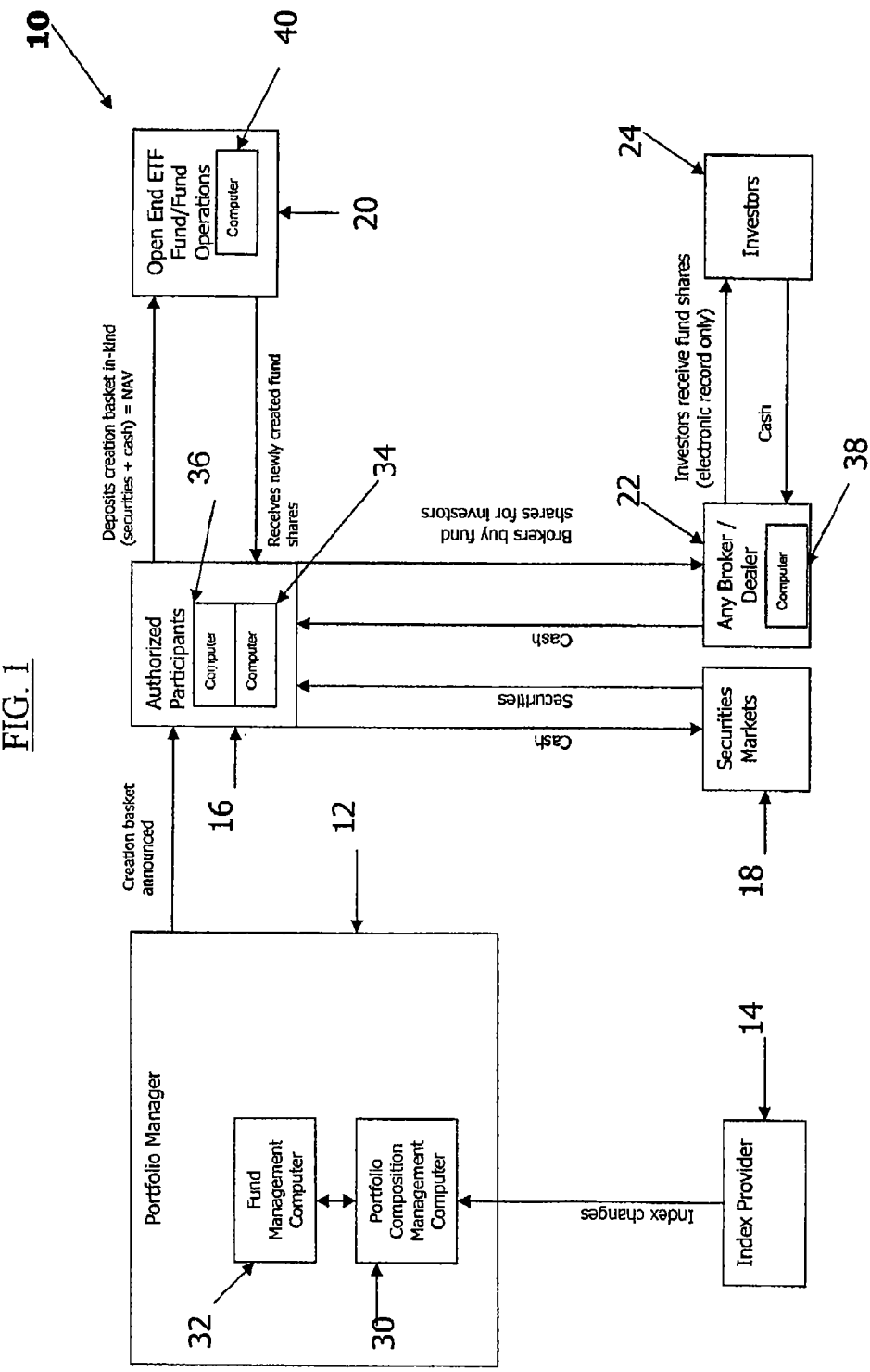
FIG. 1 is a block diagram of the systems used in the creation process for exchange-traded funds according to the present invention.

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

EXAMPLE 1

Methods and Systems for Improved Fund Investment and Trading Processes

This embodiment consists of major and several subsidiary components implemented through a variety of separate and related computer systems for the fund. These components may be used either individually or in a variety of combinations to achieve the joint objectives of protecting fund investors from the costs of providing liquidity to fund share traders, increasing the effectiveness of the portfolio management process and providing a new and improved way to trade exchange-traded fund shares on a secondary market. A number of the components of this embodiment have more than one effect (e.g., shareholder protection plus improved portfolio management procedures). Each component can be implemented separately and is generally beneficial to fund shareholders even if the other components are not implemented at the same time or to the full extent described herein.

Certain components of this embodiment improve expected performance and offer other advantages for investors in both AMETFs with a full active management investment process and a new kind of indexed ETF. This new kind of indexed ETF uses traditional indexing techniques but the index composition changes are not disseminated to the marketplace until after the fund portfolio manager has had an opportunity to change the fund portfolio to reflect any index changes. For the protection of investors, the portfolios of these new index funds are less transparent than the portfolios of existing benchmark index ETFs, but these funds are otherwise similar to other indexed ETFs. These funds can benefit from the same components of the present invention as the fully active AMETFs principally described herein. Consequently, these new index funds are covered by the description and claims as an AMETF variant. The Securities and Exchange Commission has indicated that these new index funds will be considered actively-managed funds for regulatory purposes. The secondary market trading system that is a component of this embodiment is a useful method for secondary market trading of any securities basket product including existing index ETFs, HOLDRs (trust-issued receipts that represent beneficial ownership of a specified group of stocks), BLDRs (unit investment trust portfolios of publicly traded Depositary Receipts) and structured notes linked to a multi-security index or basket as well as the AMETFs described herein.

In this Application, the ETF Share Class is sometimes referred to as the General Class of Fund Shares or Redeemable Shares to emphasize specific characteristics. The terms are interchangeable. A Business Day is any day the securities markets are open. Ordinarily a Business Day ends at 4:00 p.m. Eastern Time in United States securities markets, but some or all markets may close earlier on occasion, usually on the day before a holiday.

Features of this Embodiment that Primarily Protect Investors from Costs of Fund Share Trading 1. Early cut-off times for orders to purchase and redeem AMETF and ETF shares.

2. Entry and exit of investors through an ETF Share Class or an equivalent process to protect ongoing shareholders from the cost of providing liquidity to fund share traders.

Features of this Embodiment that Primarily Improve the Effectiveness of the Portfolio Management Process 3. Conversion of the ETF Share Class to and from Specialized Share Classes which, among other features, provide low-cost investment management services to institutional investors and convenience to individual investors who want to pay their advisors in a tax efficient way.

4. Less frequent intra-day dissemination of a precise AMETF portfolio valuation proxy.

5. Improving AMETF investor returns by concentrating portfolio manager effort on controlled-size funds; capping the assets the manager will accept for specific fund strategies and providing for a higher management fee on capped funds that perform well.

6. Organization of the AMETF investment manager to concentrate portfolio management efforts on the management of fund portfolios to reduce leakage of investment information by restricting the investment manager's activities. Voluntary lagged portfolio disclosure may be made more frequently than required.

The Secondary Market Fund Share Trading System Feature of this Embodiment

7. A trading system for AMETFs and other exchange-traded fund shares and basket instruments that parallels the traditional method for purchase and sale of conventional mutual funds at Net Asset Value (NAV) without compromising the investor protection provided by the exchange-traded fund creation and redemption structure.

FIG. 1 shows a generalized fund share creation system 10 which allows for the creation of an actively managed exchange traded fund (AMETF) and a new type of indexed exchange traded fund (ETF). The overall system 10 includes the actions of a portfolio manager 12 that manages the fund. The currently available indexed exchange-traded funds are benchmarked to an index such as standard published benchmark indexes including the Standard & Poors 500, the Russell 2000 and a variety of other domestic and international equity and fixed income indexes calculated and maintained by an index provider 14. Changes are made to such indexes from time to time and the changes are published widely. Changes in the indexes used for the improved indexed ETFs covered by the present invention will be communicated to the portfolio manager 12 confidentially by the index provider 14 or developed internally by the portfolio manager 12. If the fund is actively managed, or if the index is developed internally, the portfolio manager will determine any portfolio changes inside the portfolio manager 12. The system 10 also includes authorized participants 16, securities markets 18, a fund 20, broker/dealers 22 and investors 24.

The portfolio composition changes initiated by either the portfolio manager 12 or the index provider 14 are entered into a portfolio composition management computer 30 which is coupled to a fund management computer 32. The index changes for the improved index fund are not published to the world until after the fund has had an opportunity to implement the index changes in the portfolio. The portfolio composition changes to any AMETF including the new indexed ETFs need not be revealed except as required by regulators. The fund portfolio composition management computer 30 manages the relative weighting of positions in the portfolio and the fund management computer 32 translates the desired composition into creation and redemption baskets and orders to buy and sell securities for the portfolio. The fund management computer system 32 is also designed to ensure compliance with the cut-off times for fund trading and to provide an audit trail for the creation and redemption of fund shares as explained below. Links to and from the systems for monitoring and implementing creation and redemption orders are not shown in FIG. 1. It should be noted that the computer systems 30 and 32 and other computer systems described herein may be different groups of networked computers spread out over different locations.

The portfolio manager 12 supervises the daily process of determining Portfolio Composition Files (PCFs) reflected in the fund's published creation and redemption baskets. These creation and redemption baskets are published each day in advance of the start of trading of shares in the fund. The authorized participants 16 have a series of trading and trading management computers 34 that allow the exchange of securities, fund shares, and cash between the authorized participants 16 and the securities markets 18, broker/dealers 22 and the fund and fund operations 20. The authorized participants 16 each have a back office computer system 36 that performs functions such as confirming trades, accounting and risk management. The broker/dealers 22 each have a trading computer system 38 that facilitates trading and record-keeping in a variety of ways such as performing position management, billing and ensuring compliance with market rules. All of the transactions described herein are completed electronically via network connections including proprietary networks and the Internet.

The authorized participants 16 may create shares in the fund by depositing a creation basket of securities (plus or minus a cash amount) in exchange for shares of the General Class of Fund Shares or redeem shares by depositing some of the General Class of Fund Shares in exchange for a redemption basket of securities (plus or minus a cash amount). The authorized participants 16 are broker-dealers and can include market makers and arbitrageurs. The market makers create and redeem shares to manage their inventories of fund shares whereas arbitrageurs hope to profit from small pricing differences between the price of the General Class of Fund Shares and the cost of creating or disposing of a creation or redemption basket. The authorized participants 16 have entered into agreements with industry transaction clearing organizations and agents of the fund whereby they agree to certain conditions in the creation or redemption of fund shares. The authorized participants 16 transact in the securities markets 18 to acquire the securities that typically make up part of the creation basket.

New shares of the General Class of Fund Shares of the fund 20 are created when an authorized participant 16 deposits one or more creation baskets which consist of securities designated by the portfolio manager 12 as a Portfolio Composition File (PCF) and a cash balancing amount which may be a payment to or a payment received from the fund. In return for a creation deposit, an authorized participant 16 receives newly created fund shares from the fund 20. A variety of internal and external computer systems allow the authorized participants 16 to deal in the secondary market for securities with other broker-dealers 22 or directly or indirectly with investors 24. The portfolio manager 12 uses the fund portfolio composition management computer 30 and the fund management computer system 32 to make appropriate changes to the creation basket reflecting desired changes in the basket of securities to be received in a creation. The portfolio manager 12 also distributes the creation and redemption baskets to the authorized participants 16, and a variety of market data vendors (not shown). This information is typically distributed through the National Securities Clearing Corporation (NSCC), an industry utility which is a subsidiary of the Depository Trust and Clearing Corporation (DTCC). This industry utility also distributes an intra-day net asset value proxy to market participants through market data vendors. The fund management computer system 32 also handles a variety of accounting and operating functions including the generation of buy and sell orders for the fund's portfolio and generation of instructions for the fund's custodian and transfer agent functions, as subsystems linked to the computer 40 in operations of the fund 20. A similar process (not shown) is used to develop and disseminate the redemption basket and facilitate the fund share redemption process.

The trading and trade management computers 34 facilitate the exchange of securities (including securities represented in the creation and redemption baskets), fund shares and cash between the authorized participants 16 and the securities markets 18, other broker-dealers 22 and the fund 20. The fund management computer system 32, among other functions, initiates and confirms a variety of transactions, and maintains records and appropriate information for an audit trail of all orders entered with and by the fund. The various features of this embodiment of the improved fund will now be described.
Early Cut-Off Times for Orders to Purchase and Redeem AMETF and ETF Shares While the established ETF in-kind creation and redemption structure provides inherent protection from the grosser forms of mispricing and shareholder abuse uncovered in the mutual fund trading scandals, an active fund manager and an astute index fund manager need greater flexibility in managing the portfolio than is inherent in the exchange-traded index fund creation and redemption process as it is used today. Specifically, the necessary and appropriate publication of fully transparent creation and redemption baskets discourages effective implementation of portfolio composition changes by these index funds' managers if the notice of intent to create or redeem does not come early enough to permit the portfolio manager to adjust the portfolio for the effect of creation and redemption trades on the portfolio composition. In addition, the creation and redemption baskets for actively-managed ETFs may not reflect the manager's target fund portfolio as accurately as they typically reflect the composition of a benchmark index ETF. The manager of any exchange-traded fund needs the ability to trade between the time the fund receives notice of an incoming fund share creation deposit or an outgoing redemption basket and the time the net asset value is next calculated. However, as described more fully in Example 4, the present Application encompasses an embodiment that protects ongoing shareholders of a fund from flow costs and allocates the costs of entry and exit to the authorized participants creating or redeeming fund shares without requiring an early commitment to create or redeem the fund's shares.

Except as described in Example 4 where the authorized participant pays a transaction fee, the provisions of this embodiment of the AMETF and ETF require early notice of orders to purchase or redeem shares in the funds. Early notice permits the portfolio manager to adjust the portfolio composition and incorporate the market impact of the entry or exit of shareholders on the prices used to calculate the fund's net asset value (NAV). The entering or leaving shareholders demand liquidity and—with early notice to permit portfolio composition changes—they pay for it indirectly. The portfolio manager's ability to adjust the composition of the fund portfolio after receiving notice of a creation or redemption of shares using previously posted creation and redemption baskets is essential to transferring the costs of entering and leaving the portfolio to the entering and leaving shareholders and relieving the ongoing shareholders of this burden.

In the embodiment of this example, a time between 2:30 p.m. and 3:30 p.m. is listed as the cutoff for purchase or redemption of baskets on Business Days when the market closing is 4:00 p.m. Eastern Time. This time is only an example of what might be an appropriate cutoff time for domestic equity portfolios. The cutoff time range is selected to be an early enough cut-off notice to permit the portfolio manager to adjust the portfolio to an appropriate portfolio composition by the time the market closes. In specific cases, as governed by the prospectus or subject to approval by the fund's board, the fund might set an earlier or a later cut-off time to provide the best possible service to entering and leaving shareholders without compromising the protection of ongoing shareholders. For funds other than domestic equity funds, different cut-off times will be required. In the case of international equity funds, for example, the appropriate early cut-off time for funds holding more than 3% of their assets in stocks traded on one or more primary markets outside the United States, could be 4:00 p.m. on any U.S. Business Day for pricing at the net asset value next determined for the fund after a full trading day in the primary markets for stocks accounting for 97% of the fund's equity portfolio. The 2:30 p.m. creation/redemption cut-off time for domestic equity funds and comparable rules for other types of portfolios solves one of the fund industry's greatest investor protection problems.

The early order cut-off system is illustrated in a flow diagram in FIG. 2A. In this embodiment, the fund shares are exchanged for baskets of securities and cash. The notice by an authorized participant 16 of its commitment to create or redeem fund shares before the posted cut-off time is communicated to the communications computer module 52, which in turn confirms the receipt of a notification to the authorized participant 16 and simultaneously transmits a time-stamped report to a fund compliance officer 54, an agent 56 designated by the primary regulator or by the fund board and the portfolio manager 58. The portfolio manager 58 initiates any necessary portfolio modification transactions. The reports to the fund compliance officer 54 and to the agent 56 designated by the regulator or the fund board insure a record in a form which fund personnel will not be able to tamper with to conceal late entry of creation or redemption orders, thus providing protection from the late-arriving orders that have been a problem for conventional mutual fund shareholders. In the present embodiment, described more fully with respect to Example 4 herein below, the mandatory early order cutoff system will not be in force, the Authorized Participant will be charged a transaction fee and the portfolio composition changes will be made after the market close on the day the creation or redemption transaction is initiated.

Figure 2B:
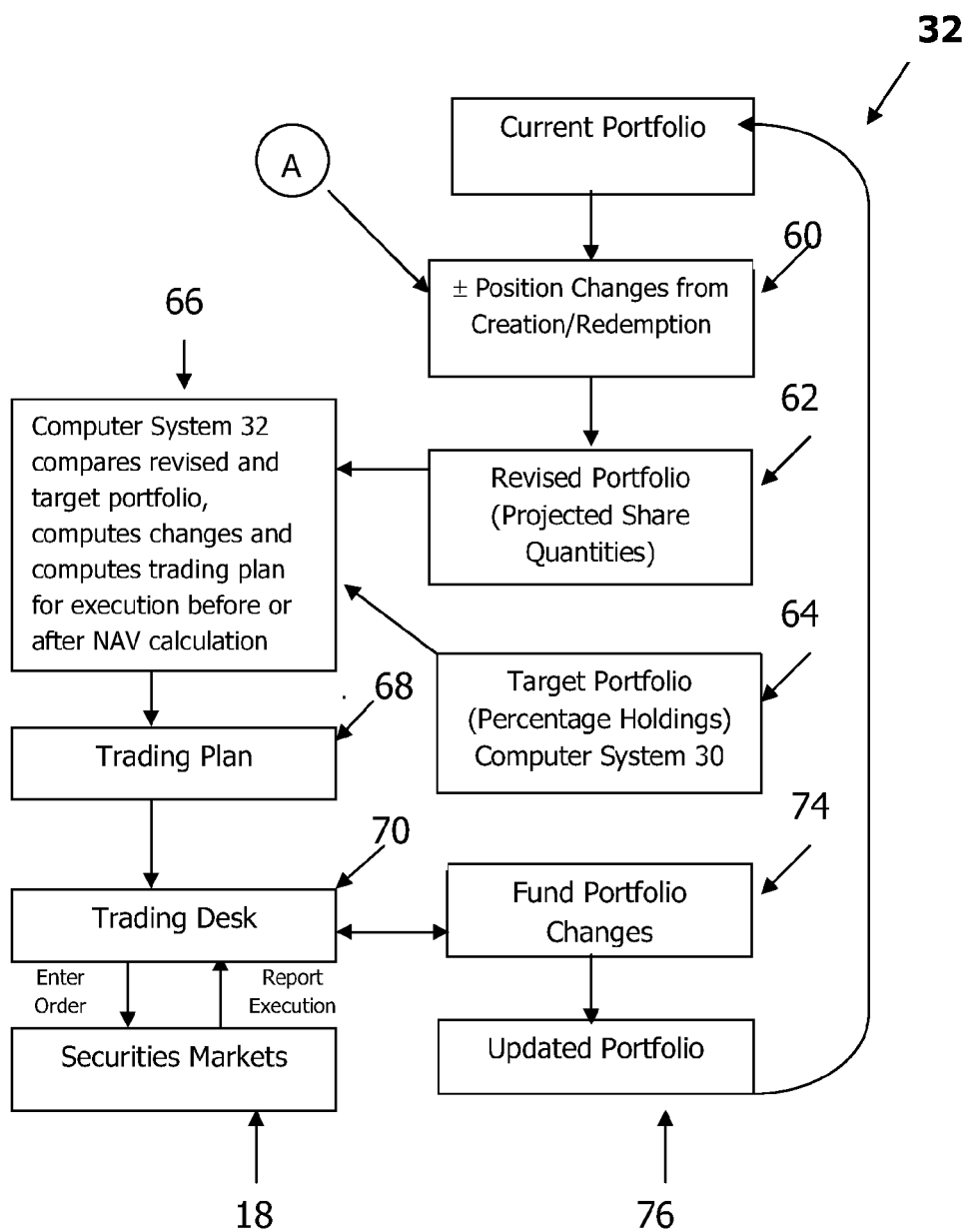
FIG. 2B is a flow diagram reflecting the portfolio and fund management process the portfolio manager uses to respond to a creation or redemption.

The portfolio management response to a creation or redemption order is shown in FIG. 2B. The notice of creation or redemption carries with it information about absolute and relative position changes that result from a creation or redemption. The portfolio position changes that result from the creation or redemption transaction(s) are broken out by the fund management computer 32 and appear in block 60 of FIG. 2B. The revised portfolio 62 is determined by the fund management computer 32 and a target portfolio 64 is created and maintained by the fund portfolio composition management computer 30. The target portfolio 64 reflects the percentage of holdings in each portfolio position developed by the fund portfolio composition management computer 30 and represents what the fund management computer 32 has determined is the appropriate portfolio the fund should hold. At 66, the fund management computer 32 compares the revised portfolio 62 to the target portfolio 64 and generates appropriate orders to buy and sell portfolio securities, developing a trading plan 68 for execution by the trading desk 70. The trading plans are entered by a trading desk 70 (which is controlled by the fund management computer 32) into the transaction process in appropriate securities markets 18. Executions are reported as fund portfolio changes 74 and the updated portfolio 76, becomes the then-current portfolio that is represented at the beginning of the process for the next trading day. Under this component of this embodiment, an active portfolio manager and the manager of an improved index fund are given necessary and appropriate flexibility in managing the portfolio. The publication of totally transparent creation and redemption baskets which reflect the full fund portfolio composition discourages effective confidential implementation of portfolio composition changes by index fund managers. In AMETFs, including the improved ETF index funds, the creation and redemption baskets may not accurately reflect the portfolio manager's target fund portfolio.

Early notice permits the portfolio manager to adjust the portfolio composition and incorporate the market impact of the entry or exit of shareholders on the prices used to calculate the fund's NAV. The entering or leaving shareholders are demanding liquidity and they are indirectly paying for it. The portfolio manager's ability to change the composition of the fund portfolio after receiving notice of creation or redemption of fund shares using previously posted creation and redemption baskets is essential to transferring the costs of entering and leaving the portfolio to the entering and leaving shareholders and relieving the ongoing shareholders of this burden. In the present embodiment the authorized participant is charged a transaction fee that approximates the funds expected cost to modify the portfolio on the day after a commitment to create or redeem fund shares.

Entry and Exit of Investors Through an ETF Share Class or an Equivalent Process to Protect Ongoing Shareholders from the Cost of Providing Liquidity to Fund Share Traders.

Fully effective implementation of the improved fund requires that all entry of assets to and removal of assets from the fund is made through the generalized exchange-traded fund share creation and redemption process described above or a procedure providing equivalent protection for ongoing shareholders. This process protects ongoing fund shareholders from the costs of providing liquidity to entering and leaving shareholders. The late trading and market timing abuses uncovered at many mutual funds since September 2003 would not have been possible if the in-kind creation and redemption process, standard in exchange-traded funds, had been in effect for conventional mutual funds. The general requirement for in-kind creation and redemption not only protects fund shareholders from the cost of providing liquidity to traders by creating a clear audit trail for the order entry process, redemption in-kind (or partly in cash at the option of the fund) offers substantial advantages for taxable shareholders through deferral of capital gains realizations until a shareholder decides to sell fund shares.

Conversion of the ETF Share Class, Upon Shareholder Demand, to Specialized Share Classes A variety of Specialized Share Classes will be available for conversion from and back to the ETF Share Class used for fund shareholder entry and exit. These Specialized Share Classes provide custom management fee and marketing fee arrangements to accommodate different types of shareholders with investment objectives that coincide with the objective pursued by the fund. Among other features, these Specialized Share Classes are structured so that investors pay marketing and management fees in a tax-efficient manner and receive appropriate management fee discounts if they are large investors.

Under the U.S. tax code, separately billed fees paid by individuals for investment management services and various other services provided by financial intermediaries are not fully deductible against ordinary income taxes. For individuals subject to the Alternative Minimum Tax, separately billed fees may not be deductible at all. To preserve as much deductibility as possible, the most tax-efficient way for individuals to pay marketing and management fees is to pay them as management or service fees deducted from the investment income produced by funds in which they own shares. Separately billed marketing fees would similarly not be fully, or perhaps even partly, deductible and thus are often paid more tax efficiently when they are embedded in the cost of the fund and deducted from the income distributed by the fund.

Large institutional investors have more negotiating power than individual investors and traditionally pay lower investment management fees. However, in order to manage portfolios effectively and economically, it is best to bring all types of investors into a single pool rather than manage institutional portfolios separately from individual mutual fund portfolios. Such portfolio consolidation is another part of the purpose behind the use of Specialized Share Classes as explained below. Certain share classes would be available only to investors who were able to invest several million dollars or more in a particular fund. The structure of the share class relationships is shown in FIG. 3 and the computer system for share class conversion is illustrated in FIG. 4.

Figure 3:
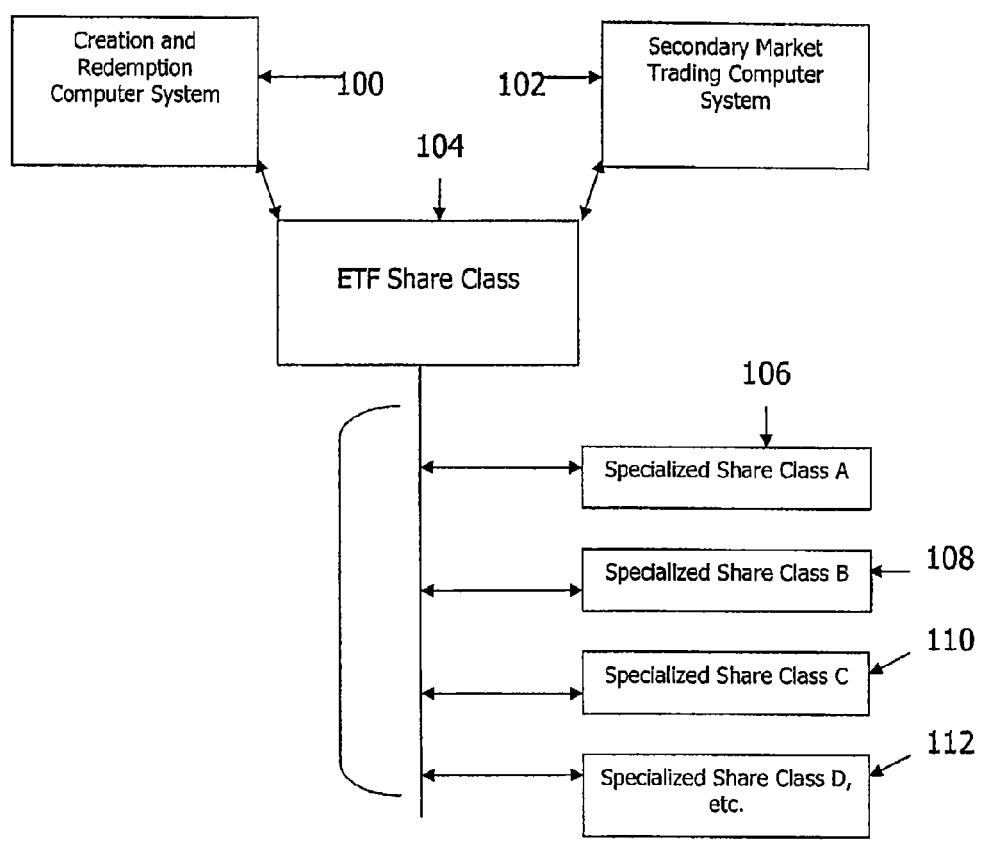
FIG. 3 is a block diagram of the relationship of all share classes.

The share class relationships illustrated in FIG. 3 show an ETF Share Class creation and redemption system 100 similar to the creation side of the system illustrated in FIG. 1, and a secondary market trading computer system 102 which includes functions reflected in the securities markets 18, the trading system 34 of the authorized participants 16 and the trading computer systems 38 of the broker/dealers 22 in FIG. 1. Creation and redemption (entry and exit of assets to and from the fund) involves an ETF Share Class 104. Although the Specialized Share Classes might be traded in a secondary market under some circumstances, the only share class that is ordinarily directly creatable or redeemable in a transaction with the fund is the ETF Share Class. Other share classes might include, as examples, Specialized Share Class A, a front end load share class 106; Specialized Share Class B, a back end load share class 108; Specialized Share Class C, a level load share class 110; and Specialized Share Class D, an institutional share class with a reduced expense ratio 112, for the convenience of various shareholders. Some users of these shares might want to facilitate the payment of a marketing fee to an individual or organization that provides sales and marketing services or advice. Other Specialized Share Classes would provide a variety of embedded marketing and management fees. The share classes A-D are intended to be illustrative, not exhaustive.

Figure 4:
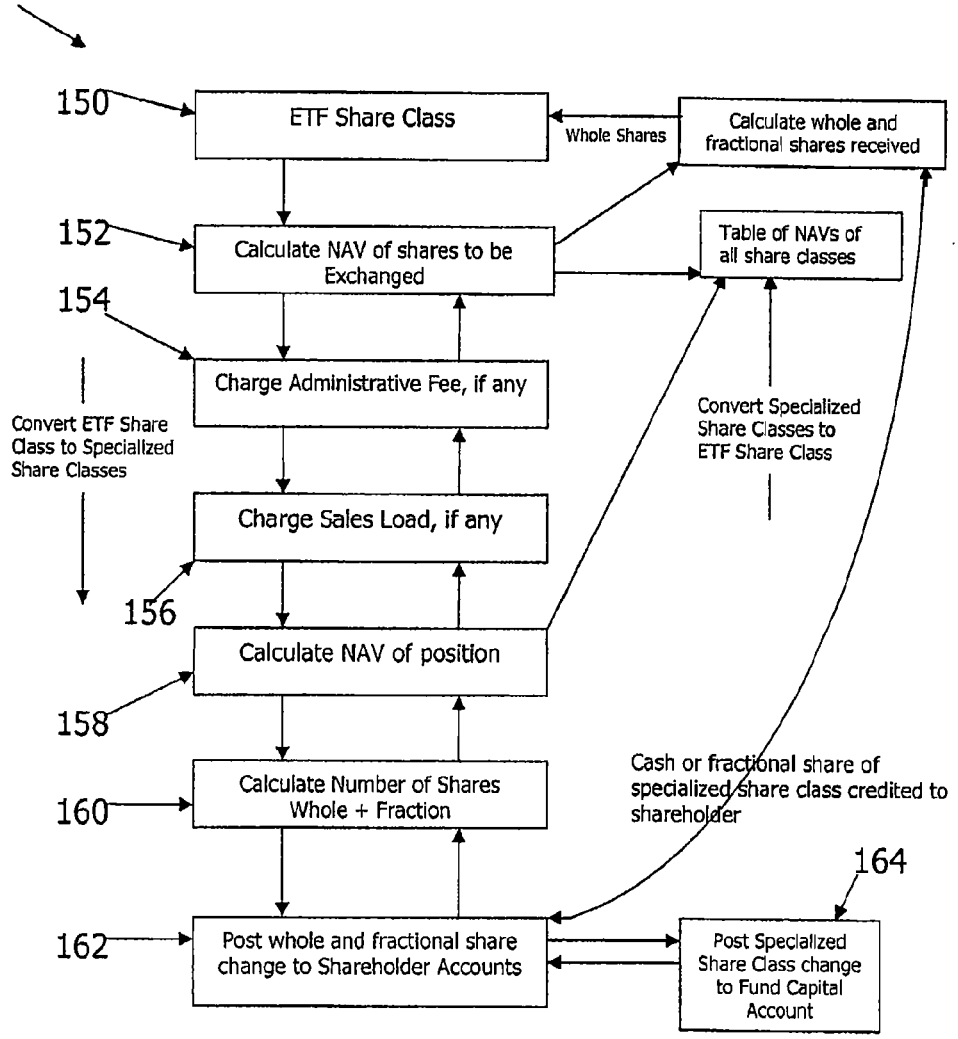
FIG. 4 is a flow diagram of the computerized system for conversion of the General Class of Fund Shares or ETF Share Class to and from Specialized Share Classes.
Figure 5:
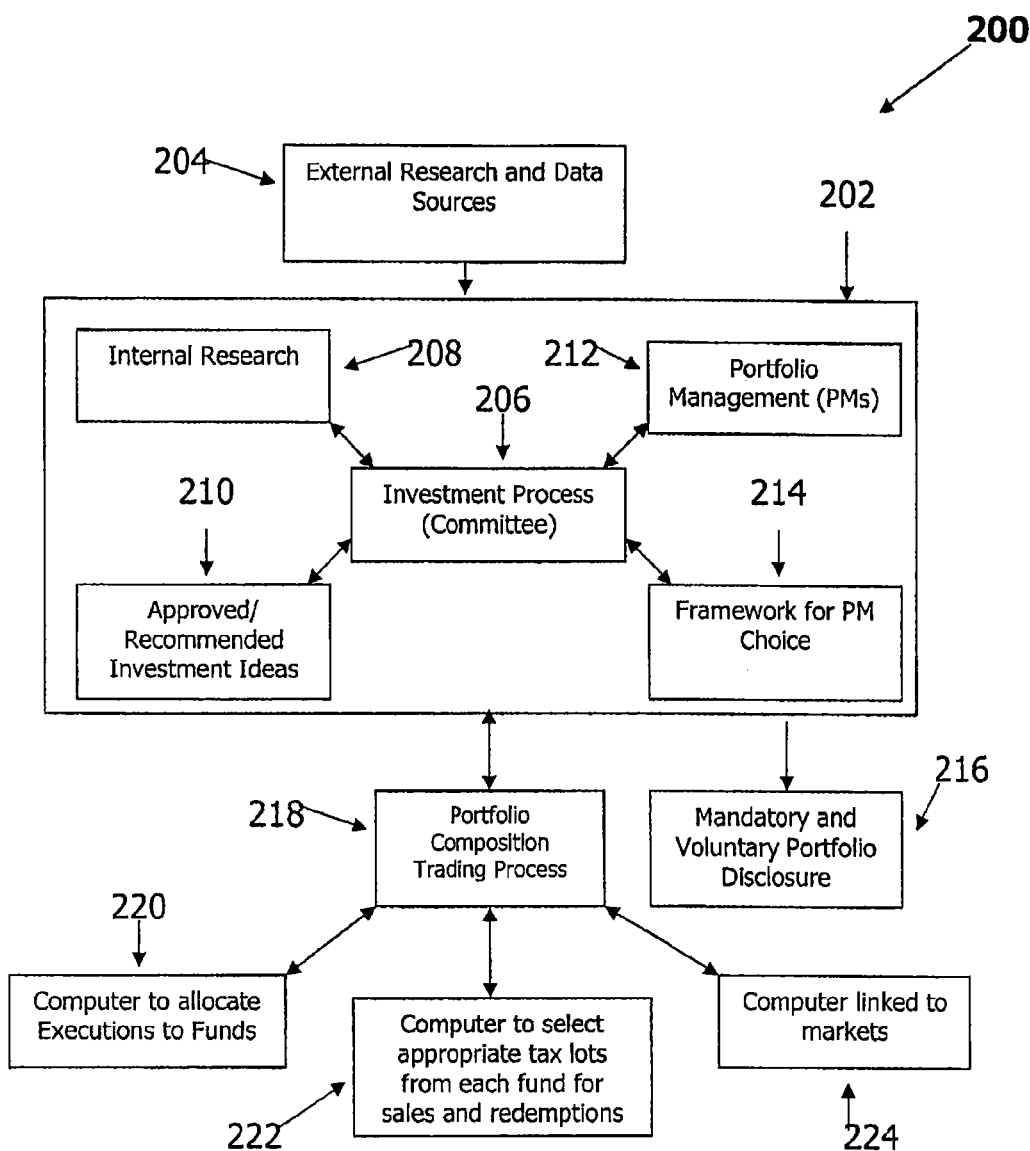
FIG. 5 is a block diagram of the portfolio management and trading system dedicated to the management of a family of AMETFs and other funds.

The share class conversions and exchanges in FIG. 4 are effected through the fund operation computer system 40 in FIG. 1. In FIG. 4, the process first identifies the ETF Share Class in step 150. The net asset value (NAV) of the shares to be exchanged is calculated in step 152. An administrative fee, if any is charged, is charged in step 154. A sales load, if any, associated with the particular Specialized Share Class is charged in step 156. For example, if the share is a share of Specialized Share Class A (with a front end load), the percentage charged for the front end load reduces the total value of the ETF Share Class shares entering into the calculation. The remaining value will determine the NAV available to be converted into Specialized Share Class A shares in step 158. The number of whole and fractional shares for the designated share class is then calculated in step 160. The whole and fractional share amount in the particular share class is posted to the fund's shareholder accounts in step 162. Changes in the Specialized Share Class are posted to the fund's capital account in step 164. Fractional shares will be available for all Specialized Share Classes. A Specialized Share Class may be created as the equivalent of the General Class of Fund Shares or ETF Share Class for fractional share positions under certain circumstances. When and if industry trading, clearing, transfer and custody systems are modified to accommodate fractional shares of fully DTCC-eligible securities, fractional shares of the ETF Share Class may be available. The process in steps 152 to 164 may be reversed to convert Specialized Share Classes back to the ETF Share Class. A table of NAVs of each share class is compiled daily by taking information from step 152 and step 158 and updating these NAVs for changes in the value of the underlying portfolio each day. These calculations are necessary because when a sales load or a different management fee is charged to a particular share class, the NAV of that share class will change in different ways than the ETF Share Class NAV changes, and subsequent transfers to and from that share class must be at values consistent with charges to investors using that class. ETF share equivalents (which may be needed in conjunction with the implementation of a cap on the issuance of new fund shares) are calculated using the ratios of the Specialized Share Class NAVs to the ETF Share Class NAV and adding all the ETF share equivalents of the outstanding shares.

Table 1 below shows the relationship of various alternative share classes to the ETF Share Class based on the ratio of their respective share classes' NAVs to the ETF Share Class NAV.

TABLE 1

|  | Number of Shares Outstanding in Class | ETF Share-Equivalents Outstanding |
| --- | --- | --- |
| ETF Share Class | $X_{ETF}$ | $X_{ETF}$ |
| Specialized Share Class A | $X_A$ | $aX_A$ |
| Specialized Share Class B | $X_B$ | $bX_B$ |
| Specialized Share Class C | $X_C$ | $cX_C$ |
| Specialized Share Class D | $X_D$ | $dX_D$ |
| D, etc. |  |  |
| Sum of ETF Share Equivalents = |  | Y |

In Table 1, a, b, c and d are equal to the ratio of their respective share class's NAV to the ETF Share Class NAV. The sum of the various share class ETF Share Class equivalent net asset values in total (Y) is compared to the fund share cap stated in a fund's prospectus or adopted by the fund board. If Y plus the ETF Share Class equivalents in a standard Creation Unit exceeds the designated cap, no creations will be permitted until a redemption occurs or the cap is increased under the terms of the fund prospectus.

Less Frequent Intra-Day Dissemination of a Precise AMETF Portfolio Valuation Proxy Another feature of the improved fund is an increase in the interval between "precise" intra-day fund share net asset value (NAV) proxies calculated and distributed by NSCC, an industry utility, through electronic quotation vendors during the trading day. The net asset value proxy is based on the contemporaneous bids and offers for each security in the portfolio translated into a per-ETF Share Class share value expressed as a bid and offer or as the midpoint between the bid and the offer. The time interval between publication of these precise net asset value proxies would be greater than the 15-second interval common with today's index ETFs, say, between 5 minutes and 60 minutes in an exemplary implementation, and may vary within that range at the discretion of the fund's board of directors, subject to regulatory approval.

The reason for reducing the frequency of net asset value proxy dissemination is that dissemination every 15 seconds provides a total of more than 1500 fund share values during the standard trading day. Given that AMETFs will usually have fewer positions than a broad market index exchange-traded fund, every 15-second dissemination provides a great deal of information and would permit an astute analyst to back calculate the composition of the portfolio and learn inappropriate details about the fund's ongoing trading activities. The appropriate interval for precise NAV proxy dissemination will vary for different funds depending in part upon the number and nature of the securities in the portfolio. However, the appropriate time interval for publication of precise indicative values does not bear a rigid relationship to the number of securities in the portfolio or any measure of portfolio turnover. The fund directors would determine the interval between precise portfolio valuation proxies subject to regulatory approval. Reducing the amount of information on the content of the portfolio provided to the marketplace will protect the fund shareholders from front-running of transactions the fund portfolio manager is making to modify the fund portfolio.

The fund management computer system 32 in FIG. 1 supplies data to a secure market data server (not shown) that continuously updates the net asset value proxy of the fund shares as bids and offers for the portfolio securities change throughout the day. Net asset value proxies are published at an interval approved for each fund by the fund board. The current standard interval for indexed ETFs is every 15 seconds. If an approximate indicative value is required at 15-second intervals for the use of investors and market makers, a randomized process will meet this need while reducing the portfolio information content of net asset value proxy calculations disseminated between precise calculations. Specifically, the values between periodic releases of precise values based on the actual portfolio could be based on the 15-second interval precise portfolio values incremented or decremented by a number drawn at random from a disclosed probability distribution. The random increments and decrements in these values will eliminate the opportunity to use the net asset value proxy publication to determine portfolio composition, yet avoid an indicative price too far away from the actual portfolio value to be useful to market participants.

Improving AMETF Investor Returns by Concentrating Portfolio Manager Effort on Controlled-Size Funds; Capping the Assets the Manager Will Accept for Specific Fund Strategies and Providing for a Higher Fee on Capped Funds that Perform Well In this embodiment, after the AMETF complex reaches a size specified in its fund prospectuses, the investment process used by the management company would be used almost exclusively for products using the fund structure and process. A common set of directors will typically be directors of every fund managed using the fund family's common investment process and the directors will be responsible for ensuring that the investment process has adequate capacity to serve additional funds with different objectives without a detrimental effect on existing funds before the addition of funds not listed in the original documentation. In this embodiment, the funds' prospectuses do not permit the fund manager to manage separate accounts or institutional pooled accounts except as share classes converted from ETF Share Classes. Rather than manage investment products that present a conflict of interest for the ETF Share Classes and the Specialized Share Classes converted from them, the investment manager might sell any excess research or idea capacity along a particular dimension to another investment manger on terms to be approved by the fund's directors. The manager could also have the opportunity to earn a higher fee on a capped portfolio.

Figure 6:
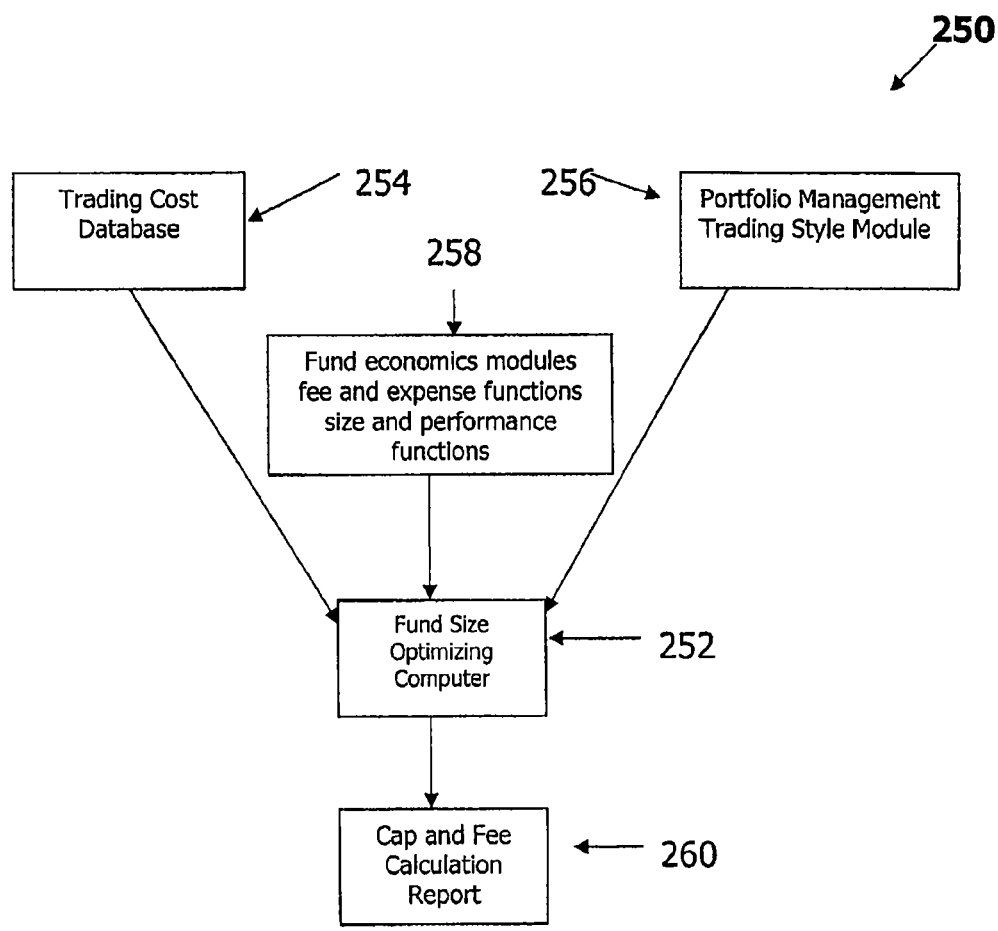
FIG. 6 is a block diagram which illustrates a computer system and databases used to estimate the optimum size of a fund for a cap calculation which may be used instead of embedding a fixed cap on the number of shares outstanding in a fund prospectus.

FIG. 6 illustrates the structure of such an AMETF dedicated portfolio management and trading system 200 which is part of the systems maintained by the portfolio manager 12 in FIG. 1. The portfolio management and trading system 200 is based on an investment process 206 incorporated in an investment management process 202 that also includes input from external research and data sources 204, internal research 208 and portfolio managers (PMs) 212 who are the essential and principal members of the investment process committee. The investment process committee 206 produces approved and recommended investment ideas 210 and a framework for portfolio management choices 214 to be used in the management of the organization's AMETF products. The investment management process 202 prepares the periodic mandatory and any voluntary fund portfolio disclosures 216. Voluntary disclosures could be made available with greater frequency than regulators require with the approval of the fund board. The investment management process 202 delivers instructions for changes to each fund through a portfolio composition trading process 218 that manages portfolio composition trading using the fund portfolio composition management computer system 30. The portfolio composition trading process 218 is indirectly involved in the allocation of executions to the various funds 220 using the fund management computer system 32 in FIG. 1. A tax management computer 222 stores tax data and selects appropriate tax lots of securities from each fund portfolio for delivery against sales and redemptions. A trading desk computer 224 links to various markets where trades are executed to complete the portfolio composition trading framework.

In this implementation, the size of certain funds will be capped by provisions in the fund's prospectus or by a fund board resolution. The principal purpose of capping the size of some funds is to improve the probability that the funds will enjoy superior long-term performance for the benefit of their shareholders. In addition to or as a substitute for a fixed cap set by the prospectus, the fund could rely on fund board resolutions or use a computer system and database to compute the optimal size of a fund to determine the fund asset level at which a cap should be imposed by the fund board.

Figure 7:
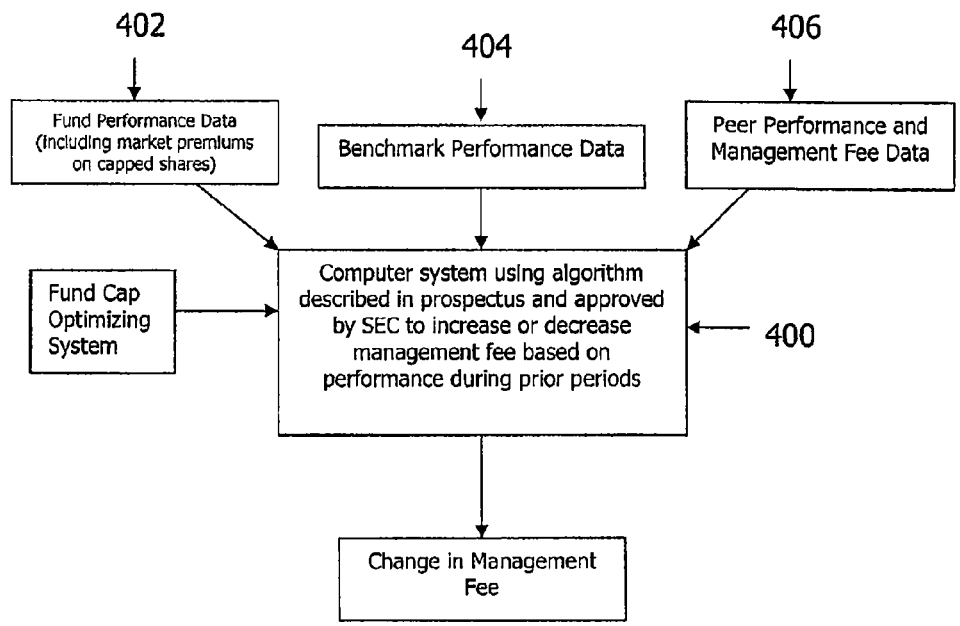
FIG. 7 is a block diagram illustrating a system for calculating changes in a fund management fee in response to changes in fund performance and other variables.

FIG. 7 is a block diagram of a computer system 250 designed to cap the size of a fund. It includes a fund size optimizing computer 252 coupled to a trading cost database 254 which includes, among other features, databases that link trading costs to the size of the positions which the family of funds as a group hold in individual securities with varying capitalizations and levels of trading activity. A separate trading style module 256 will contain information on the various fund trading styles and the trading cost experiences of the fund's portfolio managers and traders under different market conditions. A cost module 258 contains fee and expense functions for different fund sizes and performance functions based on industry experience and the experience of the managers employed by the funds. In addition, the cost module 258 has functions relating to the interaction between the fee structure and methods the funds are permitted to use to require reconversion of low management fee Specialized Share Classes to the ETF Share Class and an algorithm for changing the management fee on the exchange-traded share class in response to performance achieved by the fund's portfolio management process. The fund size optimizing computer 252 produces an appropriate cap and fee calculation report 260 for recommendation to the fund board.

The purpose of capping some funds is to create an environment which eliminates the traditional conflict between the interests of investors and the interests of investment managers which usually leads managers to accumulate large pools of assets that make superior investment performance difficult or impossible.

With the exception of some funds holding predominantly large capitalization stocks, the investment manager will state in the fund prospectus or the fund board will determine the maximum number of ETF equivalent shares that each fund in a family will issue. The manager may also use a controlled share-growth formula to prevent growth that will swamp the manager's ability to achieve superior performance for the fund. The cap could be increased or the formula modified at a future date if the manager was comfortable with its ability to manage a larger portfolio and if the fund board or shareholders approved a change.

One purpose of the computer system 250 in FIG. 7 is to provide fee incentives for the fund manager to manage a smaller pool of assets more intensely and more effectively, providing better performance for investors and equal or better compensation for the fund managers without increasing the size of the fund portfolios to the extent that superior performance is no longer possible.

The prospectus of a capped fund will state the maximum number of ETF equivalent shares that the fund will issue or will otherwise describe the process for limiting the size of the fund. The Specialized Share Classes may have share prices different from the per share price of the ETF Share Class. The ETF share equivalent of a share in a Specialized Share Class will be equal to its net asset value (NAV) divided by the NAV of the ETF shares. If the maximum total ETF share equivalent issuance for a fund is reached, no more shares will be issued unless shares are first redeemed or the maximum issuance is increased. In this embodiment, an authorized participant that redeems shares to reduce its inventory of shares in a fund that has reached its maximum size will have the exclusive right to re-create those shares at net asset value (NAV) plus a standard creation fee for a period stated in the fund prospectus. If the redeeming authorized participant does not re-create within the stated period, the fund board could shrink the fund by lowering the cap.

Capping fund size in some portfolios can solve the problem of finding a superior active manager and having assets managed by that manager over a long period of time. Capping should permit portfolio managers to post better performance records and, subject to the operation of a process to increase the management fee as a reward for good performance, earn more income. With fund management fee increases linked to multi-year performance and capped fund shares trading at a premium to net asset value (NAV), both investors and managers can earn as much or more than they might earn from larger portfolios using traditional fund and fee structures. The new fee structure will provide an incentive for performance more in line with the fund shareholders' interests than current fee structures.

Figure 8:
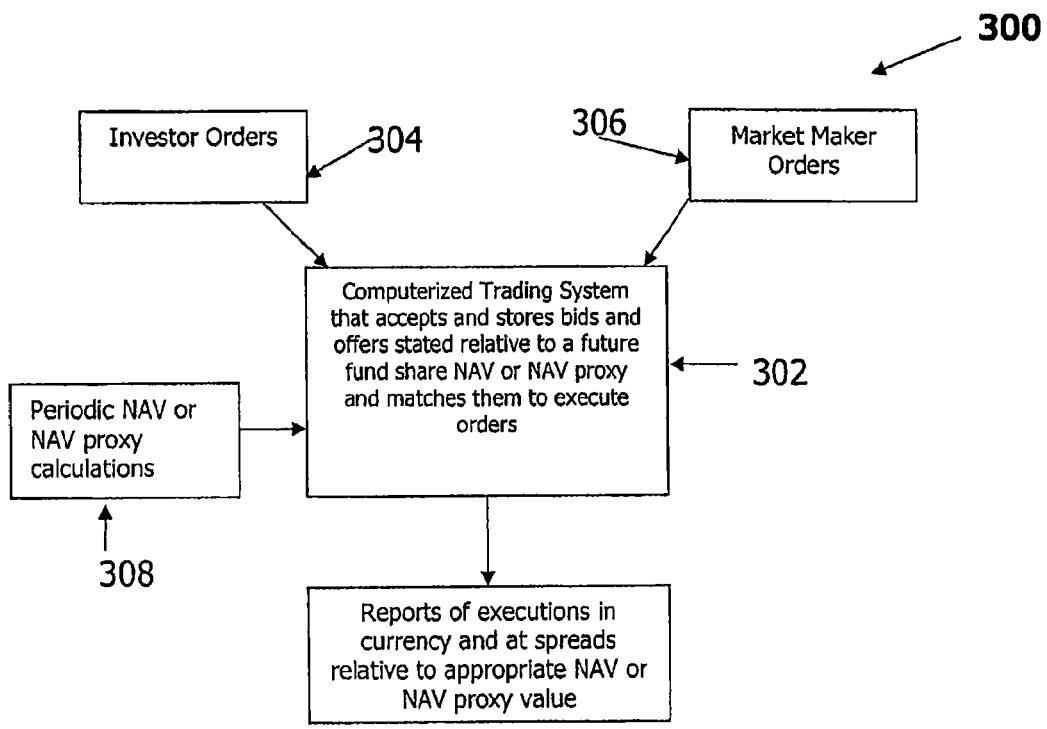
FIG. 8 is a block diagram of a computerized market for trading fund and other basket shares at prices linked to the future net asset value of the share classes.

FIG. 8 shows a computer system 400 and associated data sources used to determine the management fee for a capped fund according to one aspect of the present invention. The computer system 400 includes a program based on an algorithm described in the fund prospectus and approved by the SEC that permits the fund board to increase or decrease the management fee based on fund performance during prior periods. The computer system 400 uses a fund performance data source 402, a benchmark performance data source 404 and a peer performance and management fee data source 406. The performance data will include traditional performance comparisons plus measures of average premiums over NAV that the ETF Share Class achieves. Such premiums may lead to an increased management fee in at least two ways. First, if the ETF Share Class trades at an average premium over NAV that exceeds a level stated in the prospectus for a specified time, the holders of Specialized Share Classes with discounted management fees can be required to convert their shares to the full fee ETF Share Class. Second, if the premium persists at a designated level, the management fee can be increased to a multiple of the base rate. Appropriate terms to reduce fees if performance drops below a specified standard are part of the algorithm. The algorithm reflects the fact that the manager is giving up the ability to increase assets beyond the cap on the strength of a superior performance record. Thus, the potential for fee reduction is more limited than the potential for a fee increase in some circumstances. The computer system 400 outputs appropriate changes in the management fee for consideration by the fund board or automatic implementation under terms stated in the fund prospectus.

The creation and redemption rules are designed to encourage occasional redemptions after a fund reaches its cap in terms of number of ETF share equivalents. The existence of a cap without modest variability in the number of shares outstanding forecloses redemptions and leads to much greater share price volatility in the secondary market trading of the capped funds' shares than is necessary or desirable. The absence of redemptions could also reduce the tax efficiency of the fund. It is appropriate that a market maker with a temporary excess inventory of shares in a fund is able to redeem fund shares from time to time, bringing the size of the fund below the stated ceiling on the number of shares the fund would issue. This redemption permits the fund share market price to more closely reflect changes in the fund's net asset value and avoid significant fluctuations in any premium which the market price of the shares may carry over the fund's net asset value. Subsequent to such a redemption and for a period designated in the fund's prospectus, the redeeming authorized participant has the exclusive right to re-create the shares it had redeemed under terms established by the fund prior to its closing to new creations. These terms are essentially a re-creation of the shares redeemed with an in-kind deposit priced at net asset value plus a normal creation fee. If the redeemer does not re-create within the designated period, the fund has the option of either shrinking the cap on the number of shares it would issue (to shrink the fund because management has determined that the capped size was too large) or permitting any authorized participant to create shares up to the share ceiling under standard (NAV) terms for fund share creations.

This redemption and re-creation provision helps market makers with fund share inventory management. It moderates fluctuations in any premium on the fund shares' price in the secondary market once the ceiling on share issuance is reached. It also provides a mechanism whereby an occasional in-kind redemption can enhance the fund's tax efficiency. The expiration of the right to re-create also permits the fund board to reduce the fund's maximum capitalization if the fund's market space becomes less liquid or if the original ceiling on share issuance was not set low enough to protect the fund from being overwhelmed with assets. Any decision to shrink the market capitalization originates with the manager, with the fund board or with shareholders by petition.

Organization of the AMETF Investment Manager to Concentrate Portfolio Management Efforts on the Management of Funds to Reduce Leakage of Investment Information by Restricting the Investment Manager's Activities.

Another feature of this implementation of the present invention preserves the value of the output of the investment process more directly. With a unified portfolio management and trading operation and limitations on product offerings, shareholders are well-protected from inappropriate dissemination of investment information. Specifically, the value of an investment idea is preserved until the funds managed by the organization have time to buy or sell as much as they want of a particular security.

One of the weaknesses of the typical active manager's investment management process—in which different types of accounts are buying or selling the same security—is information leakage. With a single pool for each fund and funds as the manager's only product, there are no conflicts associated with the order in which transactions are made, and there is no leakage to outside organizations from trade confirmations sent to owners of separate accounts and individuals associated with institutional and non-public pooled portfolios. Of all possible structures for the collective management of investment portfolios, pooling is accomplished most efficiently and most confidentially with multiple-share-class funds that control publication of their portfolios.

With the concurrence of a fund's directors, the investment manager may disclose a recent fund portfolio to the public at appropriate intervals by any means the appropriate regulatory authorities approve. These may include posting on a website or other electronic dissemination. The disclosure process permits free and equal access to the information by any investor with Internet access. When implied portfolio disclosure is made through changes in creation and redemption basket composition, these changes are appropriately disseminated through public postings. Formal portfolio disclosure can be no less frequent than the quarterly disclosure with a 60-day lag now required of conventional mutual funds. However, in many cases, fund managers will be encouraged by market forces to make more frequent portfolio disclosures to increase the efficiency of secondary market trading in the fund shares without harm to ongoing fund shareholders from such disclosures. The computer model disclosed in FIG. 6 monitors both portfolio construction and transaction plans and governs and implements any portfolio disclosures that take place at shorter intervals than the interval imposed by regulators.

Figure 9:
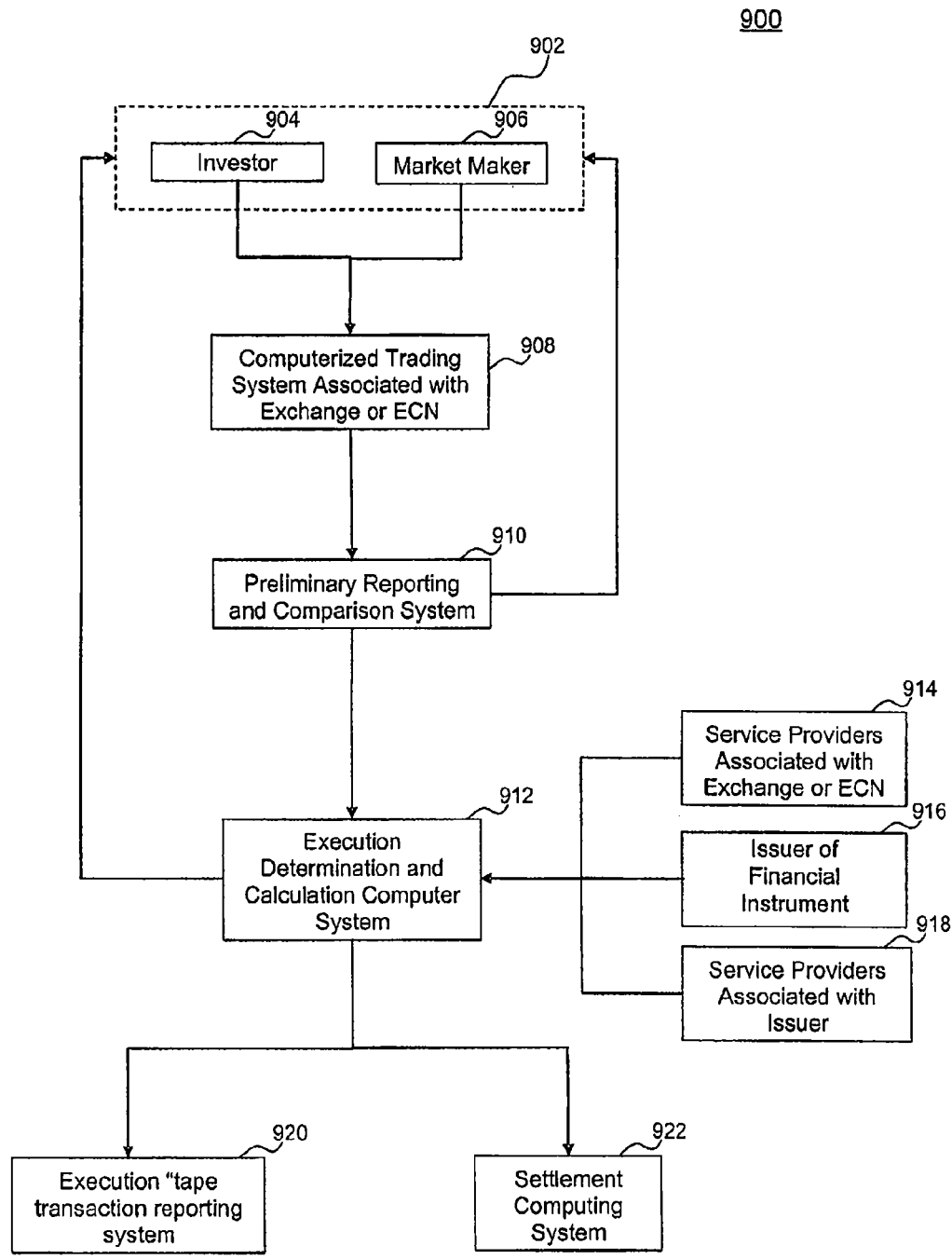
FIG. 9 is an exemplary system for trading financial instruments on an exchange or on an electronic communications network (ECN) in accordance with an embodiment of the present invention.

A Trading System for ETFs and Other Basket Instruments that Parallels the Traditional Method for Purchase and Sale of Conventional Mutual Funds at Net Asset Value (NAV) without Compromising the Investor Protection Provided by the Exchange-Traded Fund Creation and Redemption Structure Licenses may be offered to appropriate trading venues to use computer systems designed to permit special intra-day auctions linked to periodic disclosure of the intra-day valuation proxy and the closing net asset value (NAV). These auctions will provide a trading mechanism intermediate in some respects between those of mutual funds and today's benchmark index ETFs. FIG. 9 shows a computerized market 300 allowing trading of ETF shares at prices linked to future NAV calculations which may be used as a pricing basis. The market 300 is centered on a computerized trading system 302. The computerized trading system 302 matches orders in terms of their statement of a bid or offer below, at or above the NAV or NAV proxy to be calculated on prevailing bids and offers for portfolio holdings and disclosed at a specified future time. The computerized trading system 302 accepts orders from investors 304 and market makers 306. The computerized trading system 302 receives periodic NAV calculations and NAV proxy calculations 308. The computerized trading system 302 produces reports of executions in currency and at spreads relative to the daily closing NAV or NAV proxy values posted at specified times. The trading system accommodates trading in any fund, trust or structured product for which a net asset value based on the prices of its holdings of securities or other financial instruments is periodically calculated.

The NAV-linked executions at stated times permit investors to place orders with market makers through traditional financial intermediaries for purchase and sale of shares at a price linked to an hourly posting of the intra-day net asset value proxy or at the official end-of-day net asset value. In some cases, these trades may be done at a spread and in others the market maker may provide a guarantee of a fill at net asset value with no spread or commission—the effective execution cost depending in part upon the time interval between the entry of the order by the investor or the investor's agent and the price calculation. Instead of making a market at a specific price, the market maker bids and offers at a spread below, at and above the next reported hourly intra-day proxy value or the closing NAV. The spread away from the designated NAV determination will generally widen as the time of price determination draws closer because the market maker has less time before the price determination to hedge or offset risk with another trade.

Using the closing NAV as the target in such a trading structure makes the pricing and trading of ETFs much like the conventional mutual fund trading process. Market makers may be willing to guarantee execution with no commission at the closing net asset value on orders received far enough in advance. Obviously, an order for execution at today's NAV with no commission is not acceptable to a market maker after a certain time. The cut-off time for such an order may vary among funds and among market makers.

While mutual fund transaction systems are designed to accommodate trades denominated in dollars with share positions expressed as whole and fractional shares, stock and ETF trading systems and, most significantly, clearing systems do not accommodate fractional shares. Some firms show fractional stock or ETF shares in a customer's account but such fractional share positions cannot be transferred electronically to other firms. The trading mechanism of this embodiment converts part or all of a dollar-based transaction into a Specialized Share Class with the same per share NAV as the General Class of Fund Shares and the appropriate share position will appear in the customer's account as a conventional fund share class position. This feature adds to the similarity of this trading process to the traditional mutual fund transaction process.

Cost Savings to Investors and Investment Managers

The following table, Table 2, compares estimates of the costs experienced by a typical long-term investor in an actively-managed domestic equity mutual fund to the costs of an actively-managed domestic equity version of the new fund according to the present invention. The potential cost/performance difference is as much as 4.10% per year. The new structure offers substantial advantages to investors, largely from eliminating unnecessary or inappropriate costs and fund size-related performance penalties.

TABLE 2

|  | Equity Mutual Fund | New Equity Fund |
| --- | --- | --- |
| Expense Ratio | 1.0% | 1.0% |
| Portfolio Composition Trades Inside the Fund | 1.5% | 1.5% |
| Fund Share Trading Liquidity Costs | 1.4% |  |
| Leakage of Investment Info/Index Publication | 0.35% |  |
| Fund Supermarket vs. Multi-Share Class ETF | 0.35% |  |
| Performance Penalty from Oversized Funds, Net of Higher Performance Fee | Up to 2.00% |  |
| Annual Total | 6.60% | 2.50% |

In Table 2, there are no recurring fund share trading liquidity costs for the new fund structure because any costs to enter and leave the ETF Share Class are paid by the trading shareholder only when entering or leaving the fund. The estimate of the cost of information leakage is based on an estimate of half the typical annual cost of the publication effect of S&P 500 composition changes. The fund supermarket costs are usually annual costs to all of a fund's shareholders in no transaction fee (NTF) shares, whether they use the fund supermarket or not. Some annual supermarket fees paid by funds are higher than 0.35%. There are no annual marketing fees in the new structure without a specific agreement by the investor to pay them in connection with ownership of a Specialized Share Class. The performance penalty associated with fund size is an estimate based on limited data from active fund managers and trading cost analysts.

It will be apparent to those skilled in the art that various modifications and variations can be made in the method and system of the present invention without departing from the spirit or scope of the present invention. Thus, the present invention is not limited by the foregoing descriptions but is intended to cover all modifications and variations that come within the scope of the spirit of the present invention and the claims that follow.

EXAMPLE 2

Systems, Methods, and Computer Program Products for Trading Financial Instruments on an Exchange Additional embodiments of the invention shall now be described in terms of exemplary systems, methods, and computer program products for trading financial instruments on an exchange or an electronic communications network (ECN). Within such embodiments, financial instruments may include, but are not limited to, securities, mutual funds, exchange-traded funds, open-end funds, closed-end fund, stocks, swaps, futures, and derivatives, either alone or in combination. Further, the embodiments described herein may accommodate any additional financial instrument that would be apparent to one skilled in the art and that may be traded on an exchange of ECN.

According to embodiments of the invention, a wide range of financial instruments, trading techniques, and trading processes may be accommodated with changes in exchange order formats, structures, and processes with the common element being a settlement price, a trade volume, or any combination of a settlement price and a trade volume to be determined in the future. Embodiments of price- and volume-contingent trading processes include, but are not limited to:

a. Volume-Weighted Average Price (VWAP), which represents a total price of instruments traded during a period divided by the total number of instruments traded;

b. Time-Weighted Average Price (TWAP), which is a variant of VWAP that weights the price using the time the price spends at each level rather than the volume traded at each level;

c. Target Volume (TVOL), which is a strategy used to trade a specified percent or fraction of the actual market volume, usually at a specified relationship to the average price at which that volume trades; and d. Net Asset Value (NAV)-based trading, which permits settlement of fund share transactions and transactions in other instruments for which net asset values are periodically calculated at prices linked to a specified posting of a net asset value calculation to be made after the time of the trade.

According to embodiments of the invention, each of the above-described execution formats and processes may be characterized by settlement terms that are determined by future trading prices, future trading volumes, future NAV calculations, or some other variable or combination of variables that sets the trade's specifications and settlement provisions once the determining variables have been calculated. Such other variables will be apparent to persons skilled in the relevant arts based on the teachings contained herein. Also, other execution formats and processes applicable to the present invention will be apparent to persons skilled in the relevant arts based on the teachings contained herein.

In some embodiments, exchange transactions may utilize an arbitrary base number or proxy value, such as 100, as a centering point for either a price measured in currency or in percent. Further, additional embodiments may incorporate a root symbol with an extension or a special symbol to designate both the financial instrument and the order type.

Further, in contrast to certain informal trading instructions or trading algorithms whereby a broker attempts to provide an execution as close as possible to a specified net asset value or as close as possible to a specified average value and/or fraction of total volume, trades and transactions described herein may be anonymously executed firm contracts for settlement at a specific relationship to a specified net asset value calculation, or to specified realized average prices and/or volumes.

Trades based upon volume-weighted average pricing are the most commonly used over-the-counter transactions contingent upon future prices. However, in spite of their popularity, VWAP trades have often been criticized for their effect on markets. By coupling traditional volume-weighted average pricing with exchange trading, the present invention provides an end-of-day transparency in VWAP trading that is absent from existing trading processes.

A volume-weighted average price (VWAP) is a ratio of a total value of an item traded to total volume traded over a particular time horizon (usually one trading session or the remainder of a trading session after an order is entered), and as such, VWAP is the average price for a financial instrument over the specified time horizon with proportionately more weight given to periods of heaviest trading. In equity markets, VWAP is a common measure of the average price a stock traded at over the measurement period, and VWAP is often used as a trading cost benchmark by investors who aim to be as passive as possible in their trade executions. Many institutional investors fall into this category. The aim of using a VWAP trading target is to ensure that the broker or market maker executes the order in line with the volume and prices available in the market.

VWAP orders (and related orders described herein) may be based on the VWAP calculation for an entire trading session or for only a portion of the trading session. A common contract in the over-the-counter market may use the VWAP calculation for the portion of the trading session that remains after an agreement to buy or sell at VWAP is made. Weaknesses of currently available over-the-counter trading in these agreements include an oversimplification of remainder of session VWAP calculations, a lack of competition in pricing remainder-of-session trades, a need to renegotiate any change in an order with a specific broker or market maker, and an absence of a price or volume calculation subject to regulatory oversight.

Even if the exchange does not introduce a remainder-of-session contract, the availability of competitive quotations throughout the session for full-session contracts on the exchange will enable an investor who wants to cancel or offset the effect of the remaining transactions in a full session contract to enter into a counter-trade that largely or entirely offsets the impact of remainder of the session trades that might be executed by the counterparty to a full session trade. The full-session contract will be competitively priced throughout the session. In less formal arrangements in the over-the-counter market, an investor is dependent on the goodwill of a market maker when negotiating his way out of the remainder of a full session VWAP trade.

Order entry systems and quotation standards in financial markets typically reflect a price at which securities, commodities or other financial instruments are exchanged and the size of the position to be purchased or sold. If an item is trading for around $20.00, a bid to purchase the item might be $19.95 and an offer to sell the item might be $20.05. The quotation structure also reflects the respective quantities bid for and offered. This traditional exchange quotation and order entry structure has impeded the development of transaction mechanisms to deal with prices and quantities to be determined in the future because there is no simple correlation between current prices and volumes, and prices and volumes which may be determined by future trading or in some other manner.

Through the embodiments described herein, the needs of investors using these contingent orders are accommodated by stating transaction prices at or relative to a price or volume or price and volume that is currently unknown, but that will be determined in the future. Bids and offers (and, in some cases, trading volumes) to be determined will be stated relative to an exemplary anchor point, or proxy value. The anchor point or proxy value can be any agreed upon value, such as but not limited to 100. The present invention is not limited to this specific numerical anchor point or proxy value, but its use provides a simple mechanism by which market participants relate the present market to a price or volume to be determined in the future. One skilled in the art would recognize that a number of numerical anchor points would be suitable for use within the embodiments of the present invention.

Using the example of the above-mentioned item trading at $20.00, a price that would be close to the future price might be transacted in terms of bids at 99.95 (5 cents less than the proxy) and offers at 100.05 (5 cents greater than the proxy), representing the essence of the bid at $19.95 ($20.00 minus $0.05) and the offer at $20.05 ($20.00 plus $0.05) that was cited above. If there is a great deal of uncertainty as to the appropriate future price or an absence of active liquidity providers, the appropriate bid might be stated at 99.50 versus an offer of 100.50. These quotations would suggest a bid at $19.50 and an offer at $20.50 in an instrument trading at $20.00. In this example, a benchmark settlement price of $21.00 would call for settlement of a trade at the bid side of 99.95 at a price of $20.95. The above examples represent currency applications. Percentage applications where 99.95 and 100.05 translate into $19.99 (0.9995×$20.00) and $20.01 (1.0005×$20.00) with a benchmark settlement at $20.00 are also possible and fall within the scope of the invention, but seem less intuitive in most trading applications.

In the foregoing examples, the use of an exemplary anchor point or proxy value, such as 100, should be understood as a way to transact around the price to be determined in the future rather than absolute dollar amounts. Percentage applications may be more appropriate for transactions based on trading volume to be determined in the future. However, the present invention may employ percentage applications to describe transactions based on any combination of price and trading volume that would be apparent to one skilled in the art.

Further, while either a price reference standard or a percentage reference standard can be adopted for a given trading market, there is no necessary reason for all markets to adopt the same standard. For example, one market may use a currency-based difference and another market can use percentages of the determining price or volume. As described within the embodiments below, TVOL trades may be entered to buy or sell a specific percentage of the instruments traded on an exchange during the specified period, and VWAP trades may likewise be entered to buy or sell shares at a specific future price on the same exchange.

Symbols and Extensions for Contingent Trading of Financial Instruments

One feature of many U.S. markets is a limitation on the number and type of characters that can be accommodated in various data fields of a quotation or order entry system. In some cases, these symbology constraints are inherent in the core system; in others, they might be accommodated in the core system over time and at a manageable cost, but legacy feeder systems at customer locations would also have to be modified. It can, therefore, be useful to use a root symbol which might have, in a typical case, three or four characters and an extension consisting of additional characters which describe the nature of the instrument being traded in more detail and the basis for trading, i.e., trading at a future price or a percentage of volume during a designated period.

The root symbol of a financial instrument, such as the Standard & Poor's Depositary Receipts (SPDRs, pronounced spiders, trading symbol SPY), might be followed by a decimal point and the letters VW for VWAP trading during a full day's trading session. For time-weighted average price (TWAP) trading, the letters following the decimal for a full session average might be TW. For target volume (TVOL) trading, a future volume determined trading strategy that calls for execution of transactions based on a targeted percentage of total market volume, the extension might be TV. For net asset value (NAV) based pricing, a type of future price or value determined trading appropriate for exchange-traded funds, closed-end funds and other instruments for which a net asset value is periodically calculated, the end-of-session NAV extension might be NV. In additional embodiments, these extensions may be further modified by changing letters to distinguish between trades to be settled at the average price during the entire daily trading session, during the remainder of the trading session beginning with the next transaction after the VWAP, TWAP or TVOL contract is executed or at an NAV determined at a time other than the market close. Such conventions may accommodate a range of innovative order variations with a readily understood symbology useful to market participants.

Table 3 outlines a number of exemplary extensions that may be applied to a root symbol of a financial instrument in accordance with embodiments of the present invention. It is noted that the extensions shown in Table 3 as well as others described herein are provided solely for purposes of illustration, and not limitation. Other means for denoting contingent trading as described herein, whether involving symbols, extensions or some other approach, will be apparent to persons skilled in the art based on the teachings contained herein.

In the example of Table 3, Standard & Poor's Depository Receipts (SPDRs), rather than a common stock, are used to illustrate the application of the present invention to both NAV-based trading and order types that may be used in conjunction with any financial instrument.

TABLE 3

| Trade Type | Full Session or End of Day | Rest of Session | Hourly NAV | Cap or Floor on Price Permitted |
|---|---|---|---|---|
| VWAP | SPY.VW | SPY.WR | — | Yes |
| TWAP | SPY.TW | SPY.TR | — | Yes |
| TVOL | SPY.TV | SPY.VR | — | Yes |
| NAV | SPY.NV | N/A | SPY. NA, SPY.NB, etc. | Yes |

Table 3 outlines exemplary symbology and trading variations for various types of transactions. In a TVOL trade, for example, a VWAP price relationship or a price cap or floor can be a condition of most orders. The cap or floor can be included or optional in the other order types. Investors may expect that some orders entered with a cap or floor are both less likely to be executed and less likely to attract aggressive traders.

In the hourly NAV column, extensions .NA and .NB are used to suggest NAV calculations that might be made hourly at, say, 10:00 a.m. and 11:00 a.m., respectively, if most U.S. financial markets continue to open at 9:30 a.m. Eastern Time. Although not outlined within Table 3, additional embodiments may incorporate VWAP, TWAP and TVOL executions based on hourly or other specified periods.

In an embodiment described above with respect to Table 3, a basic, or root symbol of a security or other financial instrument has been combined with an extension to describe the nature of the execution process. In an additional embodiment, a newly specified symbol designates both the instrument and the execution type. Further, a full session VWAP trade in the SPDR may be described by a symbol such as SPY.VW, where the extension is used not only to designate the execution process, but also the settlement process. In such an embodiment, the settlement process may be described in terms of at least one of: (i) transaction size; (ii) routing codes; (iii) instructions; (iv) price; (v) order price; (vi) time-in-force; (vii) settlement type; and (viii) limit price, as outlined below.

The specifics of an exchange market order entry process are constrained by the systems in place at the exchange and on the computers of its customers. One embodiment of this invention modifies some order entry conventions in use at the New York Stock Exchange (NYSE), and the embodiments described herein describe functions that might be performed with data in certain fields using NYSE terminology. The terminology and conventions will be different to varying degrees on other securities exchanges and significantly different on futures exchanges. While some unaffected fields will be described for clarity even if their use is not modified to accommodate the price- and volume-contingent orders described herein, the above description illustrates how the existing structure of exchange order entry might accommodate the types of price and volume contingent trades described herein.

(i) Size

The size field carries the number of shares or other units to be bought or sold. For most orders of financial instruments, including the transaction variations described herein, the size represents simply the number of shares covered by the order. With the exception of the NAV-based trades, these price- and volume-contingent orders are designed primarily for use by institutional or other large investors. Consequently, trade entry may be restricted to round lots for some order types. For example, an order for 100 shares is designated as 100, but the last two digits are always zeros for order types limited to round lots.

For TVOL trades, the order is not expressed in terms of a number of shares because the number of shares is contingent on the number of shares traded during an interval. In one embodiment, an appropriate convention would fix the size field for TVOL trades at 100, representing one percent of the day's or other relevant time period's trading volume. Traders would execute six separate orders for "100" to cover 6% of the session's volume. Alternately, the size of the field may be capped at 1,000 so that no more than 10% of the transaction volume during a designated period or session can be contracted for with a single trade. With this convention, an order for "600" in the size field covers 6% of the volume in the specified time period. Further, one skilled in the art would recognize that a number of additional techniques may be employed to accommodate the volume percentage term in a TVOL order.

(ii) Routing Codes

While routing codes are used principally to direct an order to a particular execution facility at the exchange, they might be used in contingent orders for trade designation or settlement control, either as a supplement to a special symbol or symbol extension or as a separate designator.

(iii) Instructions

In the embodiments described above, three types of instructions may be appropriate: BUY (Buy), SL (Sell) or SSHRTAEXEMPT (sell short exempt from the uptick rule).

The sell short exempt instruction is used primarily for trades in exchange traded funds which are exempt from the uptick rule, but which still need to be designated as a short sale for other regulatory purposes. In trades contingent on a future price or volume, the instruction set for a securities trade cannot reasonably incorporate a traditional non-exempt short sale because the initial transaction merely engages the buy-side party to receive shares at a price or in a size (or both) to be determined Similarly, the sell-side party contracts to deliver shares now owned or to be purchased on a timely basis to fulfill the contract. Permitting a short sale in a non-exempt security or financial instrument in this manner would provide a potential regulatory end run around the uptick rule. At such time as short sale regulations change, what are now non-exempt short sales may be permitted to use the non-exempt short sale order type.

(iv) Price

For price-contingent trades, the core basis price may be a standard set by the exchange, which, as suggested above, might be 100 in a VWAP, TWAP or NAV contingent order, with ultimate pricing in currency increments around the settlement price. In the case of TVOL trades, a reasonable way to designate the price is also in increments or decrements around a VWAP basis calculated over the same period as the TVOL. To the extent that a market participant desires to put a limit on the actual share price, the limit may be specified in the limit price field as described below.

(v) Order Type

Ordinarily, market, market-on-close, limit or other qualifications or extensions are used in stating an order. An order type not currently in use might be used alone or as a supplementary field to designate this order as a VWAP, TVOL, NAV or other trade type.

(vi) Time-in-Force

Time-in-force variations from day orders are within the scope of the present invention.

(vii) Settlement Type

The settlement default in most trades of securities in the United States is "regular way," i.e., settlement on the third day after execution. The settlement terms on the trades described herein are set when all price or volume contingencies are determined, usually shortly after the market close on the trade date, making third day settlement a reasonable choice. However, VWAP-based and NAV-based orders for "cash settlement" are expected to be common and cash settlement can be the default or an available option in some of these trades To meet processing requirements, one embodiment of the invention uses a new settlement type or types specifically for these executions or to trigger a special transaction restatement and settlement process after capture of the necessary contingent variables by the symbol, the symbol extension or a routing code. The contingent trades would be reported to the counterparties for comparison shortly after the execution, but the trades would have to be restated to incorporate contingencies. The restated trades would then settle. The contingent trades would not settle but a record of them would be retained for regulatory purposes.

(viii) Limit Price

New York Stock Exchange orders and orders on many other exchanges can have two price fields. The second price field usually states a limit such as a cap or floor. A limit is usually based on the dollar price of a share. In the case of a buy order, the limit price would be a cap by default. In the case of a sell order, the limit price would be a floor by default and the price would be the dollar price of the underlying share, not the "100" or other basis price used in the primary price field.

Systems and Methods for Trading Financial Instruments on an Exchange

FIG. 9 is an exemplary system 900 for trading financial instruments on an exchange or an electronic communications network (ECN) in accordance with an embodiment of the present invention. The exemplary system 900 comprises a number of parties 902 that enter orders to trade financial instruments, such as but not limited to common stocks, mutual funds and exchange-traded funds (ETFs) on an exchange or an electronic communications network (ECN). In the embodiment of FIG. 9, the parties 902 may include an investor 904 and a market maker 906, although in additional embodiments, the parties 902 may be comprised of any number of investors, acting individually or through brokers, and market makers, depending on the nature of the market and the requirements of market participants at any given time.

The investor 904 and market maker 906 may enter orders to trade the financial instrument by electronically transmitting bids to purchase the financial instrument and offers to sell the financial instrument to a computerized trading system 908 that is associated with the exchange or ECN. The bids and offers for the financial instrument may be stated relative to a contingency based on a future price or net asset value and/or future trading volume of the financial instrument. The range of possible contingencies may include, but is not limited to, a volume-weighted average price of the financial instrument (VWAP), time-weighed average price of the financial instrument (TWAP), a target trading volume of the financial instrument as a percentage of total volume in the market during a specified period (TVOL), and net asset value (NAV) calculations of the financial instrument typically provided by fund issuers or service providers associated with the issuer of the financial instrument.

As described above in Table 3, the respective VWAP-based, TWAP-based, and TVOL-based contingencies may be calculated over a full trading session or, alternatively, over a portion of the trading session remaining after a trade is executed. NAV-based contingencies may be calculated more frequently than once per day. In additional embodiments, the VWAP-based, TWAP-based, TVOL-based, and NAV-based contingencies may be computed over any of a number of time periods that would be apparent to one skilled in the art. Further, as outlined above with respect to Table 3, an extension may be applied to a root symbol of the financial instrument to indicate any combination of a particular contingency, execution process, and settlement process.

The computerized trading system 908 then matches a bid to purchase the financial instrument with an offer to sell the financial instrument in order to execute the trade according to contractual terms set forth in the respective bid and offer. Once the trade has been executed, details of the executed trade (or transaction) may be transmitted from the computerized trading system 908 to the preliminary reporting and comparison system 910 as a report stating the terms of the transaction and any price, volume, or price and volume contingencies to which the execution is subject. The transaction is not submitted to settlement until the contingent prices, volumes and/or other terms have been determined, and depending upon the rules of the exchange, the first stage of the transaction may or may not be published on a trade reporting system.

The preliminary reporting and comparison system 910 prepares initial reports that may be sent to trading parties 902 for comparison purposes and to an execution determination and calculation computer system 912 that accepts contingency price and volume calculations (as well as other contingent calculations, depending on the embodiment) from service providers 914 that may be operated by or associated with the exchange or ECN or other regulatory authority. In the case of executed orders contingent upon NAV calculations, the execution determination and calculation computer system 912 may accept NAV calculations from issuers 916 of financial instruments for which a net asset value is periodically calculated, and their service providers 918, including calculation agents. Once all contingent terms have been received, the execution determination and calculation system 912 computes the contractual terms of the trade and reports the executed trade and the contractual terms to an exchange transaction reporting system 920, to a trade settlement system 922, and to the parties 902 to the trade, including investors 904 and market makers 906.

Figure 10:
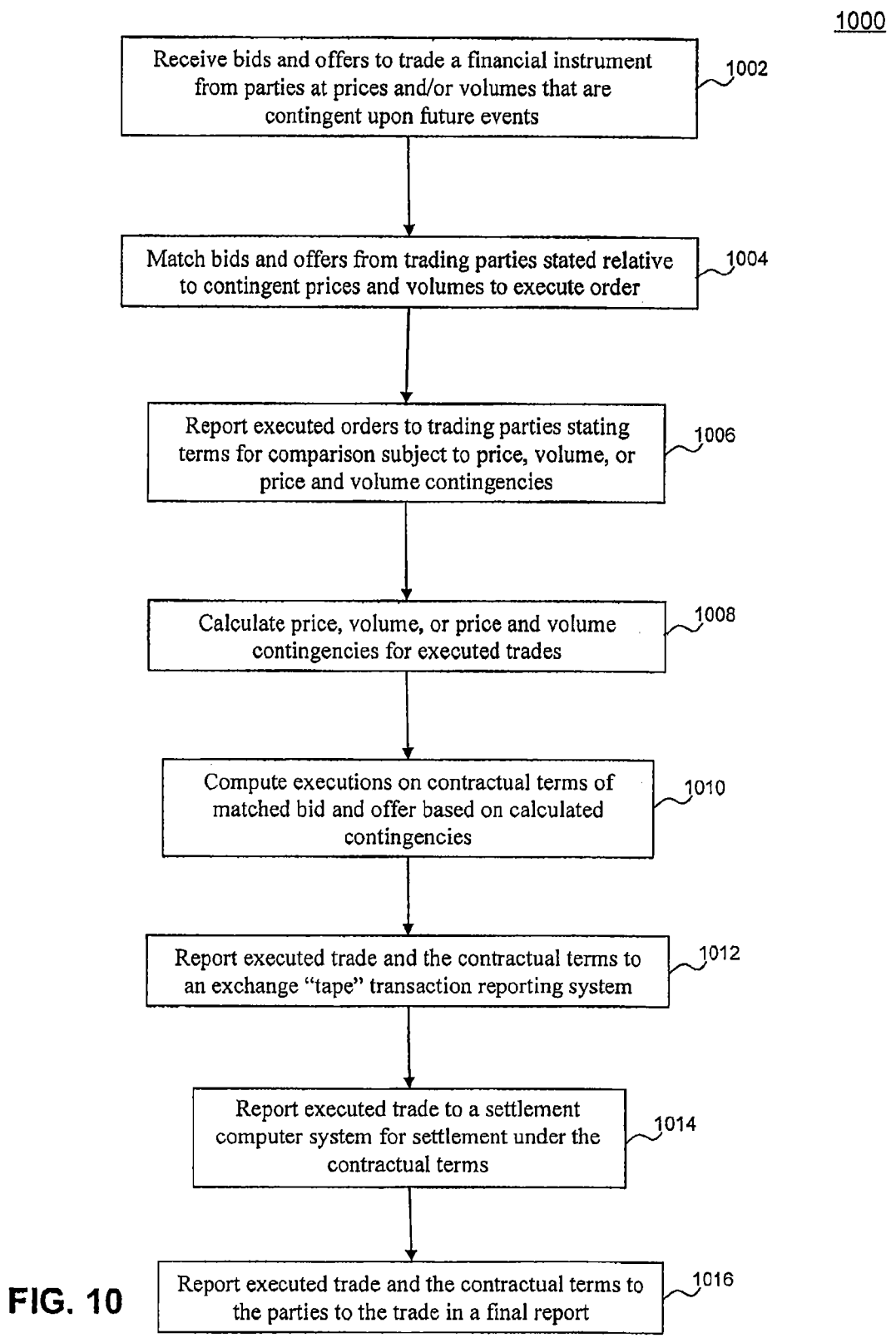
FIG. 10 is a detailed overview of an exemplary method for trading financial instruments on an exchange or ECN according to an embodiment of the present invention.

FIG. 10 is a detailed overview of an exemplary method 1000 for trading financial instruments according to an embodiment of the present invention. In step 1002, a computer trading system associated with an exchange or ECN receives at least one order to trade a financial instrument, such as but not limited to a mutual fund and an exchange-traded fund (ETF), from a potential party to the trade. Within step 1002, the parties to the trade may be investors or market makers, depending on the nature of the market and the requirements of market participants at any given time, and each party may enter an order on the exchange by transmitting the order electronically to the computerized trading system.

The order to trade the financial instrument may represent a bid to purchase the financial instrument or an offer to sell the financial instrument, and the received orders may be stated in terms of prices, trading volume, and net asset values of the financial instrument that are contingent upon future events. In one embodiment, the contingency may be based on a net asset value (NAV) of the financial instrument calculated periodically at specified time intervals throughout a trading day. For example, the NAV may be computed at 10:00 am and at 11:00 if an exchange were to open for trading at 9:30 am. In additional embodiments, the contingency may be based on a volume-weighted average price (VWAP) or a time-weighted average price (TWAP) of a financial instrument or other financial instrument calculated over a specified time interval. The contingency may also be based on trading volumes (TVOL) expressed as a percentage of the total volume of a financial instrument or other financial instrument traded during a specified time interval. The contingency may be stated in the order in terms of a proxy, as described herein.

In step 1004, once orders from the various parties to the trade have been received, the received bids and offers are stored, and the bids and offers for financial instruments from the various parties are then matched to execute an order between parties. The executed order matches a bid to purchase a particular financial instrument with an offer to sell the particular financial instrument, where both the bid and offer have been stated in terms of a compatible contingency such as but not limited to a future price, future trading volume, future net asset value of the financial instrument, etc. In some embodiments, the executed order may be reported over the exchange tape at the time of execution (i.e., during step 1004) as well as after contingency determination.

In step 1006, terms of the executed order, including any future price, future volume, or future price and future volume contingencies to which the order is subject, are reported to the trading parties. The reporting process may include transmitting a report of the transaction to the individual trading parties for review and comparison with their bid or offer. By reviewing the report, trading parties may identify errors and may initiate actions to correct any errors. In additional embodiments, the terms of the executed order may be transmitted to an external system, such as the preliminary reporting and comparison system 910 within FIG. 9, and the external system may report the terms of the executed transaction to the trading parties.

In step 1008, the contingencies upon which the order has been executed are computed. In one embodiment, the computed values of the price-based, volume-based, or NAV-based contingencies are provided to an external computer system, such as the execution determination and calculation computer system 912 within FIG. 9.

For executed orders contingent upon net asset value (NAV), contingent terms may be periodically calculated by at least one of an issuer of the financial instrument, a service provider associated with the issuer, the market, or a regulatory authority. Contingent terms based on price and trading volume, such as VWAP-based, TWAP-based, and TVOL-based contingencies, may be computed directly by the computerized trading system associated with the exchange or ECN or by service providers under the supervision of the exchange or ECN. As the contingent terms are calculated by parties independent of the trade, conflicts of interest may be substantially reduced or eliminated.

In step 1010, the contractual terms of the executed trade are computed, and the contractual terms of the executed trade are reported to the parties to the trade in a final report. In one embodiment, the contractual terms may be computed by an external computer system, such as the execution determination and calculation computer system 912 within FIG. 9.

In step 1012, the executed trade and the contractual terms associated with the executed trade will be reported to an exchange transaction reporting system, and the exchange transaction reporting system 920 will publish the executed trade. The exchange transaction reports will be supplied to one or more financial reporting services.

Further, in step 1014, the executed trade will be reported to a settlement computer system for settlement under the computed, contractual terms. In an embodiment, the settlement computer system is associated with the National Securities Clearing Corporation (NSCC), a wholly owned subsidiary of The Depository Trust & Clearing Corporation (DTCC). The NSCC provides centralized clearance, settlement and information services for virtually all broker-to-broker equity, corporate bond and municipal bond, and exchange-traded funds trades in the United States.

In step 1016, the executed trade and the contractual terms associated with the executed trade may then be confirmed to the parties to the trade.

Figure 11:
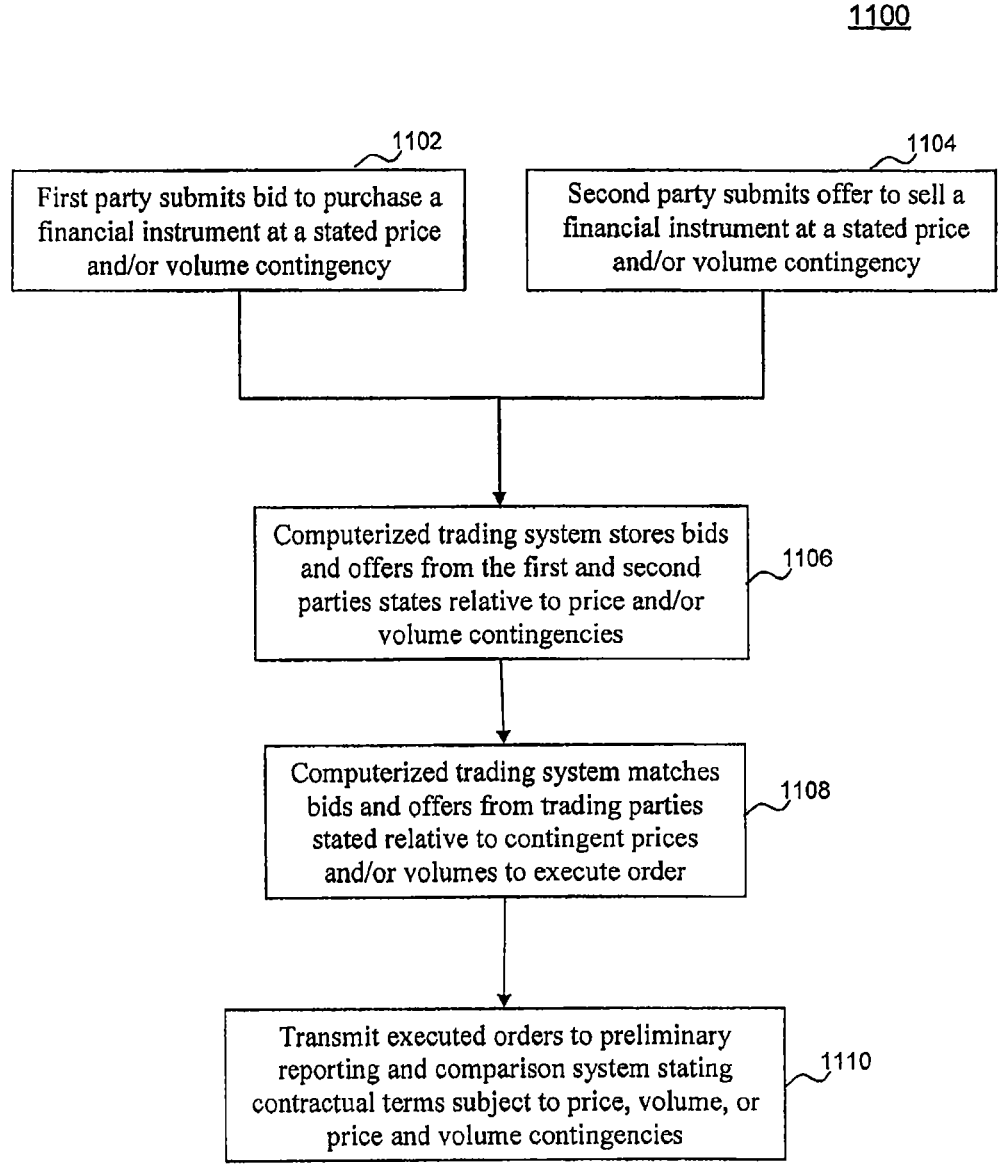
FIG. 11 is a detailed illustration of a method for executing an order for a financial instrument that may be used with the exemplary method of FIG. 10.

FIG. 11 is a detailed illustration of a method for executing an order for a financial instrument that may be incorporated into step 1002 of the exemplary method of FIG. 10. In step 1102, a first party enters an order to buy (or sell) at least one share of a financial instrument, such as but not limited to a mutual fund and an exchange-traded fund (ETF), on an exchange or ECN that trades the financial instrument. The bid (or offer) entered by the first party within step 1102 may be stated relative to a future value of a first contingency using a proxy value.

In step 1104, a second party enters an order to sell (or buy) at least one share of the financial instrument, such as an exchange-traded fund (ETF), on the exchange or ECN. As described in reference to step 1102, the offer (or bid) entered by the second party within step 1102 may be stated relative to a future value of the same contingency using a proxy value.

In one embodiment, the first party of step 1102 may be an investor acting through a broker and the second party of step 1104 may be a market maker. However, in additional embodiments, the first and second parties may be any combination of investors or market makers or other market participants, depending on the nature of the market and the requirements of market participants at any given time. Further, during steps 1102 and 1104, the first and second parties enter orders by transmitting the orders electronically to a computerized trading system.

The contingency of interest to the parties 1102 and 1104 may be a net asset value (NAV), a time-weighted average price (TWAP) or a volume-weighted average price (VWAP) calculated over a specified time interval. The contingency may be also based on a target volume expressed as a percentage of total trading volume of the financial instrument on the market during a specified time period (TVOL).

Once the orders from the first and second parties have been entered into the computerized trading system in steps 1102 and 1104, respectively, the computerized trading system then accepts and stores the orders in step 1106. The computerized trading system stores not only the order for the financial instrument, but also any contingency upon which the order is stated. In additional embodiments, steps 1102, 1104, and 1106 may be repeated for additional parties that enter orders for the financial instrument stated in terms of price-based, volume-based, and/or NAV-based contingencies.

In step 1108, the computerized trading system matches the order for the financial instrument from the first party to a corresponding order for the financial instrument from the second or some other party. In addition to matching bids and offers for the financial instruments entered by the first and second parties, the processes within step 1108 also determine whether the contingent terms of the orders are compatible. If the computerized trading system successfully matches the bids and offers from two parties, then the order is executed in step 1110 subject to the stated contingencies on price (including NAV), trading volume, or price and trading volume of the financial instrument. The executed orders will be reported to the applicable parties as described above with reference to FIG. 10.

Figure 12:
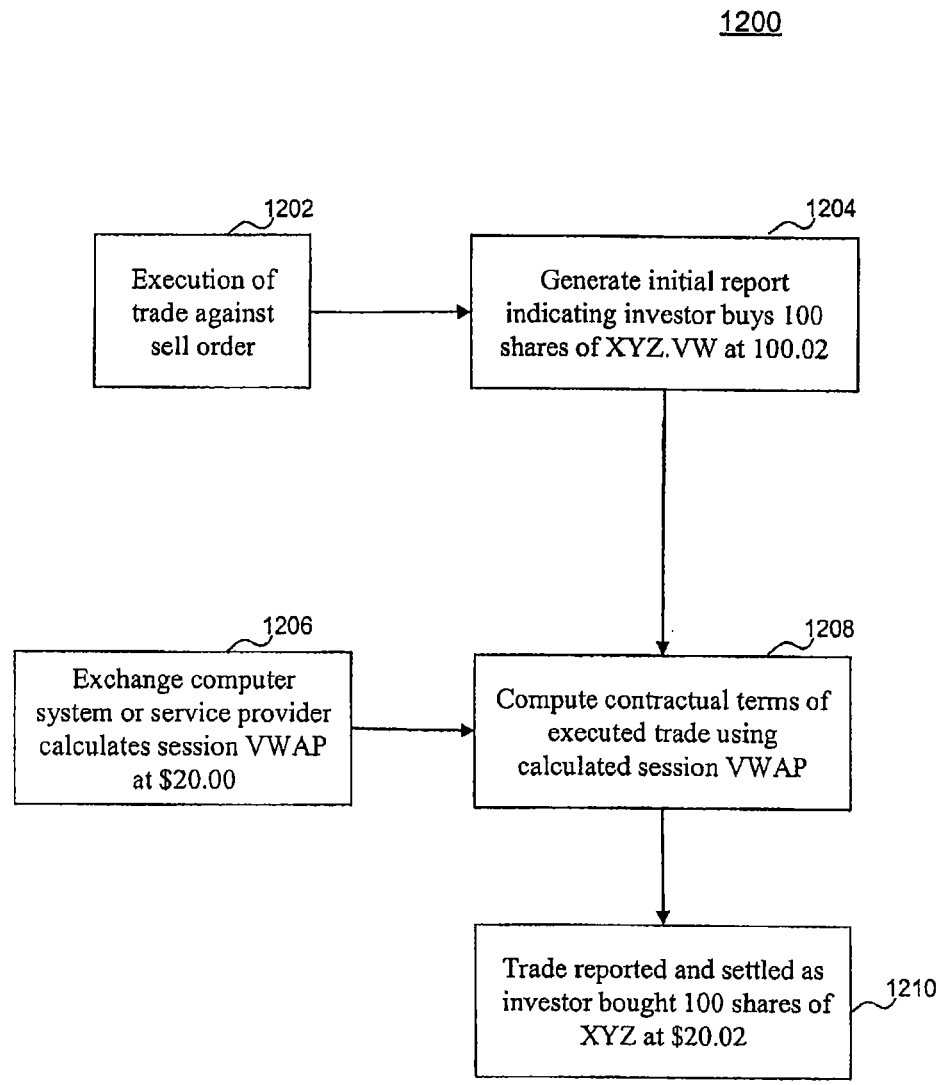
FIG. 12 illustrates an exemplary transaction in which an investor purchases a financial instrument subject to a price-based contingency in accordance with an embodiment of the present invention.

FIG. 12 illustrates an exemplary transaction 1200 in which an investor purchases a financial instrument that is subject to a price contingency in accordance with embodiments of the present invention. In step 1202, an investor enters a bid to purchase 100 shares of financial instrument XYZ.VW at 100.02 (or better) into a computerized trading system associated with an exchange or ECN on which XYZ.VW is traded. Purchasing shares of XYZ.VW at 100.02 or better indicates that the investor will purchase the shares for no more than two cents ($0.02) above a VWAP calculated for the trading session. The computerized trading system matches the investor's bid with a corresponding sell order that has been stored by the computerized trading system, and the trade for 100 shares of XYZ.VW is executed subject to the stated VWAP contingency during step 1202.

An initial report is generated in step 1204 indicating that the investor has purchased 100 shares of XYZ.VW at 100.02 and, after it is inspected by the investor as part of the comparison process, information on the trade is transmitted to the execution determination and calculation computer system 912 within FIG. 9. The executed trade is stored by the execution reporting mechanism pending arrival of information on the contingent price on which settlement is based.

In step 1206, the exchange computer system or a service provider engaged by the exchange calculates a VWAP for the financial instrument XYZ.VW at the completion of the trading session (a session VWAP). In the example of FIG. 12, the session VWAP of XYZ.VW may be calculated as $20.00. The session VWAP is then used in step 1208 to compute the contractual terms of the executed trade, and using the example of FIG. 12, an execution of a trade at 100.02 on a $20.00 VWAP results in a buy price of $20.02. The investor has purchased 100 shares of XYZ.VW at a share price of $20.02. This information is then reported on the exchange "tape" reporting mechanism and sent to settlement during step 1210. Using the symbology outlined above, the executed trade may be confirmed as "Bot 100 shares of XYZ @ $20.02."

Figure 13:
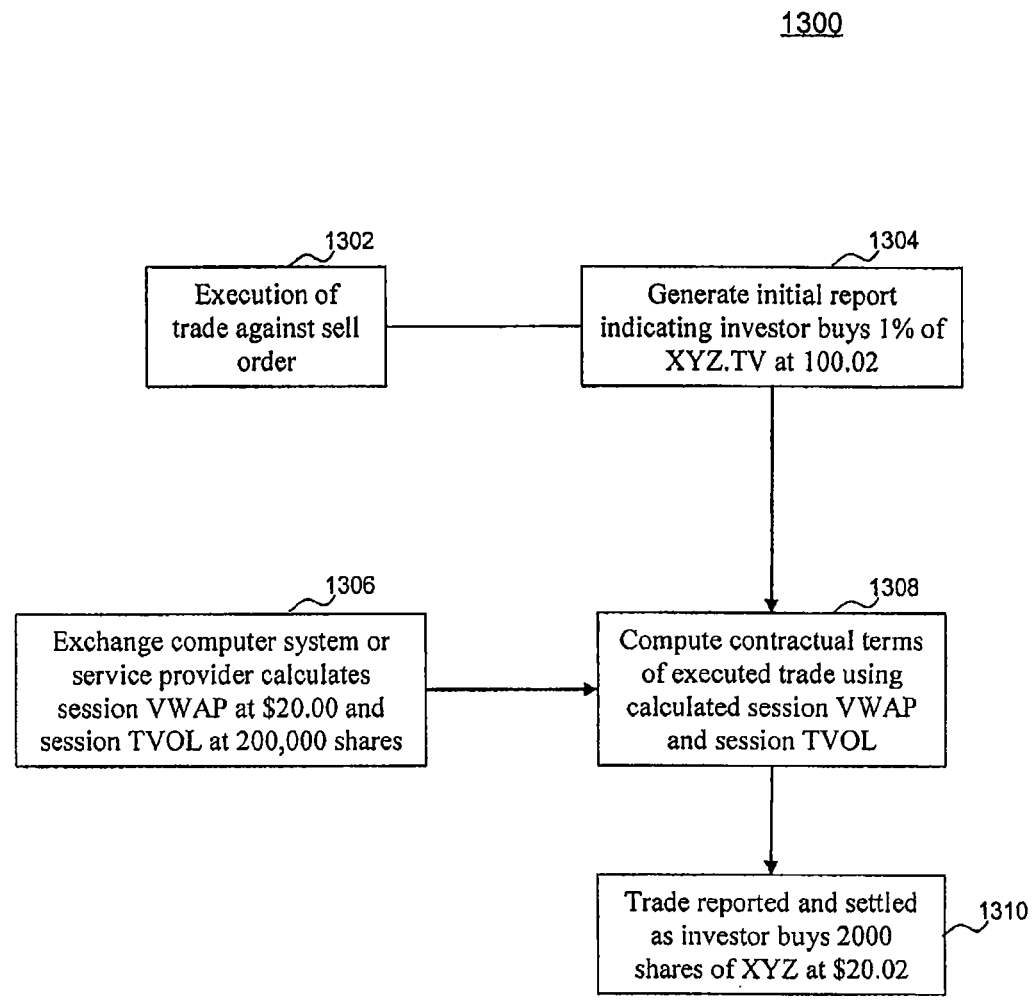
FIG. 13 illustrates an exemplary transaction in which an investor purchases a financial instrument subject to a volume-based contingency in accordance with an embodiment of the present invention.

FIG. 13 illustrates an exemplary transaction 1300 in which an investor purchases a financial instrument that is subject to a volume-based (TVOL) contingency in accordance with embodiments of the present invention. In step 1302, an investor enters a bid to purchase 1% of the session trading volume in XYZ at 100.02 or better (at no more than $0.02 over the volume-weighted average price (VWAP) for that session) into a computerized trading system. The computerized trading system matches the investor's bid with a corresponding sell order that has been stored by the computerized trading system, and the trade for 100 shares of XYZ.VW is executed subject to the stated price and volume contingency.

An initial report is generated in step 1304 indicating that the investor has purchased 1% of the session trading volume in XYZ at 100.02 (i.e., "Bot 1% of XYZ.TV at 100.02") and, after it is inspected by the investor as part of the comparison process, information on the trade is transmitted to the execution determination and calculation computer system 912 within FIG. 9. The executed trade is stored by the execution reporting mechanism pending arrival of information on the contingent price and volume on which settlement is based.

In step 1306, the exchange computer system or a service provider engaged by the exchange computes a session VWAP at $20.00 and a session TVOL at 200,000 shares. In the example of FIG. 13, 1% of 200,000 shares is equivalent to 2,000 shares and an execution at 100.02 on a $20.00 VWAP is a price of $20.02. The session VWAP and TVOL are used in step 1308 to compute the contractual terms of the executed trade, and using the example of FIG. 13, the investor has purchased 2,000 shares of XYZ.TV at a share price of $20.02. This information is then reported on the exchange "tape" reporting mechanism and sent to settlement during step 1310, and using the symbology outlined above, the investor's report may read "Bot 2000 shares of XYZ at $20.02."

In contrast to informal volume-linked orders placed with brokers today, the executed trade described within FIG. 13 requires a locked-in commitment to purchase the financial instruments based on the specified volume-based contingency, and this commitment occurs when the trade is executed in step 1302. Both parties are bound to the settlement price and, in this case, volume of the order that will be determined as soon as the contingent price and volume are known.

Figure 14:
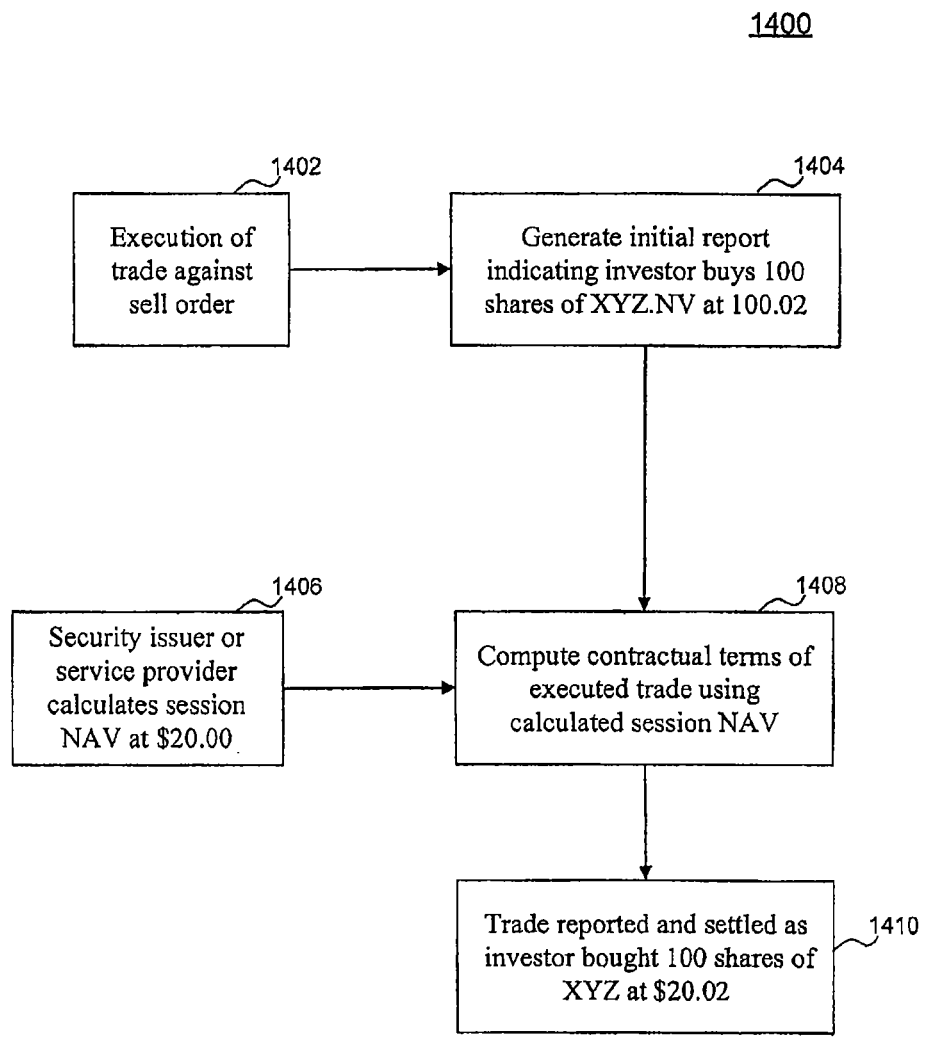
FIG. 14 illustrates an exemplary transaction in which an investor purchases a financial instrument subject to a net asset value-based contingency in accordance with an embodiment of the present invention.

FIG. 14 illustrates an exemplary transaction 1400 in which an investor purchases a financial instrument that is subject to a net asset value-based contingency in accordance with embodiments of the present invention. In step 1402, an investor enters a bid to purchase 100 shares of XYZ.NV at 100.02 (or better) into a computerized trading system on which XYZ.NV is traded. The order indicates that the investor will purchase the shares for no more than two cents ($0.02) above the net asset value (NAV) calculated at the end of the trading session. The computerized trading system matches the investor's bid with a corresponding sell order that has been stored by the computerized trading system, and the trade for 100 shares of XYZ.NV is executed subject to the stated NAV-based contingency within step 1402.

An initial report is generated in step 1404 indicating that the investor has purchased 100 shares of XYZ.NV at 100.02 and, after it is inspected by the investor as part of the comparison process, information on the trade is transmitted to the execution determination and calculation computer system 912 within FIG. 9. The executed trade is stored by the execution reporting mechanism pending arrival of information on the contingent price on which settlement is based.

In step 1406, the issuer of the financial instrument or a calculation agent engaged by the issuer calculates an NAV for the financial instrument XYZ.NV at the completion of the trading session. In the example of FIG. 14, the end of day NAV for XYZ.NV may be calculated as $20.00. This value is used in step 1408 to compute the contractual terms of the executed trade, and using the example of FIG. 14, an execution of a trade at 100.02 on a $20.00 NAV results in a share price of $20.02. The investor has purchased 100 shares of XYZ.NV at a share price of $20.02. This information is then reported on the exchange "tape" reporting mechanism and sent to settlement in step 1410. The trade is reported to the investor as "Bot 100 shares of XYZ @ $20.02."

The example of FIG. 14 describes a transaction for XYZ.NV that involves a contingency based on an end of day NAV. As described above in reference to Table 3, the NAV-based contingency is not limited to end of day NAVs, but may also incorporate NAVs computed periodically during a trading session. In such a case, the example of FIG. 14 would be modified such that the investor would purchase shares of XYZ.NA or XYZ.NB, orders of which would be contingent upon NAV values computed at various times during the trading session.

The foregoing embodiments describe exemplary systems, methods, and computer program products for trading financial instruments on an exchange or an electronic communications network (ECN). Within such embodiments, the financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

The embodiments described herein preserve the anonymity of trading parties and the confidentiality of their trading plans. Informal or direct party-to-party negotiation of contracts with price or volume contingencies in over-the-counter markets often reveals information that a trading party might prefer to keep confidential. For example, direct negotiations with a market maker are characteristic of most non-exchange future price or future volume-contingent trade entry. Such negotiations generally require the customer to reveal its identity to the broker or market maker at some point in the negotiation process. In contrast, with the present invention, if the parties use standard order formats and procedures characteristic of exchange trading, there is no need for a market maker or any participant in the transaction to know the identity of the ultimate parties to the trade. One advantage of concealing a trader's identity is that an exchange-based transaction need provide no information about the total size of the market participant's trading intention. Confidentiality in a very high degree can be assured by incorporating novel features into exchange systems such as the New York Stock Exchange's (NYSE) Anonymous SuperDOT (ADOT) order entry system.

Further, the trades described herein may be used as part of a block trading program. For example, a seller of a block of stock might find a buyer using any of the trading techniques and order types described herein. By executing an order with that buyer early in the block sale process, the seller might reduce the market impact of the sale by finding a natural buyer who might not be easy to find directly in the typical block trading process. This interaction may reduce transaction risks and costs for either or both parties to the trade.

Exemplary Computer Interfaces for Trading Financial Instruments on an Exchange

FIGS. 15A and 15B illustrate an exemplary computer graphical user interface (GUI) 1500 through which an order for a financial instrument may be entered on an exchange according to embodiments of the present invention. The example of FIGS. 15A and 15B is provided solely for purposes of illustration, and not limitation. Other means for entering an order for a financial instrument will be apparent to persons skilled in the relevant arts, and such other means are within the scope and spirit of the present invention.

In FIGS. 15A and 15B, the exemplary computer interface 1500 may directly communicate with a computerized trading system associated with the exchange or ECN, and computer interface 1500 allows a party to a trade, such as an investor, to enter information regarding a specific bid to purchase a financial instrument or a specific offer to sell a financial instrument on the exchange or ECN. The financial instruments may include, but are not limited to securities, mutual funds, exchange-traded funds, open-end funds, closed-end funds, stocks, swaps, futures, and other derivatives, either alone or in combination. Further, the embodiments described herein may accommodate any additional financial instrument that would be apparent to one skilled in the art and that may be traded on an exchange or ECN.

In the example of FIGS. 15A and 15B, the investor first specifies a particular financial instrument that will be subject to the bid or offer entered through the computer interface. In FIG. 15A, the investor enters the root symbol of the particular financial instrument in field 1502, and the entered root symbol should correspond to the ticker symbol of the financial instrument. For example, to trade the Standard & Poor's Depositary Receipts (SPDR), the investor would enter SPY in field 1502. In many embodiments, an extension would be entered in the same field as the root symbol, but some additional embodiments might require the investor to enter an extension in field 1504 to indicate a specific price-based, volume-based, or NAV-based contingency (or some other contingency or combination of contingencies) under which the order will be executed by the computerized trading system. For example, the investor may specify VW in field 1504 to enter an order for the financial instrument that is contingent upon a volume-weighted average price (VWAP) of the financial instrument computed at the end of a trading session. In a similar fashion, the investor may enter TW to enter an order for the financial instrument that is contingent upon a time-weighted average price (TWAP) of the financial instrument computed for the trading session. Further, TV may be entered into field 1504 to indicate an order for a specific percentage of the trading volume (TVOL) of the financial instrument over a specific time period. For a NAV-based contingency, the investor may enter NV within field 1504 to indicate that an order for the financial instrument that is contingent upon a session NAV, or alternatively, the investor may enter NA or NB to indicate that the order is contingent upon a specific hourly NAV.

The investor or the investor's agent will then specify an instruction in field 1506 to indicate the nature of the particular trade. For example, the investor enters "BUY" in field 1506 to enter a bid to purchase the financial instrument. In a similar fashion, the investor could enter "SL" in field 1506 to enter an offer to sell the financial instrument. Further, the investor may also enter "SSHRT^EXEMPT" within field 1506 to indicate that the order is exempt from the uptick rule, but must be designated as a short sale for other regulatory purposes.

The investor or the investor's agent will also specify a size of the order to be entered onto the computerized trading system in field 1508. In the case of a VWAP-contingent, TWAP-contingent, or NAV-contingent order for the financial instrument, the investor will enter the number of shares to be transacted within field 1508. In the case of a TVOL-contingent order, field 1508 may be filled with a percentage of the trading volume that will be subject to the entered order.

A share price associated with the order for the financial instrument may then be specified within field 1510. For price-contingent trades, the core basis price may be a standard set by the exchange that, as suggested above, might be a proxy value of 100 in a VWAP, TWAP or NAV contingent order, with ultimate pricing in currency increments around the settlement price. In the case of TVOL trades, a reasonable way to designate the price is also in increments or decrements around a VWAP basis calculated over the same period as the TVOL.

Once the share price has been specified within the exemplary computer interface, the investor may specify a limit price for the order in field 1512. The limit may be based on the dollar price of a share. In the case of a buy order, the limit price would be a cap by default. In the case of a sell order, the limit price would be a floor by default and the price would be the dollar price of the underlying share, not the "100" or other basis price used in the primary price field.

Once the information related to the order for the financial instrument has been entered in fields 1502 through 1512, the investor may submit the order to the computerized trading system by selecting the "SUBMIT" button 1514. Once submitted, the order is transmitted to the computerized trading system, which attempts to match and to execute the order according to the exemplary methods described herein.

FIG. 15B illustrates an exemplary set of entries into data fields of a computerized interface 1500 that would enable an investor to enter an order to purchase 1000 shares of SPY.VW at 100.05 on an exchange that trades SPY.VW. In FIG. 15B, the SPY.VW financial instrument is used for exemplary purposes only, and the computer interface 1500 supports any number of financial instruments that may be traded upon the exchange or ECN associated with the computerized trading system. Assuming that a session VWAP for SPY.VW is computed at $130.00, the entered order enables the investor to purchase 1000 shares of SPY.VW at a price of $130.05 per share, as the share price is below the specified limit price of $131.00.

In one embodiment, the computer interface 1500 within FIGS. 15A and 15B may be executed on a remote computer system that communicates with the computerized trading system through a communications path, such as a wired or wireless internet connection. In an additional embodiment, the computer interface is executed locally by the computerized trading system, and an investor on a remote computer system must access the computerized trading system to utilize the computer interface. Further, in the embodiments described above, the data within fields 1502 through 1512 may be entered directly by the investor, selected from a menu, or entered through any means that would be apparent to persons skilled in the art.

EXAMPLE 3

Methods, Systems, and Computer Program Products for Providing Risk Management Information and Tools to Traders in Fund Shares Actively managed and non-transparent index exchange-traded funds, hereinafter referred to as actively managed exchange-traded funds or simply as active ETFs, carry risks and costs for market makers that differ materially from the risks and costs associated with trading the indexed ETFs with fully transparent portfolios that have been traded since 1993. In the present context, "transparency" means that both the current contents of a transparent portfolio and any scheduled changes in the portfolio can be learned in advance of the change by anyone who cares to know. In an embodiment, the differences in disclosure between transparent indexed ETFs and active ETFs are accommodated, thereby facilitating market making in active ETFs. In such an embodiment, systems, methods, and computer program products provide risk management information and tools for market makers and other users of active ETFs in traditional markets and for market makers and other users of NAV-based active ETF secondary markets.

These tools may help market makers and other traders measure risks, manage their costs of trading and assess their ability to make effective markets in an active ETF. The trading cost and trading risk information methodology addressed herein is particularly useful because this method and process for offering actively managed and non-transparent index exchange-traded funds requires cutoff times for fund share creation and redemption commitments that are earlier than the creation/redemption cutoff at the market close used for the original index ETFs. The earlier cutoff is necessary because the creation/redemption basket for actively managed ETFs will ordinarily not match the fund portfolio exactly and because the actively managed and non-transparent index exchange-traded fund portfolio manager will usually trade to make changes in the fund's portfolio after a market maker commits to a creation or redemption but before the net asset value at which the creation or redemption is priced is determined. The fund portfolio manager will often sell some of the securities that are in a creation basket or buy some of the securities that are in a redemption basket after the creation or redemption commitment is made. The portfolio manager will also be buying or selling other securities to modify the fund portfolio. At least some of these transactions impose an indirect cost on the market maker that initiated the creation or redemption transaction. Important elements of the invention estimate the trading costs associated with this post-commitment trading.

In contrast to active ETFs, transparent index ETFs feature creation/redemption baskets that match the index fund portfolio very closely. Consequently, any tracking error between the fund and the basket for transparent index ETFs is small and essentially random. Most actively managed and non-transparent index ETF portfolio transactions made after the market maker commits to creation or redemption of ETF shares have an expected cost to the creating or redeeming market maker. From the market maker's perspective, the expected transaction cost is experienced in the form of an adverse effect on the prices used to value the creation or redemption basket on one hand and the fund portfolio on the other hand.

A simple example will illustrate how an early commitment to creation or redemption and subsequent trading by the fund portfolio manager will pass the cost of the trading from the fund to the market maker. Assume that the fund has sold a stock that still accounts for 15% of the assets in the creation basket and has replaced it with another stock that now accounts for 15% of the assets of the fund. The basket and the portfolio have identical percentage compositions, other than these two positions. After the market maker commits to a creation, the portfolio manager enters an order to sell the unwanted stock the fund will receive in the creation basket and to buy the stock that replaced the unwanted stock in the fund. On the margin, the sale from the creation basket will slightly depress the price of the stock being sold and the purchase in the fund will slightly increase the price of the stock being purchased. The sale will slightly decrease the value of the creation basket and the purchase will slightly increase the value of the fund shares when the basket and the portfolio are priced in the 4:00 p.m. net asset value calculation. The relative price change is an indirect transaction cost "paid" by the market maker.

In an embodiment, the indirect transaction cost "paid" by the market maker is calculated. The economic viability of market making in active ETFs depends partly on a market maker's ability to incorporate the expected cost of the portfolio manager's trading after a creation or redemption commitment into the bids and offers the market maker posts in the markets it makes in the fund's shares.

Transactions initiated by the portfolio manager in response to a creation or redemption commitment are likely to lead to a negative (unfavorable) tracking error for the market maker between the value of the fund and the value of the creation or redemption basket. Stated simply, the expected magnitude of this negative tracking error is a function of (1) a percentage composition difference between the creation/redemption basket and the portfolio manager's target fund portfolio and (2) an average transaction cost associated with the portfolio manager's trades. This relationship and the method of the trading cost calculation is discussed in detail below.

Fund portfolio transactions that take place after the creation or redemption commitment permit the fund to pass the costs of adjusting its portfolio on to the market maker and, ultimately, to the market maker's customers—the investors who are entering or leaving the fund. The cost of these transactions is a cost of market making in active ETFs. The market maker needs to know the expected or average magnitude of this cost. Knowing the expected cost, the market maker can develop a market making strategy that will reasonably assure that it can recover the negative tracking error it experiences in creating and redeeming active ETF shares when it trades with investors.

Actively managed and non-transparent index exchange-traded fund managers have a range of choices in the amount of information about portfolio composition they choose to reveal. The minimum S.E.C. disclosure requirement for all U.S. funds is that the portfolio composition must be disclosed quarterly with a 60-day lag. This means, for example, that the fund portfolio on March 31 must be disclosed by the end of May and the portfolio at the end of June must be published by the end of August. No fund can reveal less about its portfolio composition than this standard, but some funds will reveal more.

The maximum disclosure policy a typical active ETF manager might follow would reveal all "settled" positions in the fund. Specifically, to the extent that the portfolio manager has 5% of the fund's assets in a stock, and has no intention of materially increasing or decreasing the relative size of that position in the near term, that stock will occupy a settled 5% position in the creation/redemption basket until such time as the portfolio manager elects to reveal a change in the weighting of the position. As the position is sold, it will usually be maintained at 5% in the creation/ redemption basket until it has been liquidated entirely or, in some cases, reduced to a new equilibrium level.

In the most liberal disclosure of fund positions, a stock will ordinarily not be added to the creation/redemption basket until such time as it reaches the portfolio manager's target position in the fund. For example, if the portfolio manager begins to purchase a stock with a target commitment of 3% of the fund portfolio, the stock will not appear in the creation/redemption basket until such time as the 3% holding has been achieved. Unless the stocks in the portfolio are characterized by profound illiquidity or the portfolio manager is particularly slow in implementing changes, the creation/redemption basket should closely approximate the actual fund portfolio most of the time under this policy. Other disclosure policies might adopt the format of the SEC portfolio disclosure rule—quarterly, with a 60-day lag—with either more frequent updates, shorter lags or some combination of the two. In various embodiments, the needs of market makers and other participants trading funds are served using any of these disclosure policies and other disclosure policies and construction methodologies for creation/redemption baskets.

While mutual funds have sold and redeemed their shares at the net asset value (NAV) next calculated by the fund since 1968, mutual funds, exchange-traded funds and other securities for which an NAV is periodically calculated have not been traded on exchange or other (secondary) markets for settlement at or relative to a net asset value calculation. There is substantial evidence described in Edelen (1999), Green and Hodges (2002), and Gastineau (2004) that the mutual fund practice of offering free liquidity to permit fund share traders to buy and sell shares at net asset value in primary market transactions (trades with the fund) harms the non-trading shareholders of a fund by imposing a cost that the fund can never recover. The liquidity that has been provided freely by funds in the past can be priced efficiently in a secondary market that discovers prices at or near net asset value with investors and market makers supplying and demanding liquidity at market-determined prices relative to the NAV. Experience with the NAV sales and redemptions model used by mutual funds suggests substantial interest in such a secondary market trading mechanism for exchange-traded funds and for other instruments for which an NAV is periodically calculated. For example, retirement plan participants may readily adopt a secondary market NAV-based trading and pricing process for exchange-traded funds in preference to the intraday trading and pricing that has been characteristic of secondary market ETF trading since 1993. NAV-based secondary market trading in ETFs has been described above in Examples 1 and 2, in U.S. patent application Ser. No. 11/141,243, filed May 31, 2005, U.S. patent application Ser. No. 11/714,921, filed Mar. 7, 2007, and U.S. patent application Ser. No. 11/714,923, filed Mar. 7, 2007, the disclosures of which are incorporated herein by reference in their entireties; and in U.S. Provisional Patent Application No. 60/907,246, filed on Mar. 27, 2007.

An alternate trading mechanism, like secondary market NAV-based trading, will provide additional choices and additional risk management opportunities to market participants. Secondary market NAV-based trading, alongside a traditional ETF intra-day trading order book, will permit traders to modify the size of a net long or short position at a price linked to the terms on which they can create or redeem shares or otherwise transact in ETF shares close to the end-of-day prices of the ETF's portfolio securities. The presence of additional market participants, trading methods and trading venues generally increases liquidity. Volume rises and bid-asked spreads narrow. It is noted that, in contrast to the market on close (MOC) order type and informal trading instructions or trading algorithms whereby a broker attempts to provide an execution as close as possible to a market close or to a specified net asset value, the secondary market NAV-based transactions described herein are firm contracts for settlement at a specific relationship to an NAV calculation.

For both institutional and retail investors, net asset value-based trading in exchange-traded funds permits fund investors accustomed to the net asset value trading practices of mutual funds to trade exchange-traded fund shares at or relative to a net asset value to be determined in the future and for these investors to receive value indirectly for providing market liquidity by surrendering a trade timing option they have surrendered for no value in the past. Commitments by investors to trade at or relative to a future NAV can be of value to a market maker, encouraging tight markets early in the trading day for settlement relative to the end-of-day NAV. Furthermore, NAV-based trading can reduce trading costs and make such costs more predictable and controllable for accounts in employer-sponsored defined contribution plans, permitting the accounts to trade exchange-traded funds at low cost. These benefit plans can settle trades and carry exchange-traded fund positions in a manner similar to the way they trade and carry mutual fund shares, as described in U.S. patent application Ser. No. 12/056,958, entitled Methods, Systems And Computer Program Products For Automated Incorporation of Traded Fund Shares in Qualified Retirement Plans, filed on Mar. 27, 2008, and which is fully incorporated by reference herein.

An important characteristic of NAV contingent price markets is that risk and position management for a market maker active in these markets is different from the risk management and position management model a market maker uses when trading only in traditional markets. The interaction between traditional markets—e.g., the continuous auction market—and NAV-based secondary market trading can directly reduce some of the market maker's risks and enrich their opportunities for risk management.

If a traditional continuous auction market is the only organized market for an exchange-traded fund, the market maker focuses on the contemporary bids and offers in that market throughout the trading session and manages its inventory primarily by hedging price risk. In some cases, market makers have hedged price risk with the specific portfolio components of indexed exchange-traded funds. Increasingly, however, market making firms trade a number of different exchange-traded funds that collectively reflect risk exposures that can be hedged most effectively and economically with broad market hedging tools such as index futures contracts, other portfolio-based securities including indexed ETFs or derivatives covering diversified portfolios—such as options or futures contracts on indexes or on ETFs. ETF market makers have increasingly used instruments covering broad swaths of the investable universe that provide a high degree of liquidity and exposure to broad market risks to manage their price risks on a low-transaction cost, macro (large-scale or broad) risk basis. These market makers find that accepting some tracking error on price risk is an attractive risk management choice if the magnitude of the transaction cost reduction is large enough and the tracking error is random or predictable and manageable in size. In various embodiments, the tools described herein facilitate a market maker's analysis and management of transaction cost/tracking error tradeoffs.

The risks and costs market makers face in secondary market NAV-based trading of ETFs are different from the risks of providing liquidity in traditional ETF intraday trading. Traditional trading in exchange-traded funds under the continuous auction market model calls for market makers to provide continuous liquidity to buyers and sellers near the intraday value of the shares. The market maker extracts a spread between bids and offers over the course of a trading day and can create additional shares in the exchange-traded fund or redeem excess shares at the fund's net asset value each day.

The costs of trading transparent index portfolio baskets and the administrative costs of creation and redemption are generally low and consistent over the life of an index ETF.

Market making in the shares of active ETFs is more complicated. The relationships among the market maker's risks and costs change with the introduction of actively-managed and non-transparent index ETFs and with the introduction of NAV-based trading. The availability of NAV-based secondary market trading provides a direct mechanism for the market maker to adjust its market risk exposure to a fund throughout the day. The market maker can offset ETF share transactions in the continuous auction market with transactions in the NAV-based market and virtually eliminate net exposure to the price risk of the underlying portfolio. This new opportunity for price risk reduction does not come without its own costs and risks, however. In the case of any exchange-traded fund where there is not total portfolio transparency, the market maker's costs to create or redeem at the closing net asset value are predictable only with supplementary information provided by the fund or by one of the fund's service providers. These trading costs can be highly predictable and readily managed when the market maker or any other trader has appropriate supplementary information. In a market for commitments to buy and sell securities or other financial instruments at a price to be determined in the future, the market participants need new kinds of information on the variables that will determine a contingent price and on the costs to create or redeem shares of an active ETF to facilitate an estimate of the ultimate profitability of trading in both the traditional continuous auction market and around a contingent NAV. In an embodiment, the disclosed processes develop this necessary information and make this information available to market makers and other market participants.

Because portfolios and recent and ongoing portfolio transactions by active ETFs are not transparent, the trading spreads for shares of these funds typically will be wider than bid-asked spreads for index ETFs. Wider spreads are an appropriate characteristic of active ETF trading. However, shareholders in these funds will bear transaction costs associated with increasing or reducing the size of the fund only when they trade in the fund shares. The combination of the earlier creation/redemption commitment cut-off time and the transactions made by the fund between the cut-off time and the later calculation of the net asset value on which both fund shares and creation/redemption baskets are priced will transfer the transaction costs associated with increasing or decreasing the size of the fund from the fund to the market makers and these costs will be passed on to purchasers and sellers of fund shares in the secondary market.

In an embodiment, the risk management tools described herein are designed primarily to meet the risk management needs of market makers and other investors trading actively managed and non-transparent index exchange-traded funds in conventional markets and/or in non-conventional markets for settlement at or relative to a net asset value calculation. However, reference to any of these information items or combinations of several items as tools for market makers does not suggest that this information will be restricted to market makers or that only market makers will find the information or tools useful. Securities laws in the United States do not permit a fund or other issuer of a security to limit distribution of information that is not calculable from public information to favored traders. Calculation of much of the active ETF trading support information discussed herein requires use of confidential data from a fund and/or the fund's service provider or providers. Consequently, the results of these calculations will be disclosed to all interested parties.

Correspondence

Correspondence is a percentage measure of the degree to which the portfolio composition file (PCF)—the basket of securities used for creation and redemption of shares in an exchange-traded fund—matches or overlaps with the fund portfolio. Table 4 illustrates the concept of Correspondence or overlap in a simplified way by comparing hypothetical percentage holdings of a fund and the portfolio composition file used in creation/redemption of the fund's shares. The first column shows the percentage held in each of four securities by the fund, the second column shows the percentage of the same securities in the PCF basket used in creation and redemption transactions. The third column shows the Correspondence percentage between the two portfolios.

TABLE 4

Percentage Holdings - Calculation of Correspondence

|  | Fund | (PCF) Basket | Correspondence |
| --- | --- | --- | --- |
| IBM | 35% | 35% | 35% |
| GE | 40 | 40 | 40 |
| MSFT | 20 | 25 | 20 |
| GOOG | 5 | 0 | 0 |
|  | 100% | 100% | 95% |

Correspondence is determined in this simple example by listing the smallest of the two percentage positions in each row in the first two columns in the third column and adding the corresponding percentage positions in the third column. The positions in the fund and in the PCF in IBM and GE are identical. Knowledgeable observers of investment manager behavior would interpret this fact as an indication that these are stable positions in the fund portfolio where no transactions to increase or reduce the relative size of these holdings are under way. In the case of Microsoft (MSFT), the fund holds less stock (20%), than is reflected in the PCF basket, (25%). The smaller of these two numbers is entered in the third column to be used in the calculation of Correspondence because Microsoft accounts for at least 20% of both the portfolio and the basket. An appropriate interpretation of the smaller Microsoft position in the fund is that the fund is in the process of reducing or liquidating the Microsoft position. In an embodiment of an operation of an actively managed ETF, the Microsoft position in the PCF has not been reduced because reducing it would inform the market that the fund is in the process of selling Microsoft. In one embodiment, the PCF would not be changed until after the Microsoft position change was completed, or even later if the fund's portfolio disclosure policy requires a further delay.

The fund has a 5% position in Google (GOOG), which is not reflected in the (PCF) basket column. An appropriate interpretation of this information is that Google stock is being accumulated by the fund. The portfolio manager would not add Google to the disclosed PCF before the purchase was completed, i.e., until the Google position reaches its target percentage of the fund portfolio. The value for Google in the Correspondence column is zero. The sum of the numbers in the third column is 95%. Ninety-five percent is the Correspondence between the fund and the basket. The market maker who is told that the Correspondence is 95% knows that 95% of the value of positions in the revealed PCF basket match the value of corresponding holdings of the fund exactly.

In the example of Table 4, Correspondence is equivalent to a complement percentage of "Active Share," a measure of the extent a nominally actively managed portfolio differs in composition from the portfolio's benchmark index. The notion of Active Share was introduced in Cremers and Petajisto (2006). The applications of the two concepts are quite different, but both calculations measure the similarity or difference in two portfolios or securities baskets.

In an embodiment, the percentage Correspondence between the fund portfolio and the portfolio composition file (PCF) will be calculated and published at least daily. The percentage Correspondence can be updated during the day as needed should the standard share net asset value calculation procedure in use by funds today be modified in the future. In an embodiment, correspondence is the first stage in the calculation of some other trading tools to facilitate hedging and transaction cost management in active ETF trading and market making. The first of these other tools is the Portfolio Adjustment Cost of Trading (PACT).

Portfolio Adjustment Cost of Trading (PACT)

Knowing the expected Portfolio Adjustment Cost of Trading (PACT), and how the PACT might vary, is a key element of trading cost management for any market maker or other large trader in shares of an active ETF. A PACT estimate is important to an ETF market maker because the active ETF manager can trade for the fund portfolio between the time a market maker commits to a creation or redemption transaction and the determination of the end-of-day prices used in calculating the fund's net asset value and in pricing the PCF used as the creation or redemption basket. PACT is an estimate of the cost of the portfolio manager's transactions that will be transferred to the market maker who creates or redeems fund shares when the net asset values of the two portfolios are calculated.

In an embodiment, PACT is calculated from trading costs estimates for the securities to be traded, but it is expressed as a percentage of the value of the creation unit of fund shares. The reason for expressing PACT as a percentage of the value of the creation unit is that the PACT is a measure of the cost of creating or redeeming. Its relevance is that the cost of the trading it represents is only meaningful as a percentage of the value of the fund shares created or redeemed in a specific transaction on a specific day. The cost of this element of the fund's trading is an indirect expense of the market maker. Hence, the market maker must have a useful measure of these trading costs and take them into account in evaluating appropriate bids and offers to post when making markets for the exchange-traded fund's shares.

Starting with a simplified formula for calculation of PACT to illustrate the process, we note that:

PACT=2×(1−Correspondence)×(average % adjustment transaction cost)

This simplified formula expresses the expected transaction costs for creation or redemption of fund shares and associated trading by the fund as the average adjustment transaction cost associated with trading the securities that are unmatched between the fund and the portfolio composition file. Again, PACT is expressed as a percentage of the value of the creation unit. The actual calculation is done on a position by position basis using the unmatched percentage position of each security times the estimated transaction cost associated with the expected transaction size and transaction method for trading that security. Reflecting the position by position transaction cost calculation, a more useful formulation of the PACT calculation is:

$$PACT_n = 2(1-C)\sum_{r=1}^{i}(V_r \cdot E_{V_r}),$$

where:
n=the number of creation or redemption units covered by the calculation. Any transaction cost estimate must reflect the greater market impact costs usually associated with larger transactions. Thus, the calculation of $PACT_n$ is the calculation for n creation units. The market impact of portfolio adjustment transactions will be smaller for one or two creation units than it will be for 10 or 20 creation units. Market makers and other market participants will want to know how transactions consisting of different numbers of creation or redemption baskets will impact the market maker's costs to create or redeem. PACT will be calculated for different numbers of creation or redemption baskets, as described in more detail below;

C=Correspondence;

r=the securities (1, . . . , i) for which the fund to PCF basket match is not exact. There is no reason for the number of securities subject to trading to be made public. The trading cost information that market makers and other investors need is the PACT total for the number of baskets that are actually being created or redeemed, not the trading costs associated with any specific security;

$V_r$=For each security, r, a value percentage of the securities to be transacted per creation unit (fund securities and PCF securities) between the creation/redemption commitment at, say, 2:30 p.m. and the net asset value calculation at the end of the day. In an embodiment, PACT is calculated based on six securities, each equal in value to 5% of the creation unit, and three of such securities purchased for (sold from) the fund in a creation (redemption) and three of such securities sold from (purchased for inclusion in) the PCF by the fund manager in connection with a creation (redemption); and $E_{V_r}$=Expected cost of transacting the $V_r$ in each security to be traded under the trading policy chosen by the portfolio manager to adjust the fund portfolio for creation or redemption transactions. The expected cost is expressed as a percentage of the value of the trade and it is the cost of trading the number of shares of the security to be traded for n creation or redemption units. In an embodiment, the portfolio manager will either adopt a standard transaction method for entry of adjustment orders or use the transaction cost model's evaluation of possible order entry methods to minimize expected transaction costs. In the case of small creation or redemption orders in liquid securities, a market-on-close order policy will usually be followed. For larger orders and less liquid securities, the portfolio manager may base the transaction cost estimate on placing a working order between, for example, 2:30 and 3:30 p.m., followed by completing the remainder of the transaction with a market-on-close order.

The investment manager or a fund service provider calculating PACT will use appropriate transaction cost estimates for the transaction type and for the quantity of the specific securities to be purchased and sold to get to the target portfolio for creation/redemption transactions of various sizes. In the Google/Microsoft example, as described below in Table 5, the PACT estimate for a creation unit is based on the estimated cost of selling a number of Microsoft shares equal to 5% of the value of the creation basket between, for example, 2:30 and 4:00 p.m., or in a market-on-close order, and purchasing a Google position equal in value to 5% of the value of the creation basket over the same interval. Given the high liquidity, active trading and narrow spreads in these two stocks, the PACT for a single creation/redemption basket is unlikely to be material. If the value of a creation unit is about $1 million, the transactions in Microsoft and Google would be about 1,700 and 100 shares, respectively. If the positions to be traded are larger or the capitalizations of the stocks are smaller, the PACT can be much larger than the value indicated in Table 5 for a hypothetical 5% position in each stock.

TABLE 5

Calculation of Correspondence and PACT

| Securities | Fund Holdings | PCF | Correspondence | Transaction Cost (1 CU) | Weight | PACT |
|---|---|---|---|---|---|---|
| A | 20 | 20 | 20 | | | |
| B | 10 | 10 | 10 | | | |
| C | 15 | 15 | 15 | | | |
| D | 20 | 20 | 20 | | | |
| E | 15 | 15 | 15 | | | |
| Microsoft | 15 | 10 | 10 | .0080% | .05 | .0004% |
| Google | 5 | 10 | 5 | .0152% | .05 | .0008% |
| Total | 100% | 100% | 95% | | | .0012% |

Note:
Value of 1 Creation Unit (CU) = $1 million

The transaction costs in the 1 CU (one creation unit) column in Table 5 reflect the cost borne by the market maker because the portfolio manager will sell about 1700 shares of Microsoft and buy about 100 shares of Google between a creation commitment at 2:30 p.m. and the market close, probably at the market close. These transactions will tend to slightly reduce the price of Microsoft which is more heavily weighted in the PCF than in the fund holdings and slightly increase the price of Google, which is not in the PCF at all, but is in the fund holdings. When both baskets are priced in 4:00 p.m. net asset value calculations, the market impact of the transactions will reduce the value of the PCF and increase the value of the fund, each very slightly. These value effects will be an indirect expense to the creating market maker.

When the size of a creation or redemption transaction is large or the liquidity of the securities is limited, the PACT may have a significant impact on the bid-asked spread in the market for shares of the ETF.

In an embodiment, service providers for the fund will calculate PACT estimates that market makers will incur for various sized creation and redemption transactions on a given day. If a single day's creation or redemption transactions in a fund total tens or hundreds of millions of dollars, there will be a market impact cost that goes substantially beyond the average quoted stock spread for the portfolio. Significant market impact is unlikely under most circumstances with small creation and redemption transactions, but the methods and processes described herein can be extended to incorporate very large creation and redemption transactions. In an extreme case, if trading costs are too large to permit market maker profitability with a non-transparent portfolio, market makers and investors will not participate in the market and the fund will fail.

The cost ranges in the illustrations offered herein do not include extremely large transactions for several reasons: first, smaller numbers are easier to understand and utilize; second, creation and redemption transactions generally affect a small fraction of the assets of the fund on any single day; and third, the Correspondence between the fund and the PCF will generally be 75-80% or higher, spreading the transaction costs associated with traded securities over a large creation or redemption transaction. Very large transactions in a single security will be rare occurrences. The embedded transaction costs of any active ETF likely to be offered will not only be predictable, they will also be low enough to attract market makers.

In one embodiment, a distribution program for PACT information provides an estimate of the PACT for one, five and 10 creation or redemption units for a typical actively managed ETF. The appropriate number of units for the calculation depends in large measure on creation/redemption activity in the shares of the fund. A market maker may face expected transaction costs of, say, 5 basis points for a single creation basket. Should other market makers create on the same day, the number of creation baskets on that day will be more than one and the appropriate PACT estimate for each creating market maker on that day is the estimate for the net number of baskets created on that day.

The PACT calculation for the Microsoft/Google example provides a very simple illustration of this calculation. In this example, the aggregate transaction cost associated with buying Google and selling Microsoft (each trade equal in value to 5% of the value of the basket) would be 0.0012% of the value of the unit. This cost is 0.12 basis points or about a tenth of a cent on $100. Other examples below will illustrate larger PACT values associated with larger transactions and less liquid securities.

Under the creation/redemption policies followed by exchange-traded index funds, the funds can collect a cash transaction charge from a market maker when the fund transacts in connection with a creation or redemption. If the fund elects not to make one or more of the transactions covered by the PACT estimate, the fund could charge a cash transaction fee in the amount of the estimated transaction cost for the securities it elected not to trade between the commitment and the NAV calculation. Such a fee might be collected as an alternative to trading after the commitment was received if the fund was engaged in ongoing transactions in some of the securities to be purchased or sold. A fee might be charged as an alternative to trading if the portfolio manager believes that entering a market-on-close order would have an adverse effect on an ongoing trading program in one or more securities and prefers to wait and execute the transaction covered by the PACT as part of the fund's ongoing trading in the security or securities involved. The fund could charge the market maker cash in the amount of a security's component of the PACT estimate for one or more transactions if the fund manager chose to delay an execution. If the fund manager believed that the cost of accommodating the creation or redemption was reduced by the patient trading policy, the cash charge could be reduced.

PACT estimates are developed from pre-trade transaction cost estimates produced by a trading cost analysis model. In the examples described herein, the pre-trade transaction cost estimates are computed using the ITG Logic pre-trade cost analysis model offered by Investment Technology Group (ITG) of New York, N.Y. In additional embodiments, PACT estimates may be developed from other trading cost analysis models, including, but not limited to, the FlexTQM system developed by FlexTrade Systems of Great Neck, New York and the T-Cost Pro system offered by Quantitative Services Group (QSG) of Naperville, Ill. The cost estimates produced by such models reflect expected transaction costs for specific types of transactions in specific securities. Depending on the source of the model, these trading cost estimates incorporate variables such as the size of an order, the size of the company's floating share capitalization, the average trading volume in the security, the typical bid-asked spread, the market impact associated with orders of different sizes, and the trader's execution policy. These transaction cost estimates are highly accurate on average, but the cost of a specific trade may differ substantially from the estimate depending on the pattern of orders in the market for the security at a given time.

The actual cost incurred by the market maker reflected in the pricing of the creation/redemption basket and the fund net asset value is not the PACT estimate. It is the actual cost experienced. When creations and redemptions occur, the fund will publish the realized transaction costs reflected in the implementation of the actual transactions made by the fund. Market makers will be able to compare estimates to actual costs for the number of creation units traded on a given day.

Figure 16:
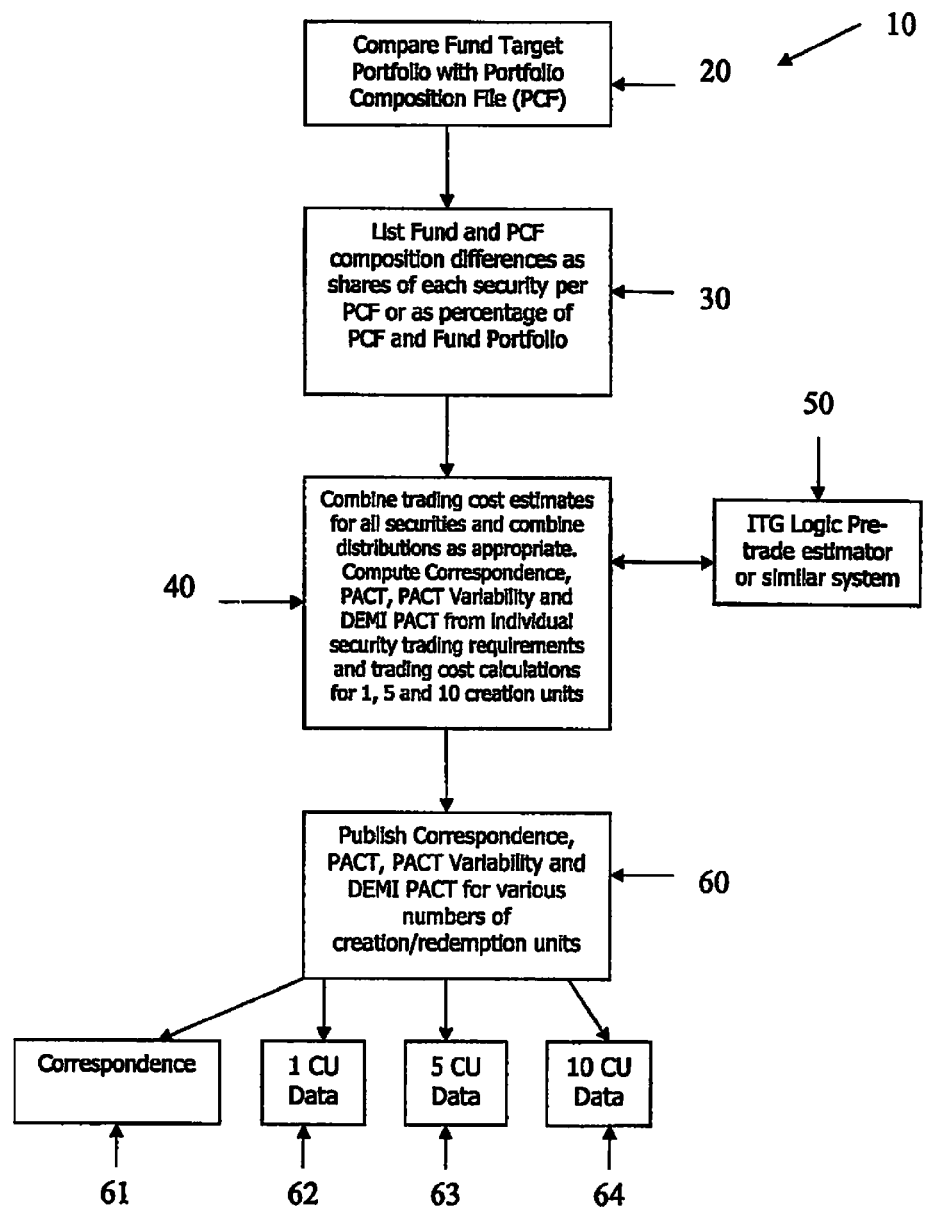
FIG. 16 depicts an exemplary process for calculating Correspondence, Portfolio Adjustment Cost of Trading (PACT), Portfolio Adjustment Cost of Trading Variability (PACT Variability) and a one-sided transaction cost estimate (DEMI PACT), according to an embodiment of the present invention.

FIG. 16 is a flow diagram that illustrates an exemplary process 10 for calculating Correspondence, PACT, PACT variability and DEMI PACT, according to an embodiment of the present invention. FIG. 16 illustrates a general way in which information on the differences between the fund target portfolio and the portfolio composition file are extracted and used with data from the trading cost estimation model to calculate (1) composition differences between the PCF and the fund portfolio (2) transaction costs and (3) transaction cost variability for individual securities that will be traded after a creation or redemption commitment is received by the fund.

In step 20, the fund's actual target portfolio is compared with the portfolio composition file. A list of composition differences for unmatched securities is made in step 30, preparatory to the transaction cost calculation and to develop the Correspondence measure. Correspondence, PACT, PACT Variability and DEMI PACT from individual security trading requirements and specific stock trading cost estimates are computed for one, five, and ten creation units in step 40 using ITG Logic pre-trade estimates of transaction costs or estimates from a similar system, shown generally at 50. The combined trading cost estimates for all securities to be traded and the combined distributions are assembled for various numbers of creation units and published in step 60. The numbers published in a particular implementation would include Correspondence, shown generally at 61, and PACT, PACT Variability and DEMI PACT shown generally for one creation unit at 62, for five creation units at 63, and for ten creation units at 64. In additional embodiments, other numbers of creation units are possible and may be employed if the number of creation units transacted in a fund were frequently in excess of ten units.

PACT cannot be calculated with any degree of accuracy from publicly available information. PACT information must be furnished by or at the direction of the fund manager or a service provider to the fund as a risk and cost management tool for market participants. This information is useful to any investor who understands that the trading spread in the shares of an ETF will be based in part on the costs that market makers in the shares of that fund incur as a result of portfolio adjustment trades made after the fund receives a creation or redemption commitment. When the market maker uses the PCF as a hedging basket and the fund trades to get to its target portfolio by the time the NAV is calculated, the PACT is the best available estimate of the marker maker trading costs that will be embedded in the creation/redemption of fund shares.

PACT Variability

PACT Variability is a calculation related to PACT that estimates the standard deviation of the single point PACT estimate. If the estimate of PACT for a specified number of creation units of a fund is 4 basis points (0.04%) and the PACT Variability is estimated at 16 basis points (0.16%), market makers will expect the actual PACT to fall between −12 and +20 basis points (−0.12% and +0.20%) about two-thirds of the time. This statement oversimplifies the significance of PACT Variability because these trading costs are generally not normally distributed. The fund may accommodate traders by providing additional information on the shape of the distribution (i.e., skewness and kurtosis) and/or information on PACT percentile ranges (e.g., 25th and 75th percentiles). Experience with the model suggests that information on the shape of the distribution is unnecessary. The aggregation of a number of purchase and a number of sale transactions into a single PACT calculation should reduce the net variability and, by the central limit theorem, bring the characteristics of the combined distribution closer to the characteristics of a normal distribution. An example of some effects of incorporating a number of trades on PACT Variability is provided in Table 6.

TABLE 6

Data for Trading Cost and Variability Estimates

A. Data for PACT, DEMI PACT and PACT Variability Calculations - Stocks Used

| Company | Symbol | Market Cap $ Billion | Price Dec. 29, 2006 | # Shares per $50,000 |
|---|---|---|---|---|
| Google | GOOG | $ 90.9 | $460.48 | 109 |
| Microsoft | MSFT | $258.3 | $ 29.86 | 1674 |
| Longview Fibre | LFB | $ 1.4 | $ 21.95 | 2278 |
| Republic Services | RSG | $ 4.6 | $ 40.67 | 1229 |
| Fossil Inc | FOSL | $ 1.0 | $ 22.58 | 2214 |
| LKQ Corp | LKQX | $ 1.0 | $ 22.99 | 2175 |

B. Transaction Cost Estimates for 1, 5 and 10 Creation Unit Size Transactions in Basis Points

| | Buy/Sell | 1 CU | 5 CU | 10 CU |
|---|---|---|---|---|
| GOOG | Buy | 0.8 | 0.9 | 1.1 |
| MSFT | Sell | 1.5 | 1.7 | 1.9 |
| LFB | Buy | 6.5 | 9.4 | 12.7 |
| RSG | Sell | 1.9 | 2.9 | 4.2 |
| FOSL | Buy | 5.7 | 11.7 | 16.9 |
| LKQX | Sell | 5.6 | 11.5 | 18.8 |

C. Transaction Cost Variability Estimates for 1, 5 and 10 Creation Unit Size Transactions in Basis Points

| | 1 CU | 5 CU | 10 CU |
|---|---|---|---|
| GOOG | 40 | 51 | 55 |
| MSFT | 24 | 26 | 25 |
| LFB | 40 | 51 | 51 |
| RSG | 26 | 31 | 34 |
| FOSL | 49 | 55 | 57 |
| LKQX | 74 | 91 | 91 |
| Aggregate (combined distribution) | 18 | 22 | 22 |
| Aggregate (two direction offset) | 16 | 19 | 19 |

Source: ITG - Transaction cost estimates are rounded to the nearest 0.1 basis point and variability estimates to the nearest whole basis point to simplify the example The examples in Table 6 show the data used for PACT and PACT Variability calculations for two large, two mid-cap and two small-cap stocks. These stocks are described summarily in Section (A) of Table 6. Note that whereas Microsoft, one of the largest companies, has a market capitalization of $258.3 billion, the market caps of Fossil and LKQ Corp are approximately $1 billion each. The right-hand column of first table segment A shows the number of shares of each of the six stocks needed to constitute a $50,000 position. The calculations made here are based on a $1 million creation unit with a PCF of about the same value. Each of these companies represents 5% of the creation unit value.

Section (B) of Table 6 describes average transaction cost estimates for one, five and 10 creation units transacted in each of the six securities in basis points on the market value of each security. Note that the smaller cap stocks not only start with a higher transaction cost estimate, but their transaction cost tends to rise more quickly as the size of the transaction increases. Section (C) of Table 6 shows transaction cost variability estimates, again expressed in basis points on the share price of the specific securities to be traded.

In the examples of Table 6, transaction cost variability is much larger than the transaction cost estimate itself. These distributions have very large standard deviations and the actual transaction costs in a specific instance can easily be negative, i.e., the transaction can occur at a price better than the price estimated by the transaction cost model. While the average transaction cost estimate is a good estimate, the variations can be very high.

In combined variability estimates at the bottom of Table 6, variability drops in two stages: first, simply combining trades in six securities reduces the variability of the total trading cost; and second, some transactions will be purchases and some will be sales, removing some of the variability attributable to overall market movements and their effect on transaction costs. The fact that some of these transactions are purchases and some are sales will tighten up the overall variability estimate. The effect is modest, however, because the model assumptions used require a transaction within a narrow time window—2:30 to 4:00 p.m. Market movements in this short a period are typically modest. Note at the bottom of Section C of Table 6 that the aggregate transaction cost variation for all of the six stocks together, and in two-way transactions, is less than the transaction cost variability of the stock with the smallest stock specific transaction cost variability. To summarize, averaging the impact of trades in a number of securities, regardless of any price behavior relationships the securities might have or not have with one another, will reduce the variation. When the fact that some trades are buys and some are sells is taken into account in the last line of data in the table, the transaction cost variability is even lower. Before using the data in Table 6 to make PACT and PACT variability calculations, we describe the most important remaining PACT calculation, DEMI PACT, and several important performance measurements that will provide additional information to support trading and market making.

DEMI PACT

DEMI PACT is not just half of PACT. Recall that PACT is an estimate of the transaction costs a market marker will incur in connection with the creation or redemption of an active ETF when the fund trades between the time the market maker commits to a creation/redemption and the 4:00 p.m. net asset value calculation when the securities in both the fund portfolio and the portfolio composition file are priced for the creation or redemption. The PACT calculation assumes the market maker owns the PCF basket when it makes the creation or redemption commitment. The subsequent transactions are necessary because the portfolio composition file in an active ETF will not track the price performance of the fund portfolio to anything like the degree that an index ETF's PCF will track its fund's NAV. As a consequence of likely tracking error, market makers will often prefer to use portfolio-based risk management tools and to purchase the securities necessary to create fund shares or to sell the securities they will receive in a redemption of fund shares using market-on-close orders on the day of a creation or redemption. An incentive for using such market-on-close orders to accumulate or dispose of the basket is that the market maker will be trading at the same price the fund will use for pricing components of the portfolio composition file if the PCF basket is purchased or sold at the close on the day a creation or redemption occurs. If the market maker trades the securities in the basket at the same price that the fund prices them, the costs the market maker will incur will not include costs associated with the fund manager's trading of any positions in the creation basket. These transaction costs will be absent because the market maker buys at the same prices as the fund sells, or sells at the same price the fund buys in the case of a redemption. The stocks in the basket will be priced at the same price the market maker paid or received for them. The DEMI PACT, then, is the trading cost estimate for the fund's purchase or sale of positions that are in the fund, but that are not in the creation/redemption basket. The market maker cannot avoid the market impact of these fund trading costs by trading at the close.

Like the PACT calculation, DEMI PACT will be calculated for various numbers of creation and redemption units. While it will average close to half of PACT, there may be differences in the nature of securities newly added to the fund and the unwanted securities in the basket. A DEMI PACT calculation will be made just for the securities in the fund that are not in the PCF. A DEMI PACT Variability calculation will show higher relative variability than a PACT Variability aggregate combined distribution calculation because (a) there will be fewer securities on just one side of the portfolio manager's post-commitment trading and (b) all transactions with impact will be purchases in a creation or sales in a redemption. DEMI PACT Variability is not discussed in detail or separately noted in connection with the discussion of the calculation process in FIG. 16 because the process is very similar to the PACT Variability calculation.

Outperformance of Fund vs. PCF and/or Indexes

Investors buy actively managed or non-transparent index funds because they want to achieve performance superior to what they might obtain from a traditional transparent index fund. Many studies of the performance of active managers relative to benchmark indexes and relative to index funds have suggested that investors seeking better performance through active management are likely to be disappointed. Recently, however, new approaches to measuring the value that an active manager's securities selection process can bring to investors have found that many active managers do add value with their securities selections and that it is often possible to detect manager skill. Specifically, recent studies have found that: (1) manager value-added is obscured by combining results for true active managers with results for managers who are closet indexers with active management costs (Cremers and Petajisto, 2006); (2) the ability of managers to value securities can be obscured by flows of investor funds into and out of mutual funds (Green and Hodges, 2002 and Alexander, Cici and Gibson, 2006); and (3) managers with superior stock selection skills can be identified and their skills strongly persist (Harlow and Brown, 2006 and Wermers, Yao and Zhao, 2006).

Information on the recent relative performance of an actively managed ETF portfolio and the fund's PCF can be useful to market makers and other investors. The fund's recent Outperformance relative to one or more indexes will also be useful to investors. The formal evaluation benchmarks for funds are typically widely used indexes that can be traded in the form of index hedging instruments, including index futures and index ETFs that market makers might use to hedge their positions in the actively managed ETF. The market maker can use Outperformance information the fund or its service providers publish to measure the hedging risks associated with a fund's Outperformance or Underperformance. (Underperformance is Outperformance with a negative sign.) In an embodiment, Outperformance calculations can help market makers assess the appropriateness of being net long or net short the shares of the actively managed exchange-traded fund relative to individual indexes, combinations of indexes and the PCF. When combined with information on Correspondence, correlation, tracking error, etc. to evaluate the suitability of the PCF and financial instruments based on specific benchmark indexes or combinations of indexes as appropriate hedging tools, the Outperformance calculation can add an additional dimension to a trader's risk management calculations.

In an embodiment, Outperformance of the fund versus (1) the fund's benchmark index, (2) a weighted basket of indexes that has tracked the performance of the fund's current portfolio closely in the recent past, or (3) the PCF can be calculated on an intra-day basis and at various greater intervals, such as one day, five days, one month or even longer periods, to indicate any momentum characteristics that the fund manager might have succeeded in incorporating (or failed to avoid) when constructing the fund portfolio. The relative performance calculations can reflect the fact that the fund bears expenses that some index hedging instruments do not incur or all calculations can be made without expenses. In an embodiment of an Outperformance calculation similar to a Correspondence calculation, tracking error and PACT calculations would compare the current fund portfolio with both the current PCF and current composition indexes. The reported or historic index compositions can alternatively be used in the comparison.

Table 7 offers a sample of Outperformance calculations based on current composition for three portfolios or baskets: the fund, the fund's benchmark index and the portfolio composition file. The first column of data lists current fund portfolio performance for the current day at a specified time, prior day, prior five days, month-to-date, and prior 25 trading days Similar calculations are made for the benchmark index and the PCF. Outperformance comparisons of the fund to the benchmark index and the fund to the PCF are also provided. A comparison of the fund to a basket of indexes is illustrated in a later table.

TABLE 7

Outperformance Calculation (Current Composition)

|  | Fund | Fund Versus Benchmark | Benchmark Index | PCF | Fund Versus PCF |
|---|---|---|---|---|---|
| Performance Current Day (at X:00 p.m.) | +1.0% | +0.1 | +0.9 | +1.0 | — |
| Prior Day | +1.5% | — | +1.5 | +1.4 | +0.1 |

TABLE 7-continued

Outperformance Calculation (Current Composition)

|  | Fund | Fund Versus Benchmark | Benchmark Index | PCF | Fund Versus PCF |
|---|---|---|---|---|---|
| Prior 5 Days | +2.0% | — | +2.0 | −1.9 | +0.1 |
| Month-to-Date | +1.5% | +0.1 | +1.4 | +1.4 | +0.1 |
| Prior 25 Trading Days | +2.5% | +0.1 | +2.4 | +2.4 | +0.1 |

If a portfolio manager is consistently outperforming or consistently underperforming the portfolio composition file or the fund's benchmark index, the relative performance has implications for a market maker in managing its risk. If the fund is consistently performing better than the benchmark index and the portfolio composition file, a market maker will be more inclined to be long shares of the fund. On the contrary, if the fund is performing poorly relative to the PCF, the benchmark index, or a basket of indexes, the market maker might use either the PCF or instruments linked to indexes in hedging and try to be short shares of the fund.

Publishing the Supplemental Trading Tools

In an embodiment, Correspondence, PACT, PACT Variability, DEMI PACT, DEMI PACT Variability and Outperformance relative to a benchmark index, to the PCF, and to a combination of indexes will be published daily and intraday with other information in tabular or other form for an actively managed exchange-traded fund. These tables will be accessible by fund and by data item so that a market maker or other trader can select items needed and incorporate the information into risk management programs. The PACT, PACT Variability, DEMI PACT and DEMI PACT Variability calculations in Table 8 are based on 85% Correspondence and the Buys and Sells from Table 3 are each equal to 5% of the portfolio. Note that in the calculations behind the data in Table 8, the PACT, DEMI PACT, PACT Variability and DEMI PACT Variability are all based on the total value of the creation unit, not just on the value of the specific securities to be traded.

TABLE 8

Supplementary Trading Data Summary

| Fund: ABC | PCF: ABC ver 1[1] | | | Benchmark Index | |
|---|---|---|---|---|---|
| Correspondence | 85% | | | 60%[4] | |
| Correlation | 98% | | | 97% | |
| Tracking Error[2] | +0.5% | | | +0.1% | |

| PACT and PACT Variability[5] | PACT 1 CU/A[3] | Var | PACT 5 CUA[3] | Var | PACT 10 CUA[3] | Var |
|---|---|---|---|---|---|---|
| PACT | 0.011% | 0.027% | 0.019% | 0.032% | 0.028% | 0.033% |
| DEMI PACT | 0.006% | 0.023% | 0.010% | 0.027% | 0.015% | 0.028% |

| Outperformance of Fund (basis points) | Current Day | Prior Day | 5 Days | 20 Days |
|---|---|---|---|---|
| vs. current PCF | +0.1 | +0.2 | −0.4 | +1.0 |
| vs. S&P 500 | +0.1 | +0.4 | −0.2 | +0.2 |
| vs. best fit Index Basket | +0.1 | +0.2 | −0.1 | +0.1 |

[1]Multiple versions of the PCF are available for some funds. The standard version will be used in Correspondence calculations.
[2]22-trading day moving average tracking error on current composition of the fund portfolio and PCF (ex expenses). Returns as reported on historic composition or based on current composition as disclosed. Tracking error is signed. A positive tracking error indicates better performance for the fund.
[3]CUA stands for Creation Unit Aggregation, the standard number of fund shares exchanged for a single PCF basket. The value of a CUA in the example is $1 million
[4]The Correspondence of the fund to the Benchmark Index is the complement of the Cremers and Petajisto (2006) Active Share calculation. This fund has a 40% active share relative to its benchmark.
[5]These calculations are based on the value of the CUA, not on the value of the securities to be traded. The relevant estimate is the trading cost borne by the market maker in a creation or redemption, not the trading cost of any single position.

In one embodiment, correlation (a measure of the tendency of two values to move together) between the fund and its PCF basket or its benchmark index will probably be higher than 95% most of the time. Correlations in such instances will often approach 98-99% in well diversified portfolios, even with Correspondence levels well below 90%. Market makers and other market participants know that the risk of the portfolio composition file behaving materially differently than the fund (tracking error) is a function of differences in the positions that are not identical in the two lists. In an embodiment, most of the funds that use the disclosed processes will also publish correlations and tracking errors between and among fund portfolios, the PCF basket, benchmark indexes and index combinations. Correlation and tracking error do not require new methods or processes; and, in many cases, they do not require coordination with or knowledge of the actual fund portfolio.

By monitoring Correspondence, PACT, PACT Variability, DEMI PACT, DEMI PACT Variability, correlation, tracking error, Outperformance, intraday NAV proxy calculations and other supplementary information, the actively managed ETF market maker will be in an excellent position to assess the risks of being long or short the PCF or index baskets as hedges against a position in the fund shares. With these tools, the market maker will be well prepared to manage the risks and costs associated with an actively managed ETF market making position.

EXAMPLE 4

Facilitating Non-Transparent Exchange-Traded Fund Share Creations and Redemptions without Mandatory Early Cutoff Times In an alternative implementation, the transaction cost information described and developed in example 3 can be used as the basis for determining transaction cost-based transaction fees to be charged for fund share creation and redemption transactions of various sizes. In contrast to the process described at length in example 3, where an early cutoff time for commitment to implementation of fund share creation or redemption would always permit the fund portfolio manager to trade between the early cutoff time and the market close to transfer essentially all of the transaction costs of a creation or redemption transaction to the authorized participant initiating that transaction, the absence of a mandatory creation/redemption cutoff time significantly before the 4:00 p.m. market close in example 4 would prevent same day portfolio transactions that are informed and initiated by a creation/redemption notice under many circumstances. As a practical matter in the present example, most creation/redemption related transactions in the fund or in the creation/redemption basket would not take place until the business day after the day of creation or redemption commitment. In the absence of an early commitment to creation or redemption, the next day transaction costs associated with necessary portfolio changes would not affect the prices of the fund shares or the creation/redemption basket exchanged between the fund and authorized participants, these creation/redemption transaction costs would be borne in the first instance by the fund. Consequently, a mechanism different from the mechanism of example 3 must be used to transfer the creation/redemption transaction costs from the fund to the authorized participant. The most appropriate alternative transfer mechanism appears to be to levy a transaction fee on the creating or redeeming authorized participant at the time of the creation/redemption commitment. In contrast to example 3, where the transaction costs the authorized participant will incur are estimated and only a modest, fixed administrative fee is imposed by or on behalf of the fund, in the present example the fund will levy a fee calculated to cover its expected trading costs in addition to the administrative fee paid by the authorized participant at the time of commitment. Calculation of the appropriate transaction fee will be more tenuous because the next day's transaction costs may be different from and less predictable than same day transaction costs because most transactions will occur early on the next trading day rather than during the closing hour or at the close on the commitment day and news and other developments affecting securities prices and valuations overnight add an additional element of uncertainty.

In contrast to the method of transaction cost estimation, analysis and allocation described in example 3 and illustrated most specifically in Table 6, FIG. 16 and associated textual material, the present exemplary methodology for transferring the responsibility for creation/redemption-linked trading costs to the authorized participant leaves the fund exposed to variations in transaction costs. In example 3, variations in creation/redemption related transaction costs are borne by the authorized participant. In some circumstances, the transaction costs paid by the creating or redeeming authorized participant in the present example may be lower than they would have been with the mechanism of example 3 and in other cases costs they may be higher using the transaction fee calculation and allocation method under discussion here. The choice of the methodology of example 3 or the methodology of example 4 may turn on economics; but the choice is more likely to be based on regulatory requirements. In any event, the calculation of a transaction fee will use the same type of information and methods described above to estimate the authorized participant's transaction costs. The principal differences are imposition of a transaction fee in example 4 rather than estimation of transaction costs likely to be experienced by the authorized participant in example 3 and, with regulatory consent, the possible addition of a cost cushion to the expected cost component of the transaction fee for fund shareholder protection.

In one embodiment of the present invention, an option for an early commitment to creation or redemption would be available to authorized participants. With an early commitment, the transaction cost/fee might be determined by some combination of (a) the terms of example 3, (b) a different transaction fee reflecting possible earlier trading or (c) a rebate of part of the posted transaction fee if the actual transaction cost experienced by the fund was less than the cost estimated for next day trading.

As described in example 3, there also will be greater market impact costs associated with larger creation or redemption transactions than with smaller transactions in the method of the present example. The typical creation or redemption fee for exchange-traded fund shares includes at least a fixed dollar administrative fee which typically covers as many creation or redemption units as an authorized participant might want to commit to on a single date. The flat fee element is a result of the fact that most administrative costs associated with creations or redemptions are fixed costs per transaction rather than per creation unit. However, market impact costs associated with transactions (wherever borne) are typically larger per unit for a large creation or redemption transaction than for a small one. Depending on the size of the total creation/redemption on a specific day and on the nature of the securities in the creation and redemption basket and in the fund portfolio, the transaction costs associated with a creation or redemption will typically rise on a per unit basis as the number of units increases. As indicated in the detailed description of example 3, the estimated transaction costs associated with creation/redemption transactions will be calculated for various numbers of units (say 1, 5 and 10 units) within a range likely to cover the number of units that typically might be created or redeemed on a single day. As in example 3, if an authorized participant wished to initiate a transaction larger or smaller than the range covered by the posted fee schedule, the authorized participant could ask for a transaction fee quotation for a specific number of units. The publication of terms on which fees covering a different number of units can be disclosed will be subject to rules and policies developed by the fund with the concurrence of regulatory authorities.

The transaction costs embedded in the creation/redemption transaction fee of the present example will be set at levels designed to cover the transaction costs the fund expects to incur when transactions are made in the fund and in the creation/redemption basket on the day following the creation or redemption commitment. The fund may publish post trade transaction cost information that reveals the approximate accuracy of these estimates from time to time, perhaps expressing the costs in terms of their effect on fund performance during a specific time period.

The key differences between the present example 4 and example 3 are summarized in the following Table 9:

TABLE 9

|  | Example 3 | Example 4 |
| --- | --- | --- |
| Transaction cost impact imposed on an authorized participant | Estimated market impact costs of necessary trades on the value of the authorized participant's positions resulting from the portfolio manager's trades at or near today's market close will be published by an agent of the fund | Transaction fee paid by the authorized participant will incorporate estimated market impact costs from portfolio manager trades expected to be made on the next business day |
| Transaction costs incurred by the authorized participant | An administrative fee plus market impact costs imposed on the authorized participant from late day or market-on-close orders that affect the prices of securities in the creation/redemption basket and in the fund portfolio and, hence, the pricing of these portfolios at the market close | An administrative fee plus a transaction fee charged to the authorized participant based on a pre-trade cost estimation model for a specified number of creation units with portfolio trading on the day after commitment |
| Cumulative transaction cost per transaction | Market impact cost would be a function of the total net number of creation/redemption units for each day, not the number initiated by a single authorized participant | The per unit transaction fee would be a function of the total net number of creation/redemption units for each day, not the number initiated by a single authorized participant |
| Transactions occur | At or close to the market close on the day of creation or redemption commitment | On the day after the creation or redemption commitment |
| Possible variation that combines the features of Example 4 with a non-mandatory early commitment to creation or redemption |  | A lower transaction fee or a fee rebate if the authorized participant makes a commitment to creation or redemption far enough before the close that transactions can be made on the day of commitment |

Exemplary Computer Systems

Figure 17:
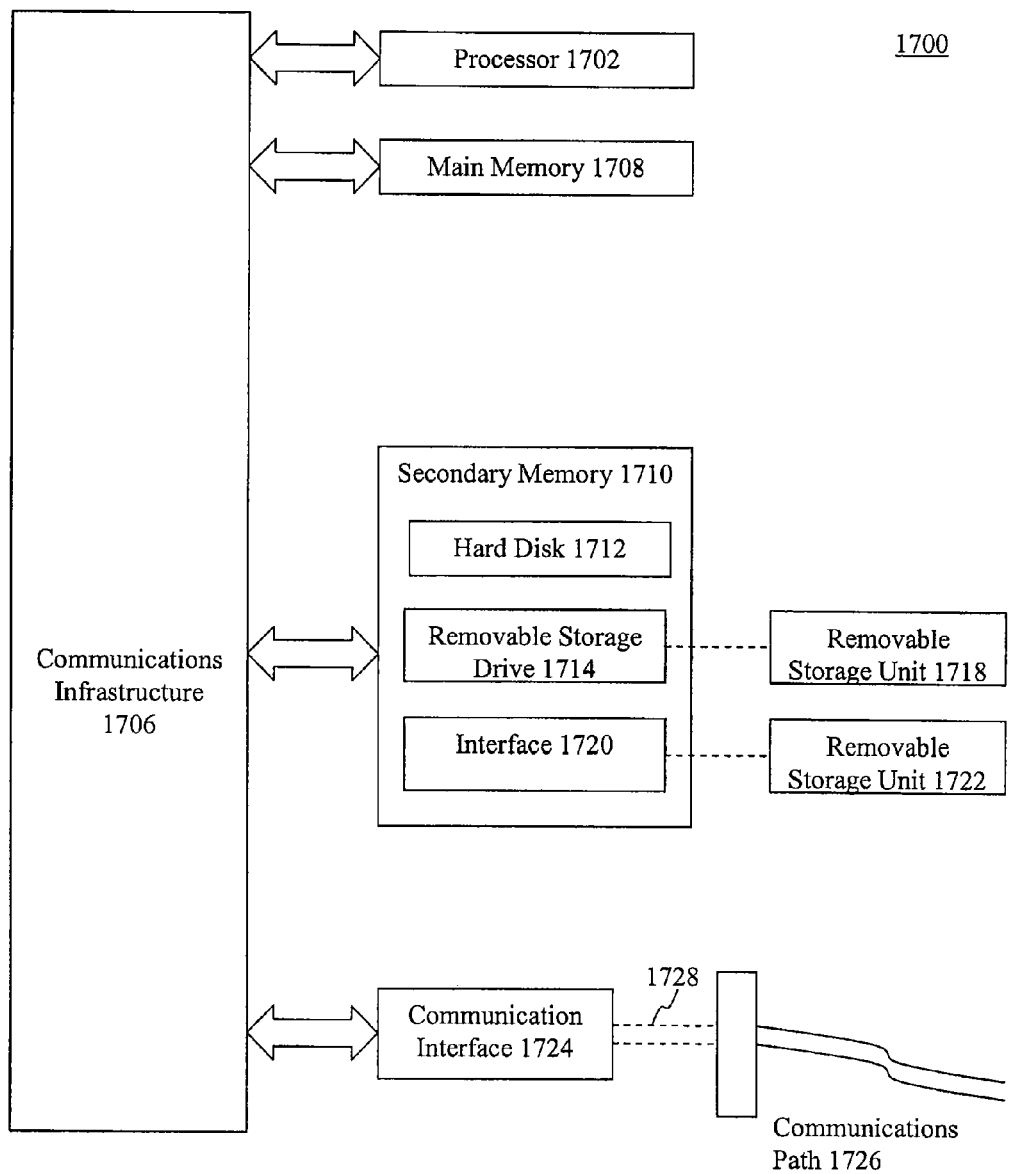
FIG. 17 is a block diagram of an exemplary computer connected to a network upon which the exemplary methods and systems of the present invention may be implemented.

FIG. 17 is a diagram of an exemplary computer system 1700 upon which embodiments of the present invention (or components thereof) may be implemented. The exemplary computer system 1700 includes one or more processors, such as processor 1702. The processor 1702 is connected to a communication infrastructure 1706, such as a bus or network. Various software implementations are described in terms of this exemplary computer system. After reading this description, it will become apparent to a person skilled in the relevant art how to implement the invention using other computer systems and/or computer architectures.

Computer system 1700 also includes a main memory 1708, preferably random access memory (RAM), and may include a secondary memory 1710. The secondary memory 1710 may include, for example, a hard disk drive 1712 and/or a removable storage drive 1714, representing a magnetic tape drive, an optical disk drive, etc. The removable storage drive 1714 reads from and/or writes to a removable storage unit 1718 in a well-known manner. Removable storage unit 1718 represents a magnetic tape, optical disk, or other storage medium that is read by and written to by removable storage drive 1714. As will be appreciated, the removable storage unit 1718 can include a computer usable storage medium having stored therein computer software and/or data.

In alternative implementations, secondary memory 1710 may include other means for allowing computer programs or other instructions to be loaded into computer system 1700. Such means may include, for example, a removable storage unit 1722 and an interface 1720. An example of such means may include a removable memory chip (such as an EPROM, or PROM) and associated socket, or other removable storage units 1722 and interfaces 1720, such as a memory stick or memory card, which allow software and data to be transferred from the removable storage unit 1722 to computer system 1700.

Computer system 1700 may also include one or more communications interfaces, such as communications interface 1724. Communications interface 1724 allows software and data to be transferred between computer system 1700 and external devices. Examples of communications interface 1724 may include a modem, a network interface (such as an Ethernet card), a communications port, a WIFI interface, a Bluetooth interface, a cellular interface, a PCMCIA slot and card, etc. Software and data transferred via communications interface 1724 are in the form of signals 1728, which may be electronic, electromagnetic, optical or other signals capable of being received by communications interface 1724. These signals 1728 are provided to communications interface 1724 via a communications path (i.e., channel) 1726. This channel 1726 carries signals 1728 and may be implemented using wire or cable, fiber optics, a wireless link and other communications channels. In an embodiment of the invention, signals 1728 comprise carrier waves modulated with control logic.

Any apparatus or manufacture comprising a computer useable or readable medium having control logic (software) stored therein is referred to herein as a computer program product or program storage device. This includes, but is not limited to, the computer 1700, the main memory 1708, the hard disk 1712, the removable storage units 1718, 1722 and the carrier waves modulated with control logic 1728. Such computer program products, having control logic stored therein that, when executed by one or more data processing devices, cause such data processing devices to operate as described herein, represent embodiments of the invention.

CONCLUSION

Embodiments of the present invention are directed to the introduction of methods, systems, and computer-program products to provide risk information and cost estimation tools to traders in exchange-traded fund shares.

According to various embodiments of the disclosed processes, supplemental information is developed, calculated, and published to support trading in exchange-traded funds with portfolios that are not totally transparent and that use portfolio composition files that are not identical to the fund portfolios. The supplementary trading information preserves fund portfolio confidentiality while permitting market makers and other traders in these non-transparent exchange-traded funds to estimate the costs and risks associated with fund creation and redemption transactions of various sizes.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor(s), and thus, are not intended to limit the present invention and the appended claims in any way.

What is claimed is:

1. A method for facilitating trading in shares of an investment fund having (i) a portfolio comprising any combination of financial instruments and cash, and (ii) a general class of fund shares tradable in a secondary market, wherein assets enter and are removed from said investment fund through a process of exchanging a designated combination of financial instruments and cash for a specified number of shares of said general class of fund shares, said process governed by a set of rules, comprising:

specifying and delivering information that identifies a designated combination of financial instruments and cash that differs in composition from said fund portfolio to a specified degree;

generating and publishing, with a trading cost estimation module, information calculated from data on partly undisclosed fund holdings, including at least one of (a) estimated transaction costs for purchases or sales of financial instruments included in said fund portfolio; (b) estimated transaction costs for purchases or sales of financial instruments included in said designated combination of financial instruments and cash; (c) one or more schedules of supplementary transaction fees to be added to any administrative or other fees charged for said exchange; (d) a comparison of the composition of said portfolio and said designated combination of financial instruments and cash; and (e) a comparison of performance of said fund portfolio relative to at least one of (i) said designated combination of financial instruments and cash and (ii) an index; said transaction costs calculated by a transaction cost estimation module calibrated for the specific transaction procedures the fund expects to use;

receiving notice, with a notification module, of commitment to create or redeem shares of said general class of fund shares by a time prices are determined for calculating a net asset value of said general class of fund shares and calculating a value of said designated financial instruments and cash; and directing, with a transaction module, at least one of (i) purchasing one or more financial instruments, and (ii) selling one or more financial instruments included in said fund portfolio or in said designated combination of financial instruments and cash after said fund receives a notice of commitment to create or redeem shares;

wherein the modules are processed by one or more computer processors.

2. The method of claim 1, wherein said receiving notice further comprises receiving notice of commitment to create or redeem shares of said general class of fund shares by a specified time prior to a time prices are determined for calculating a net asset value of said general class of fund shares and calculating a value of said designated financial instruments and cash.

3. The method of claim 1, wherein one or more of said supplementary transaction fees are reduced if said notice is received prior to a notification cut-off time specified by the fund.

4. The method of claim 3, wherein an estimate of the transaction costs attributed to a transaction in a specific instrument is charged to a participant if the fund delays trading that instrument.

5. The method of claim 1 wherein said published information is delivered to at least one of (i) a fund share trader, (ii) a fund share market maker or (iii) a participant in said exchange-traded fund share creation and redemption process.

6. The method of claim 1, further comprising using a pre-trade transaction cost estimation model in the trading cost estimation module.

7. The method of claim 6, wherein said pre-trade transaction cost estimation model uses multiple variables comprising at least one of (i) trading history, (ii) a time of day for order entry, (iii) a previous day's closing price, (iv) a size of an order, (v) an average daily trading volume, (vi) a size of floating supply, (vii) a side of the order, (viii) price volatility, (ix) bid-asked spread, and (x) a market impact associated with orders of different sizes and types and traders' execution policies.

8. The method of claim 6, further comprising publishing additional information comprising at least one of (i) a standard deviation of an estimated transaction cost, (ii) information on a shape of a transaction cost estimate distribution, and (iii) information on cost estimate percentile ranges.

9. The method of claim 8 wherein at least one of (a) said estimated transaction costs and (b) said additional information are published separately for transactions made in (i) said fund portfolio and (ii) said designated combination of financial instruments and cash.

10. The method of claim 1, wherein said estimated transaction costs and said schedules of supplementary transaction fees are stated relative to a value of a specified number of fund shares.

11. The method of claim 1, wherein said estimated transaction costs and said schedules of supplementary transaction fees are stated for one or more multiples of said specified number of fund shares.

12. The method of claim 1, further comprising publishing an estimate of at least one of (i) actual transaction costs, (ii) transaction fees or (iii) the difference between transaction fees and transaction costs over a specified time period.

13. The method of claim 1, further comprising publishing at least one of (a) a correspondence or an overlap between said fund portfolio and said designated combination of financial instruments and cash and (b) a complement of a correspondence or an overlap between said fund portfolio and said designated combination of financial instruments and cash.

14. The method of claim 13, wherein at least one of (i) said correspondence or overlap, and (ii) said complement of a correspondence or overlap are stated as at least one of a percentage, a decimal fraction, and a common fraction.

15. A method for facilitating a market maker's trading in shares of an investment fund having (i) a portfolio comprising any combination of financial instruments and cash and (ii) a general class of fund shares tradable in a secondary market, wherein assets enter and are removed from said investment fund through a process of exchanging a designated combination of financial instruments and cash for a specified number of shares of said general class of fund shares, said process governed by a set of rules, the method comprising:
receiving, with a data module, information including a transaction cost estimate calculated from data including partly undisclosed fund holdings, and including at least one of (i) estimated transaction costs for specific purchases or sales of financial instruments included in said fund portfolio; (ii) estimated transaction costs for specific purchases or sales of financial instruments included in said designated combination of financial instruments and cash; and (iii) one or more schedules of supplementary transaction fees to be added to any other fees charged for said exchange;
using said information, with a management module, to at least one of (iv) maintain a target spread between said market maker's bids and offers for the shares of the investment fund on one or more secondary (exchange) markets, (v) manage the size and market exposures of the market maker's positions in the shares of the investment fund and in related hedging positions, and (vi) determine when to change the market maker's inventory of shares in the investment fund; and
generating and delivering, with a notification module, notice of commitment to create or redeem shares of said general class of fund shares by the time prices are determined for calculating a net asset value of said general class of fund shares and calculating a value of said designated financial instruments and cash;
wherein the modules are processed by one or more computer processors.

16. The method of claim 15, wherein one or more of said supplementary transaction fees are reduced if said notice is received prior to a notification cut-off time specified by the fund.

17. The method of claim 15, wherein said receiving further comprises receiving information including a comparison of the composition of said portfolio and said designated combination of financial instruments and cash; and performance of said fund portfolio relative to at least one of (i) said designated combination of financial instruments and cash and (ii) an index.

18. The method of claim 15, further comprising at least one of: (i) estimating creation or redemption transaction costs using said received information; (ii) using said received information to select components for a hedging position; and (iii) using said received information to evaluate or develop bids or offers in said secondary market for shares of said fund.

19. The method of claim 15, further comprising receiving at least one of (i) a standard deviation of an estimated transaction cost, (ii) information on a shape of a transaction cost estimate distribution, and (iii) information on cost estimate percentile ranges.

20. The method of claim 15, further comprising:
delivering notice of commitment to create or redeem shares of said general class of fund shares by a specified time prior to a time prices are determined for calculating a net asset value of said general class of fund shares and calculating a value of said designated financial instruments and cash; and
at least one of delivering and receiving said designated combination of financial instruments and cash in exchange for a specified number of shares of said general class of fund shares.

21. The method of claim 15, further comprising receiving at least one of (a) a correspondence or an overlap between said fund portfolio and said designated combination of financial instruments and cash and (b) a complement of a correspondence or an overlap between said fund portfolio and said designated combination of financial instruments and cash.

22. A method for facilitating trading in shares of an investment fund having (i) a portfolio comprising any combination of financial instruments and cash and (ii) a general class of fund shares tradable in a secondary market, wherein assets enter and are removed from said investment fund through a process of exchanging a designated combination of financial instruments and cash for a specified number of shares of said general class of fund shares, said process governed by a set of rules, comprising:
specifying and delivering information that identifies a designated combination of financial instruments and cash that differs in composition from said fund portfolio to a specified degree;

receiving notice, with a notification module, of commitment to create or redeem shares of said general class of fund shares by a time prices are determined for calculating a net asset value of said general class of fund shares and calculating a value of said designated financial instruments and cash;

directing, with a transaction module, at least one of (i) purchasing one or more financial instruments, and (ii) selling one or more financial instruments included in said fund portfolio or in said designated combination of financial instruments and cash after said fund receives a notice of commitment to create or redeem shares; and wherein a party other than the investment manager of said investment fund publishes, with a trading cost estimation module, information calculated from data on partly undisclosed fund holdings, including at least one of (a) estimated transaction costs for said purchases or sales of financial instruments included in said fund portfolio; (b) estimated transaction costs for said purchases or sales of financial instruments included in said designated combination of financial instruments and cash; (c) one or more schedules of supplementary transaction fees to be added to any administrative fees charged for said exchange; (d) a comparison of the composition of said portfolio and said designated combination of financial instruments and cash; and (e) a comparison of performance of said fund portfolio relative to at least one of (i) said designated combination of financial instruments and cash and (ii) an index;

wherein the modules are processed by one or more computer processors.

23. The method of claim 22, wherein said receiving notice further comprises receiving notice of commitment to create or redeem shares of said general class of fund shares by a specified time prior to a time prices are determined for calculating a net asset value of said general class of fund shares and calculating a value of said designated financial instruments and cash.

24. The method of claim 22, wherein one or more of said supplementary transaction fees are reduced if said notice is received prior to a notification cut-off time specified by the fund.

25. The method of claim 22 wherein said published information is delivered to at least one of (i) a fund share trader, (ii) a fund share market maker and (iii) a participant in said exchange-traded fund share creation and redemption process.

26. The method of claim 22, further comprising using a pre-trade transaction cost estimation model to calculate said estimated transaction costs.

27. A system for facilitating trading in shares of an investment fund having (i) a portfolio comprising any combination of financial instruments and cash, and (ii) a general class of fund shares tradable in a secondary market, wherein assets enter and are removed from said investment fund through an exchange-traded fund share creation and redemption process governed by a set of rules, comprising:

a memory configured to store modules comprising:

a first module configured to perform at least one of specifying and delivering information that identifies a designated combination of financial instruments and cash that differs in composition from said fund portfolio to a specified degree;

a second module configured to perform at least one of delivering and receiving said designated combination of financial instruments and cash in exchange for a specified number of shares of said general class of fund shares;

a third module configured to receive notice of commitment to create or redeem shares of said general class of fund shares by the time prices are determined for calculating a net asset value of said general class of fund shares and calculating a value of said designated financial instruments and cash;

a fourth module configured to perform at least one of (i) purchasing one or more financial instruments and (ii) selling one or more financial instruments included in said fund portfolio or in said designated combination of financial instruments and cash after said fund receives a notice of commitment to create or redeem shares; and a fifth module configured to publish information calculated from data on partly undisclosed fund holdings comprising at least one of (a) estimated transaction costs for said purchases or sales of financial instruments included in said fund portfolio; (b) estimated transaction costs for said purchases or sales of financial instruments included in said designated combination of financial instruments and cash; (c) estimated supplementary transaction fees to be charged to parties initiating fund share creation and redemption transactions of various sizes; (d) a comparison of the composition of said portfolio and said designated combination of financial instruments and cash; and (e) performance of said fund portfolio relative to at least one of (i) said designated combination of financial instruments and cash and (ii) an index; and one or more computer processors configured to process the modules.

28. The system of claim 27, wherein said third module is configured to receive notice of commitment to create or redeem shares of said general class of fund shares by a specified time prior to a time prices are determined for calculating a net asset value of said general class of fund shares and calculating a value of said designated financial instruments and cash.

29. The system of claim 27, wherein one or more of said supplementary transaction fees are reduced if said notice is received prior to a notification cut-off time specified by the fund.

30. The system of claim 27, wherein said published information is delivered to at least one of (i) a fund share trader, (ii) a fund share market maker or (iii) a participant in said exchange-traded fund share creation and redemption process.

31. The system of claim 27, further comprising a sixth module configured to use a pre-trade transaction cost estimation model to calculate said estimated transaction costs and transaction fees.

32. The system of claim 31, wherein said pre-trade transaction cost estimation model uses multiple variables comprising at least one of (i) trading history, (ii) a time of day for order entry, (iii) a previous day's closing price, (iv) a size of an order, (v) an average daily trading volume, (vi) a size of floating supply, (vii) a side of the order, (viii) price volatility, (ix) bid-asked spread, and (x) a market impact associated with orders of different sizes and types and traders' execution policies.

33. The system of claim 31, further comprising a seventh module configured to publish additional information comprising at least one of (i) a standard deviation of an estimated transaction cost, (ii) information on a shape of a transaction cost estimate distribution, and (iii) information on cost estimate percentile ranges.

34. The system of claim 33, wherein said estimated transaction costs and said additional information are published separately for transactions made in (i) said fund portfolio and (ii) said designated combination of financial instruments and cash.

35. The system of claim 31, wherein said estimated transaction costs and said transaction fees are stated relative to a value of a specified number of fund shares.

36. The system of claim 31, wherein said estimated transaction costs and said transaction fees are stated for one or more multiples of said specified number of fund shares.

37. The system of claim 31, further comprising a seventh module configured to publish an estimate of at least one of (i) actual transaction costs, (ii) transaction fees or (iii) the difference between transaction fees and transaction costs over a specified time period.

38. The system of claim 31, wherein an estimate of the transaction costs attributed to a transaction in a specific instrument is charged to a participant if the fund delays trading that instrument.

39. The system of claim 27, further comprising a sixth module configured to publish at least one of (a) a correspondence or an overlap between said fund portfolio and said designated combination of financial instruments and cash and (b) a complement of a correspondence or an overlap between said fund portfolio and said designated combination of financial instruments and cash.

40. The system of claim 39, wherein at least one of (i) said correspondence or overlap, and (ii) said complement of a correspondence or overlap are stated as at least one of a percentage, a decimal fraction, and a common fraction.

41. A system for facilitating trading in shares of an investment fund having (i) a portfolio comprising any combination of financial instruments and cash and (ii) a general class of fund shares tradable in a secondary market, wherein assets enter and are removed from said investment fund through a process of exchanging a designated combination of financial instruments and cash for a specified number of shares of said general class of fund shares, said process governed by a set of rules, the system comprising:
  a memory configured to store modules comprising:
    a first module configured to receive information including a transaction cost estimate calculated from data including partly undisclosed fund holdings, and including at least one of (a) estimated transaction costs for specific purchases or sales of financial instruments included in said fund portfolio; (b) estimated transaction costs for specific purchases or sales of financial instruments included in said designated combination of financial instruments and cash; and (c) at least one schedule of supplementary transaction fees to be added to any other fees charged for said exchange;
    a second module configured to use said information to at least one of (i) maintain a target spread between said market maker's bids and offers for the shares of the investment fund on one or more secondary (exchange) markets, (ii) manage the size and market exposures of the market maker's positions in the shares of the investment fund and in related hedging positions, and (iii) determine when to change the market maker's inventory of shares in the investment fund; and
    a third module configured to generate and deliver notice of commitment to create or redeem shares of said general class of fund shares by the time prices are determined for calculating a net asset value of said general class of fund shares and calculating a value of said designated financial instruments and cash; and
  one or more computer processors configured to process the modules.

42. The system of claim 41, wherein one or more of said supplementary transaction fees are reduced if said notice is received prior to a notification cut-off time specified by the fund.

43. The system of claim 41, wherein said first module is further configured to receive information including a comparison of the composition of said portfolio and said designated combination of financial instruments and cash; and performance of said fund portfolio relative to at least one of (i) said designated combination of financial instruments and cash and (ii) an index.

44. The system of claim 41, further comprising a third module configured to perform at least one of: (i) estimating creation or redemption transaction costs using said received information; (ii) using said received information to select components for a hedging position; and (iii) using said received information to evaluate or develop bids or offers in said secondary market for shares of said fund.

45. The system of claim 44, further comprising a fourth module configured to receive at least one of (i) a standard deviation of an estimated transaction cost, (ii) information on a shape of a transaction cost estimate distribution, and (iii) information on cost estimate percentile ranges.

46. The system of claim 41, further comprising:
  a fourth module configured to deliver notice of commitment to create or redeem shares of said general class of fund shares by a specified time prior to a time prices are determined for calculating a net asset value of said general class of fund shares and calculating a value of said designated financial instruments and cash; and
  a fifth module configured to perform at least one of delivering and receiving said designated combination of financial instruments and cash in exchange for a specified number of shares of said general class of fund shares.

47. The system of claim 41, further comprising a third module configured to receive at least one of (a) a correspondence or an overlap between said fund portfolio and said designated combination of financial instruments and cash and (b) a complement of a correspondence or an overlap between said fund portfolio and said designated combination of financial instruments and cash.

48. A system for facilitating trading in shares of an investment fund having (i) a portfolio comprising any combination of financial instruments and cash and (ii) a general class of fund shares tradable in a secondary market, wherein assets enter and are removed from said investment fund through an exchange-traded fund share creation and redemption process governed by a set of rules, comprising:
  a memory configured to store modules comprising:
    a first module configured to perform at least one of specifying and delivering information that identifies a designated combination of financial instruments and cash that differs in composition from said fund portfolio to a specified degree;
    a second module configured to receive notice of commitment to create or redeem shares of said general class of fund shares by the time prices are determined for calculating a net asset value of said general class of fund shares and calculating a value of said designated financial instruments and cash; and
    a third module configured to perform at least one of delivering and receiving said designated combination of financial instruments and cash in exchange for a specified number of shares of said general class of fund shares; and one or more computer processors configured to process the modules, wherein said system is configured to enable the fund to at least one of (i) purchase one or more financial instruments and (ii) sell one or more financial instruments included in said fund portfolio or in said designated combination of financial instruments and cash after said fund receives a notice of commitment to create or redeem shares and calculating a value of said financial instruments and cash exchangeable for a specified number of shares of said general class of fund shares, and wherein said system is configured to enable a party other than the investment manager of said investment fund to publish information calculated from data on partly undisclosed fund holdings comprising at least one of (a) transaction fees for various numbers of unit purchases or sales of financial instruments included in said fund portfolio; (b) transaction fees for various numbers of unit purchases or sales of financial instruments included in said designated combination of financial instruments and cash; (c) one or more schedules of supplementary transaction fees to be added to any administrative fees charged for said exchange; (d) a comparison of the composition of said portfolio and said designated combination of financial instruments and cash; and (e) performance of said fund portfolio relative to at least one of (i) said designated combination of financial instruments and cash and (ii) an index.

49. The system of claim 48, wherein said second module is configured to receive notice of commitment to create or redeem shares of said general class of fund shares by a specified time prior to the time prices are determined for calculating a net asset value of said general class of fund shares and calculating a value of said designated financial instruments and cash.

50. The system of claim 48, further configured to enable one or more of said supplementary transaction fees to be reduced if said notice is received prior to a notification cut-off time specified by the fund.

51. The system of claim 48 wherein said published information is delivered to at least one of (i) a fund share trader, (ii) a fund share market maker and (iii) a participant in said exchange-traded fund share creation and redemption process.

52. The system of claim 48, further comprising a fourth module configured to use a pre-trade transaction cost estimation model to calculate said transaction fees.

53. A non-transitory computer readable storage medium having computer program logic recorded thereon for enabling a computer processor to facilitate trading in shares of an investment fund having (i) a portfolio comprising any combination of financial instruments and cash, and (ii) a general class of fund shares tradable in a secondary market, wherein assets enter and are removed from said investment fund through an exchange-traded fund share creation and redemption process governed by a set of rules, execution of which, by a computing device, causes the computing device to perform operations comprising:

at least one of specifying and delivering information that identifies a designated combination of financial instruments and cash that differs in composition from said fund portfolio to a specified degree;

at least one of delivering and receiving said designated combination of financial instruments and cash in exchange for a specified number of shares of said general class of fund shares;

receiving notice of commitment to create or redeem shares of said general class of fund shares by the time prices are determined for calculating a net asset value of said general class of fund shares and calculating a value of said designated financial instruments and cash;

at least one of (i) purchasing one or more financial instruments and (ii) selling one or more financial instruments included in said fund portfolio or in said designated combination of financial instruments and cash after said fund receives a notice of commitment to create or redeem shares; and publishing information calculated from data on partly undisclosed fund holdings comprising at least one of (a) a transaction fee to cover the fund's estimated costs for said purchases or sales of financial instruments included in said fund portfolio; (b) a transaction fee to cover the fund's estimated costs for said purchases or sales of financial instruments included in said designated combination of financial instruments and cash; (c) one or more schedules of supplementary transaction fees to be added to any administrative fees charged for said exchange; (d) a comparison of the composition of said portfolio and said designated combination of financial instruments and cash; and (e) performance of said fund portfolio relative to at least one of (i) said designated combination of financial instruments and cash and (ii) an index.

54. The non-transitory computer readable storage medium of claim 53, the operations further comprising receiving notice of commitment to create or redeem shares of said general class of fund shares by a specified time prior to a time prices are determined for calculating a net asset value of said general class of fund shares and calculating a value of said designated financial instruments and cash.

55. The non-transitory computer readable storage medium of claim 53, wherein one or more of said supplementary transaction fees are reduced if said notice is received prior to a notification cut-off time specified by the fund.

56. The non-transitory computer readable storage medium of claim 53, wherein said published information is delivered to at least one of (i) a fund share trader, (ii) a fund share market maker or (iii) a participant in said exchange-traded fund share creation and redemption process.

57. The non-transitory computer readable storage medium of claim 53, the operations further comprising using a pre-trade transaction cost estimation model to calculate said estimated transaction costs and said transaction fees.

58. The non-transitory computer readable storage medium of claim 57, wherein said pre-trade transaction cost estimation model uses multiple variables comprising at least one of (i) trading history, (ii) a time of day for order entry, (iii) a previous day's closing price, (iv) a size of an order, (v) an average daily trading volume, (vi) a size of floating supply, (vii) a side of the order, (viii) price volatility, (ix) bid-asked spread, and (x) a market impact associated with orders of different sizes and types and traders' execution policies.

59. The non-transitory computer readable storage medium of claim 57, the operations further comprising publishing additional information comprising at least one of (i) a standard deviation of an estimated transaction cost, (ii) information on a shape of a transaction cost estimate distribution, and (iii) information on cost estimate percentile ranges.

60. The non-transitory computer readable storage medium of claim 59, wherein said estimated transaction costs, said transaction fees and said additional information are published separately for transactions made in (i) said fund portfolio and (ii) said designated combination of financial instruments and cash.

61. The non-transitory computer readable storage medium of claim 57, wherein said estimated transaction costs and said transaction fees are stated relative to a value of a specified number of fund shares.

62. The non-transitory computer readable storage medium of claim 57, wherein said estimated transaction costs and said transaction fees are stated for one or more multiples of said specified number of fund shares.

63. The non-transitory computer readable storage medium of claim 57, the operations further comprising publishing an estimate of at least one of (i) actual transaction costs, (ii) transaction fees or (iii) the difference between transaction fees and transaction costs over a specified time period.

64. The non-transitory computer readable storage medium of claim 53, the operations further comprising publishing at least one of (a) a correspondence or an overlap between said fund portfolio and said designated combination of financial instruments and cash and (b) a complement of a correspondence or an overlap between said fund portfolio and said designated combination of financial instruments and cash.

65. The non-transitory computer readable storage medium of claim 64, wherein at least one of (i) said correspondence or overlap, and (ii) said complement of a correspondence or overlap are stated as at least one of a percentage, a decimal fraction, and a common fraction.

66. A non-transitory computer-readable medium having computer program logic recorded thereon for enabling a computer processor to trade in shares of an investment fund having (i) a portfolio comprising any combination of financial instruments and cash and (ii) a general class of fund shares tradable in a secondary market, wherein assets enter and are removed from said investment fund through a process of exchanging a designated combination of financial instruments and cash for a specified number of shares of said general class of fund shares, said process governed by a set of rules, execution of which, by a computing device, causes the computing device to perform operations comprising:
  receiving information including a transaction cost estimate calculated from data including partly undisclosed fund holdings, and including at least one of (a) estimated transaction costs for purchases or sales of financial instruments included in said fund portfolio; (b) estimated transaction costs for purchases or sales of financial instruments included in said designated combination of financial instruments and cash; and (c) at least one schedule of supplementary transaction fees to be added to any other fees charged for said exchange;
  using said information to at least one of (i) maintain a target spread between said market maker's bids and offers for the shares of the investment fund on one or more secondary (exchange) markets, (ii) manage the size and market exposures of the market maker's positions in the shares of the investment fund and in related hedging positions, and
  (iii) determine when to change the market maker's inventory of shares in the investment fund; and generating and delivering notice of commitment to create or redeem shares of said general class of fund shares by the time prices are determined for calculating a net asset value of said general class of fund shares and calculating a value of said designated financial instruments and cash.

67. The computer readable medium of claim 66, wherein one or more of said supplementary transaction fees are reduced if said notice is received prior to a notification cut-off time specified by the fund.

68. The computer readable medium of claim 66, wherein said receiving further comprises receiving information including a comparison of the composition of said portfolio and said designated combination of financial instruments and cash; and performance of said fund portfolio relative to at least one of (i) said designated combination of financial instruments and cash and (ii) an index.

69. The computer-readable medium of claim 66, the operations further comprising at least one of: (i) estimating creation or redemption transaction costs using said received information; (ii) using said received information to select components for a hedging position; and (iii) using said received information to evaluate or develop bids or offers in said secondary market for shares of said fund.

70. The computer-readable medium of claim 69, the operations further comprising receiving at least one of (i) a standard deviation of an estimated transaction cost, (ii) information on a shape of a transaction cost estimate distribution, and (iii) information on cost estimate percentile ranges.

71. The computer-readable medium of claim 66, the operations further comprising:
  delivering notice of commitment to create or redeem shares of said general class of fund shares by a specified time prior to a time prices are determined for calculating a net asset value of said general class of fund shares and calculating a value of said designated financial instruments and cash; and
  at least one of delivering and receiving said designated combination of financial instruments and cash in exchange for a specified number of shares of said general class of fund shares.

72. The computer-readable medium of claim 66, the operations further comprising receiving at least one of (a) a correspondence or an overlap between said fund portfolio and said designated combination of financial instruments and cash and (b) a complement of a correspondence or an overlap between said fund portfolio and said designated combination of financial instruments and cash.

73. A non-transitory computer readable storage medium having computer program logic recorded thereon for enabling a computer processor to facilitate trading in shares of an investment fund having (i) a portfolio comprising any combination of financial instruments and cash and (ii) a general class of fund shares tradable in a secondary market, wherein assets enter and are removed from said investment fund through an exchange-traded fund share creation and redemption process governed by a set of rules, execution of which, by a computing device, causes the computing device to perform operations comprising:
  at least one of specifying and delivering information that identifies a designated combination of financial instruments and cash that differs in composition from said fund portfolio to a specified degree;
  receiving notice of commitment to create or redeem shares of said general class of fund shares by the time prices are determined for calculating a net asset value of said general class of fund shares and calculating a value of said designated financial instruments and cash; and
  at least one of delivering and receiving said designated combination of financial instruments and cash in exchange for a specified number of shares of said general class of fund shares,
  wherein said fund at least one of (i) purchases one or more financial instruments and (ii) sells one or more financial instruments included in said fund portfolio or in said designated combination of financial instruments and cash after said fund receives a notice of commitment to create or redeem shares of said general class of fund shares, and wherein a party other than the investment manager of said investment fund publishes information calculated from data on partly undisclosed fund holdings comprising at least one of (a) transaction fees set to cover the fund's expected costs for various numbers of units of said purchases or sales of financial instruments included in said fund portfolio; (b) transaction fees set to cover the fund's expected costs for various numbers of units of said purchases or sales of financial instruments included in said designated combination of financial instruments and cash; (c) one or more schedules of supplementary transaction fees to be added to any administrative fees charged for said exchange; (d) a comparison of the composition of said portfolio and said designated combination of financial instruments and cash; and (e) performance of said fund portfolio relative to at least one of (i) said designated combination of financial instruments and cash and (ii) an index.

74. The non-transitory computer readable storage medium of claim 73, the operations further comprising receiving notice of commitment to create or redeem shares of said general class of fund shares by a specified time prior to a time prices are determined for calculating a net asset value of said general class of fund shares and calculating a value of said designated financial instruments and cash.

75. The non-transitory computer readable storage medium of claim 73, wherein one or more of said supplementary transaction fees are reduced if said notice is received prior to a notification cut-off time specified by the fund.

76. The non-transitory computer readable storage medium of claim 73, wherein said published information is delivered to at least one of (i) a fund share trader, (ii) a fund share market maker and (iii) a participant in said exchange-traded fund share creation and redemption process.

77. The non-transitory computer readable storage medium of claim 76, the operations further comprising using a pre-trade transaction cost estimation model to calculate said estimated transaction costs.

* * * * *